United States Patent
Yamaga et al.

(10) Patent No.: US 12,198,743 B2
(45) Date of Patent: Jan. 14, 2025

(54) MAGNETIC RECORDING MEDIUM HAVING CONTROLLED CHANGE IN AVERAGE WIDTH AND CARTRIDGE

(71) Applicant: Sony Group Corporation, Tokyo (JP)

(72) Inventors: Minoru Yamaga, Tokyo (JP); Takahiro Takayama, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/284,405

(22) PCT Filed: Mar. 31, 2022

(86) PCT No.: PCT/JP2022/016494
§ 371 (c)(1),
(2) Date: Sep. 27, 2023

(87) PCT Pub. No.: WO2022/211020
PCT Pub. Date: Oct. 6, 2022

(65) Prior Publication Data
US 2024/0161778 A1    May 16, 2024

(30) Foreign Application Priority Data
Mar. 31, 2021   (JP) ................................ 2021-062467

(51) Int. Cl.
G11B 5/78    (2006.01)
G11B 5/706   (2006.01)
G11B 5/73    (2006.01)

(52) U.S. Cl.
CPC ........... G11B 5/78 (2013.01); G11B 5/70642 (2013.01); G11B 5/73927 (2019.05)

(58) Field of Classification Search
None
See application file for complete search history.

(56) References Cited

U.S. PATENT DOCUMENTS 10,839,846 B2 * 11/2020 Yamaga ............. G11B 5/70678
2019/0180781 A1 * 6/2019 Handa .................... G11B 5/012
(Continued)

FOREIGN PATENT DOCUMENTS

JP    2013065381 A    4/2013
JP    2020164795 A    10/2020
(Continued)

OTHER PUBLICATIONS

International Search Report from corresponding PCT application PCT/JP2022/016494, dated Jun. 28, 2022.

*Primary Examiner* — Kevin M Bernatz
(74) *Attorney, Agent, or Firm* — K&L Gates LLP

(57) ABSTRACT

Provided is a magnetic recording medium with a tape shape capable of correcting a change in width of the magnetic recording medium by adjusting a running tension of the magnetic recording medium in a case where the magnetic recording medium is saved or caused to run in a high-temperature environment. The magnetic recording medium is a magnetic recording medium with a tape shape, an amount of change in average width of the magnetic recording medium before and after the magnetic recording medium is left still for 40 hours in an environment at a temperature of 50° C. and a relative humidity of 40% RH in a state where a tension of 0.55 N is applied in a longitudinal direction is 170 ppm or less, and an average tension responsiveness with respect to a tension in the longitudinal direction in the environment at a temperature of 50° C. and a relative humidity of 40% RH is 700 ppm/N or more.

20 Claims, 20 Drawing Sheets

(56) References Cited

U.S. PATENT DOCUMENTS

2019/0378540 A1\* 12/2019 Sekiguchi ............. C23C 14/545
2022/0165301 A1   5/2022 Yamaga et al.

FOREIGN PATENT DOCUMENTS

| JP | 2020173882 A | 10/2020 |
| JP | 2020184400 A | 11/2020 |
| JP | 2021034114 A | 3/2021 |

\* cited by examiner

MAGNETIC RECORDING MEDIUM HAVING CONTROLLED CHANGE IN AVERAGE WIDTH AND CARTRIDGE

TECHNICAL FIELD

The present disclosure relates to a magnetic recording medium and a cartridge including the same.

BACKGROUND ART

With an increasing demand for archiving, magnetic recording media with tape shapes having a large total capacity have been incorporated in cloud systems. Since environmental temperature ranges of the current magnetic recording media with tape shapes for actual running and storage are narrower than those of hard disk drives (HDDs), semiconductor memories, and the like, expansion of the environmental temperature ranges of magnetic recording media with tape shapes for actual running and storage is desired. It is thought that the utilization range of magnetic recording media with tape shapes would be significantly widened if it became possible to use magnetic recording media with tape shapes in temperature environments similar to those for HDDs, semiconductor memories, and the like.

If the dimensions of magnetic recording media with tape shapes in the width direction greatly change due to changes in environments, off-track may occur, and it may become difficult to secure stable recording reproduction properties of the magnetic recording media. PTL 1 proposes a magnetic recording medium with a tape shape in which a change in width is able to be corrected by adjusting a tension of the magnetic recording medium with a tape shape in a longitudinal direction by a recording reproducing device if the dimension of the magnetic recording medium with a tape shape in the width direction changes due to a change in environment.

CITATION LIST

Patent Literature

[PTL 1]
JP 2020-173882A

SUMMARY

Technical Problem

Although 50° C. is typically assumed for HDDs as an upper limit temperature of an operation guaranteed environment, saving and running in such high-temperature environments is not assumed for conventional magnetic recording media with tape shapes. Saving and running in such high-temperature environments are not assumed in PTL 1 as well. Therefore, in a case where conventional magnetic recording media with a tape shape save or are caused to run in high-temperature environments, there is a concern that changes in widths of the tape shapes may exceed ranges in which the changes can be corrected by adjusting running tensions and it may become difficult to correct the changes in widths.

An object of the present disclosure is to provide a magnetic recording medium with a tape shape and a cartridge including the same capable of correcting a change in width of the magnetic recording medium by adjusting a running tension of the magnetic recording medium even in a case where the magnetic recording medium is saved or caused to run in a high-temperature environment.

Solution to Problem

In order to solve the above-described problems, a first disclosure is
a magnetic recording medium with a tape shape,
in which an amount of change in average width of the magnetic recording medium before and after the magnetic recording medium is left still for 40 hours in an environment at a temperature of 50° C. and a relative humidity of 40% RH in a state where a tension of 0.55 N is applied in a longitudinal direction is 170 ppm or less, and an average tension responsiveness with respect to a tension in the longitudinal direction in an environment at a temperature of 50° C. and a relative humidity of 40% RH is 700 ppm/N or more.

A second disclosure is
a cartridge including: the magnetic recording medium according to the first disclosure; and
a storage unit that is configured such that adjustment information for adjusting a tension to be applied in the longitudinal direction of the magnetic recording medium is able to be written therein.

DESCRIPTION OF EMBODIMENTS

An embodiment of the present disclosure will be described in the following order.

1 First embodiment (example of coating-type magnetic tape)
  1.1 Configuration of cartridge
  1.2 Configuration of cartridge memory
  1.3 Configuration of magnetic tape
  1.4 Method of manufacturing magnetic tape
  1.5 Operation and effect
2 Second embodiment (example of vacuum thin film-type magnetic tape)
  2.1 Configuration of magnetic tape
  2.2 Configuration of sputtering device
  2.3 Method of manufacturing magnetic tape
  2.4 Operation and effect
3 Third embodiment (example of vacuum thin film-type magnetic tape)
  3.1 Configuration of magnetic tape
  3.2 Operation and effect
4 Modification examples In regard to a measurement environment in description of a measurement method in the specification, if not specifically stated, it is assumed that the measurement is conducted in an environment at 25° C.±2° C. and 50% RH±5% RH. Also, numerical ranges indicated by "to" indicate ranges including the numerical values written before and after "to" as minimum values and maximum values, respectively, in the specification.

1 First Embodiment

[1.1 Configuration of Cartridge]

Figure 1:
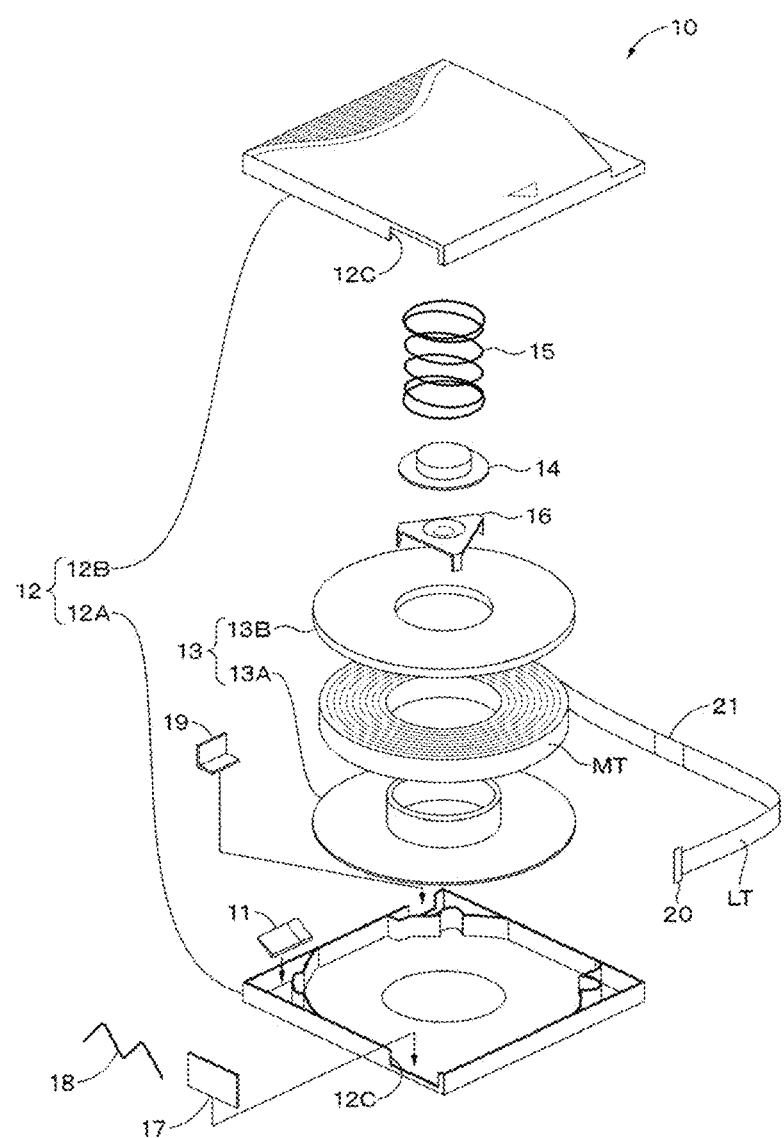
FIG. 1 is an exploded perspective view illustrating an example of a configuration of a cartridge according to a first embodiment of the present disclosure.

FIG. 1 is an exploded perspective view illustrating an example of a configuration of a cartridge 10. The cartridge 10 is a one-reel-type cartridge and includes, inside a cartridge case 12 configured of a lower shell 12A and an upper shell 12B, one reel 13 around which a magnetic recording medium with a tape shape (hereinafter, referred to as a "magnetic tape") is wound, a reel lock 14 and a reel spring 15 for locking rotation of the reel 13, a spider 16 for releasing a locked state of the reel 13, a slide door 17 that opens and closes a tape outlet port 12C provided at the cartridge case 12 across the lower shell 12A and the upper shell 12B, a door spring 18 that biases the slide door 17 toward a closed position of the tape outlet port 12C, a write protect 19 for preventing erroneous deletion, and a cartridge memory 11. The reel 13 for winding the magnetic tape MT therearound has a substantially disk shape having an opening in the center part, and is constituted by a reel hub 13A made of a hard material such as a plastic and a flange 13B. A leader tape LT is provided at an end of the magnetic tape MT on the outer circumferential side. A leader pin 20 is provided at a distal end of the leader tape LT.

The cartridge 10 may be a magnetic tape cartridge based on a linear tape-open (LTO) standard or may be a magnetic tape cartridge based on a standard different from the LTO standard.

The cartridge memory 11 is provided in the vicinity of one corner of the cartridge 10. When the cartridge 10 is loaded in a recording/reproducing device, the cartridge memory 11 faces a reader/writer of the recording/reproducing device. The cartridge memory 11 communicates with a recording/reproducing device, specifically, a reader/writer based on a wireless communication standard according to the LTO standard.

[1.2 Configuration of cartridge memory]

Figure 2:
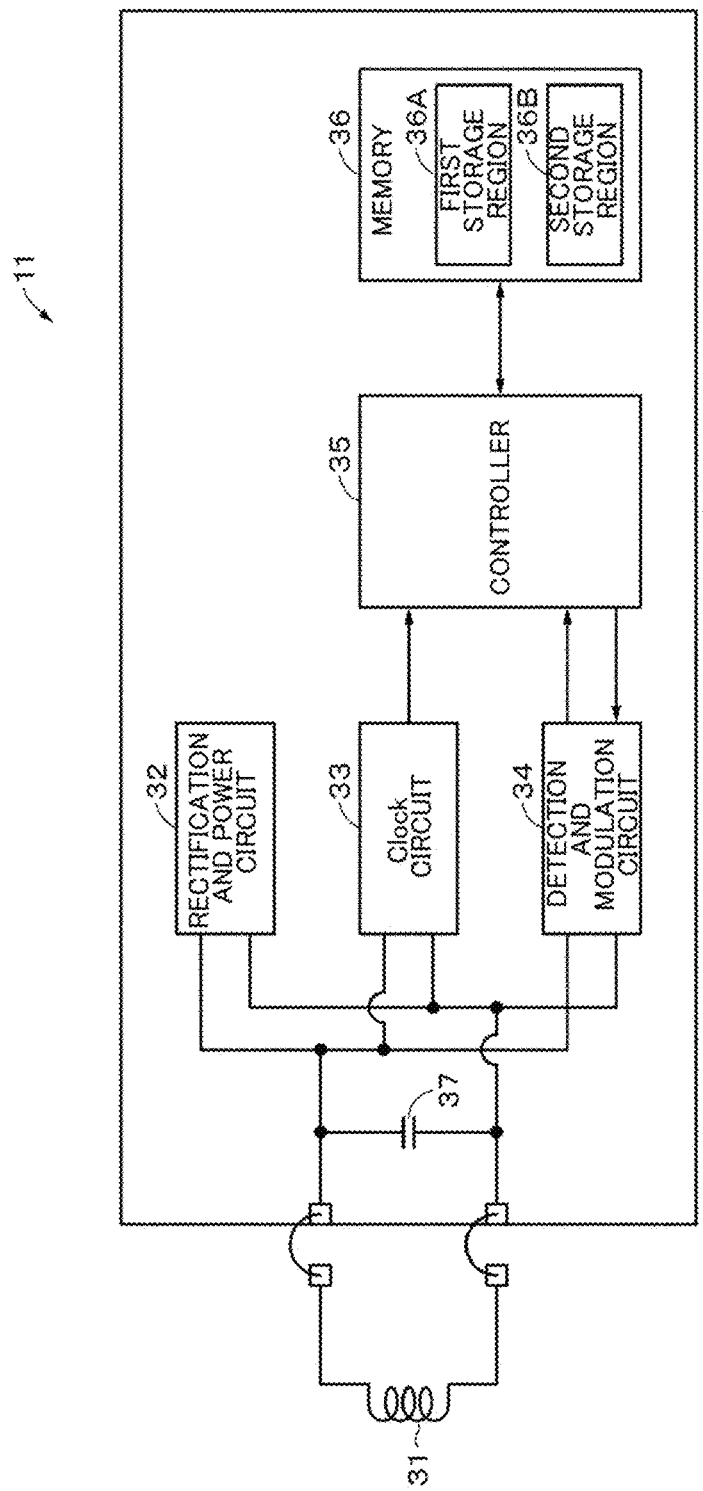
FIG. 2 is a block diagram illustrating an example of a configuration of a cartridge memory.

FIG. 2 is a block diagram illustrating an example of a configuration of the cartridge memory 11. The cartridge memory 11 includes an antenna coil (communication unit) 31 that communicates with a reader/writer according to a specified communication standard, a rectification and power circuit 32 that generates power by generating and rectifying power from radio waves received by the antenna coil 31 using an induced electromotive force, a clock circuit 33 that similarly generates a clock using an induced electromotive force from radio waves received by the antenna coil 31, a detection and modulation circuit 34 that detects radio waves received by the antenna coil 31 and modulates a signal to be transmitted by the antenna coil 31, a controller (control unit) 35 which is constituted by a logic circuit or the like for discriminating a command and data from a digital signal extracted from the detection and modulation circuit 34 and processing the command and data, and a memory (storage unit) 36 that stores information. In addition, the cartridge memory 11 includes a capacitor 37 which is connected to the antenna coil 31 in parallel, and a resonance circuit is constituted by the antenna coil 31 and the capacitor 37.

The memory 36 stores information and the like related to the cartridge 10. The memory 36 is a non-volatile memory (NVM). A storage capacity of the memory 36 is preferably approximately 32 KB or more.

The memory 36 may have a first storage region 36A and a second storage region 36B. The first storage region 36A is a region for storing first information. The first information includes, for example, at least one kind selected from a group consisting of manufacturing information of the cartridge 10 (a unique number for the cartridge 10, for example), a utilization history of the cartridge 10 (the number of times the magnetic tape MT is pulled out (thread count), for example), and the like. The second storage region 36B is a region for storing second information. The second information includes, for example, at least one kind selected from a group consisting of tension adjustment information, management record data, index information, thumbnail information, and the like.

The tension adjustment information is information for adjusting tension applied in the longitudinal direction of the magnetic tape MT. The tension adjustment information includes, for example, at least one kind of information selected from a group consisting of information obtained by intermittently measuring the widths between servo bands in the longitudinal direction of the magnetic tape MT, tension information of the recording reproducing device, information regarding a temperature and a humidity of the recording reproducing device, and the like. Such information may be managed in conjunction with information regarding a utilization status of the cartridge 10 and the like. The tension adjustment information is preferably acquired at the time of recording data on the magnetic tape MT or before recording data. The tension information of the recording reproducing device means information regarding a tension applied in the longitudinal direction of the magnetic tape MT.

The management record data is data including at least one kind of the capacity, a date of creation, a date of editing, a storage location, and the like of a data file recorded on the magnetic tape MT. The index information is metadata or the like for searching for content of the data file. The thumbnail information is a thumbnail of a movie or a stationary image stored in the magnetic tape MT. In the following description, information stored in the first storage region 36A may be referred to as "first information", and information stored in the second storage region 36B may be referred to as "second information".

The memory 36 may include a plurality of banks. In this case, the first storage region 36A may be constituted by some of the plurality of banks, and the second storage region 36B may be constituted by the remaining banks.

The antenna coil 31 induces an induced voltage by electromagnetic induction. The controller 35 communicates with the recording/reproducing device according to a specified communication standard through the antenna coil 31. Specifically, the controller performs, for example, mutual authentication, transmission and reception of commands, data exchange, and the like.

The controller 35 stores information received from the recording/reproducing device through the antenna coil 31 in the memory 36. For example, tension adjustment information received from the recording/reproducing device through the antenna coil 31 is stored in the second storage region 36B of the memory 36. The controller 35 reads information from the memory 36 in response to a request of the recording/reproducing device and transmits the information to the recording/reproducing device through the antenna coil 31. For example, the controller 35 reads tension adjustment information from the second storage region 36B of the memory 36 in response to a request of the recording/reproducing device and transmits the tension adjustment information to the recording/reproducing device through the antenna coil 31.

[1.3 Configuration of magnetic tape]

Figure 3:
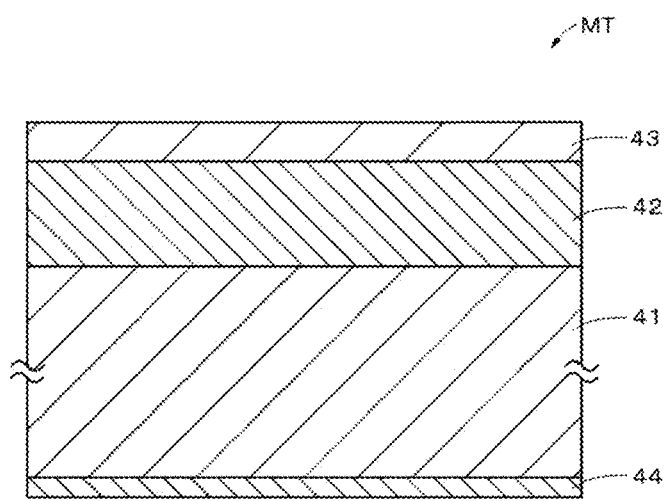
FIG. 3 is a cross-sectional view illustrating an example of a configuration of a magnetic tape.

FIG. 3 is a sectional view illustrating an example of a configuration of the magnetic tape MT. The magnetic tape MT includes a long substrate 41, an underlayer 42 provided on one main surface (first main surface) of the substrate 41, a magnetic layer 43 provided on the underlayer 42, and a back layer 44 provided on the other main surface (second main surface) of the substrate 41. Here, the underlayer 42 and the back layer 44 may be provided as necessary or may not be provided. The magnetic tape MT may be a perpendicular recording type magnetic recording medium, or may be a longitudinal recording type magnetic recording medium. The magnetic tape MT preferably contains a lubricant in terms of an improvement in runnability. The lubricant may be included in at least one layer out of the underlayer 42 and the magnetic layer 43.

The magnetic tape MT based on the LTO standard may be used, or the magnetic tape MT based on a standard other than the LTO stand may be used. The width of the magnetic tape MT may be ½ inches or may be wider than ½ inches. In a case of the magnetic tape MT based on the LTO standard, the width of the magnetic tape MT is ½ inches. The magnetic tape MT may have a configuration with which it is possible to keep the width of the magnetic tape MT constant or substantially constant by the recording reproducing device (drive) adjusting the tension to be applied in the longitudinal direction of the magnetic tape MT at the time of running.

The magnetic tape MT has a long shape and runs in the longitudinal direction at the time of recording/reproducing. The magnetic tape MT is preferably used in a recording/reproducing device including a ring-type head as a recording head. The magnetic tape MT is preferably used in a recording/reproducing device configured to be able to record data with a data track width of 1500 nm or less or 1000 nm or less.

(Substrate)

The substrate 41 is a non-magnetic support that supports the underlayer 42 and the magnetic layer 43. The substrate 41 has a long film shape. The upper limit value of the average thickness of the substrate 41 is, for example, 4.4 µm or less, preferably 4.2 µm or less, more preferably 4.0 µm or less, still more preferably 3.8 µm or less, particularly preferably 3.6 µm or less, and most preferably 3.4 µm or less. When the upper limit value of the average thickness of the substrate 41 is 4.4 µm or less, a recording capacity capable of being recorded in one data cartridge can be increased more than in a general magnetic tape. A lower limit value of the average thickness of the substrate 41 is preferably 3 µm or more, and more preferably 3.2 µm or more. When the lower limit value of the average thickness of the substrate 41 is 3 µm or more, it is possible to minimize a decrease in the strength of the substrate 41.

The average thickness of the substrate 41 is obtained as follows. First, the magnetic tape MT accommodated in the cartridge 10 is rolled out, and the magnetic tape MT is cut into a length of 250 mm from each of a range of 10 m to 20 m, a range of 30 m to 40 m, and a range of 50 m to 60 m in the longitudinal direction from a connected portion 21 between the magnetic tape MT and the leader tape LT thereby to produce three samples. In the specification, the "longitudinal direction" in the case of the "longitudinal direction from the connected portion 21 between the magnetic tape MT and the leader tape LT" means a direction from one end on the side of the leader tape LT toward the other end on the side opposite thereto.

Next, layers other than the substrate 41 (that is, the underlayer 42, the magnetic layer 43, and the back layer 44) in each sample are removed by a solvent such as methyl ethyl ketone (MEK) or a dilute hydrochloric acid. Then, the thickness of each sample (substrate 41) is measured at five positions in each sample (substrate 41) by using a Laser Hologage (LGH-110C) manufactured by Mitutoyo, an arithmetic mean of the measurement values (the thicknesses of the samples at a total of fifteen points) is obtained, and an average thickness of the substrate 41 is calculated. Note that the five measurement positions are randomly selected from each sample such that the positions are different from each other in the longitudinal direction of the magnetic tape MT.

The substrate 41 contains, for example, at least one kind of polyesters, polyolefins, cellulose derivatives, vinyl-based resins, and other polymer resins. In a case where the substrate 41 contains two or more kinds from among the materials, the two or more kinds of materials may be mixed, copolymerized, or laminated.

The substrate 41 preferably contains polyesters from among the above polymer resins. It is possible to reduce the storage elastic modulus E' of the substrate 41 in the longitudinal direction preferably to 9.0 GPa or less, more preferably to 7.5 GPa or less, yet more preferably to 6.0 GPa or less, particularly preferably to 5.5 GPa or less, and most preferably to 4.5 GPa or less by the substrate 41 containing the polyesters. Therefore, it is particularly easy to perform control of keeping the width of the magnetic tape MT constant or substantially constant by the recording reproducing device adjusting the tension of the magnetic tape MT in the longitudinal direction at the time of running. A method for measuring the storage elastic modulus E' of the substrate 41 in the longitudinal direction will be described later.

Examples of the polyesters include at least one kind of polyethylene terephthalate (PET), polyethylene naphthalate (PEN), polybutylene terephthalate (PBT), polybutylene naphthalate (PBN), polycyclohexylene dimethylene terephathalate (PCT), polyethylene-p-oxybenzoate (PEB), and polyethylene bisphenoxy carboxylate. In a case where the substrate 41 contains two or more kinds of polyesters, the two or more kinds of polyesters may be mixed, copolymerized, or laminated. At least one of a terminal and a side chain of the polyesters may be modified. In order to enhance the strength of the substrate 41, polyamide (PA) may be added to polyethylene terephthalate (PET).

Incorporation of the polyesters in the substrate 41 is checked as follows, for example. First, the magnetic tape MT accommodated in the cartridge 10 is rolled out, the magnetic tape MT is cut from a range of 30 m to 40 m in the longitudinal direction from the connected portion 21 between the magnetic tape MT and the leader tape LT to produce a sample, and layers other than the substrate 41 of the sample are then removed. Next, an IR spectrum of the sample (substrate 41) is acquired by an infrared absorption spectrometry (IR). Incorporation of the polyesters in the substrate 41 can be checked on the basis of the IR spectrum.

Examples of the polyolefins include at least one kind of polyethylene (PE) and polypropylene (PP). Examples of the cellulose derivatives include at least one kind of cellulose diacetate, cellulose triacetate, cellulose acetate butyrate (CAB), and cellulose acetate propionate (CAP). Examples of vinyl-based resins include at least one kind of polyvinyl chloride (PVC) and polyvinylidene chloride (PVDC).

Examples of other polymer resins include at least one kind of polyamide or nylon (PA), aromatic polyamide or aramid (aromatic PA), polyimide (PI), aromatic polyimide (aromatic PI), polyamidedimide (PAT), aromatic polyamideimide (aromatic PAT), polybenzoxazole (PBO; for example, Zylon (registered trademark)), polyether, polyether ketone (PEK), polyether ether ketone (PEEK), polyether ester, polyether sulfone (PES), polyether imide (PEI), polysulfone (PSF), polyphenylene sulfide (PPS), polycarbonate (PC), polyarylate (PAR), and polyurethane (PU).

The substrate 41 may be biaxially stretched in the longitudinal direction and the width direction. The polymer resin contained in the substrate 41 is preferably oriented obliquely with respect to the width direction of the substrate 41.

(Magnetic Layer)

The magnetic layer 43 is a recording layer in which a signal is recorded by a magnetization pattern. The magnetic layer 43 may be a coating film. The magnetic layer 43 may be a perpendicular recording type recording layer or a longitudinal recording type recording layer. The magnetic layer 43 contains, for example, a magnetic powder, a binding agent, a lubricant, and a carbon. The magnetic layer 43 may further contain, as necessary, at least one additive among an antistatic agent, an abrasive, a curing agent, an antirust agent, non-magnetic reinforcing particles, and the like. The magnetic layer 43 may have a surface having an uneven shape.

Figure 4:
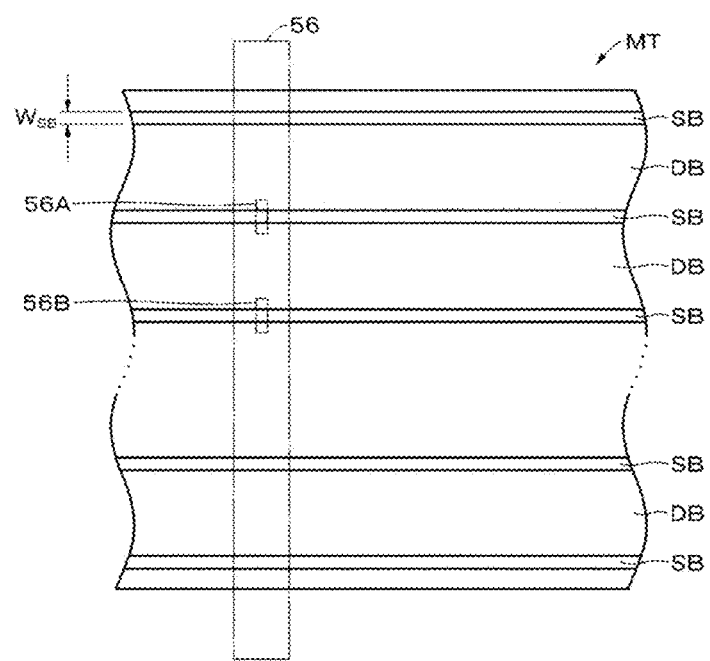
FIG. 4 is a schematic diagram illustrating an example of a layout of data bands and servo bands.

The magnetic layer 43 may have a plurality of servo bands SB and a plurality of data bands DB in advance as illustrated in FIG. 4. The plurality of servo bands SB are provided at equal intervals in the width direction of the magnetic tape MT. The data bands DB are provided between adjacent servo bands SB. The servo bands SB are for guiding the head unit 56 (specifically, the servo read heads 56A and 56B) at the time of recording or reproducing data. A servo pattern (servo signal) for performing tracking control of the head unit 56 is written on the servo bands SB in advance. User data is recorded in the data band DB.

An upper limit value of an average value of a ratio $RS(=(S_{SB}/S) \times 100)$ of a total area $S_{SB}$ of the plurality of servo bands SB with respect to an area S of the magnetic surface is preferably 4.0% or less, more preferably 3.0% or less, and still more preferably 2.0% or less from the viewpoint of securing a high recording capacity. On the other hand, a lower limit value of the average value of the ratio RS of the total area $S_{SB}$ of the plurality of servo bands SB with respect to the area S of the surface of the magnetic layer 43 is preferably 0.8% or more from the viewpoint of securing five or more servo bands SB.

The average value of the ratio $R_S$ of the total area $S_{SB}$ of the plurality of servo bands SB with respect to the area S of the entire surface of the magnetic layer 43 is obtained as follows. First, the magnetic tape MT accommodated in the cartridge 10 is rolled out, and the magnetic tape MT is cut into a length of 250 mm from each of a range of 10 m to 20 m, a range of 30 m to 40 m, and a range of 50 m to 60 m in the longitudinal direction from the connected portion 21 between the magnetic tape MT and the leader tape LT thereby to produce three samples. Next, each sample is developed by using a ferricolloid developer (manufactured by Sigma Hi-chemical; SigMarker Q), each developed sample is then observed with an optical microscope, and the servoband width $W_{SB}$ and the number of servo bands SB are measured. Next, the ratio RS of each sample is obtained from the following equation.

Ratio $RS[\%] = (((\text{servo bandwidth } W_{SB}) \times (\text{the number of servo bands } SB))/(\text{width of the magnetic tape } MT)) \times 100$ Next, an arithmetic mean of the ratios RS of the three samples is obtained thereby to calculate an average value of the ratios RS.

The number of servo bands SB is, for example, 5+4n (where n is an integer of 0 or more) or more. The number of servo bands SB is preferably 5 or more, and more preferably 9 or more. When the number of servo bands SB is 5 or more, it is possible to minimize the influence on the servo signal due to the change in the size of the magnetic tape MT in the width direction, and it is possible to secure stable recording/reproducing characteristics with fewer off-track errors. The upper limit value of the number of servo bands SB is not particularly limited, and is, for example, 33 or less.

The number of servo bands SB is obtained as follows. First, the magnetic tape MT accommodated in the cartridge 10 is rolled out, and the magnetic tape MT is cut into a length of 250 mm from a range of 30 m to 40 m in the longitudinal direction from the connected portion 21 between the magnetic tape MT and the leader tape LT thereby to produce a sample. Next, the sample is developed similarly to the above method for calculating the ratio RS, and the number of servo bands SB is then measured.

From the viewpoint of securing a high recording capacity, the upper limit value of average value of the servo bandwidth $W_{SB}$ is preferably 95 μm or less, more preferably 60 μm or less, and still more preferably 30 μm or less. The lower limit value of the average value of the servo bandwidth $W_{SB}$ is preferably 10 μm or more. It is difficult to manufacture the head unit 56 capable of reading a servo signal of the servo bandwidth $W_{SB}$ of less than 10 μm.

The average value of the servo band width $W_{SB}$ is obtained as follows. First, the servo band widths $W_{SB}$ of three samples are obtained similarly to the above method for calculating the ratio $R_S$. Next, an arithmetic means of the servo band widths $W_{SB}$ of the three samples is obtained and thereby to calculate the average value of the servo band widths $W_{SB}$.

Figure 5:
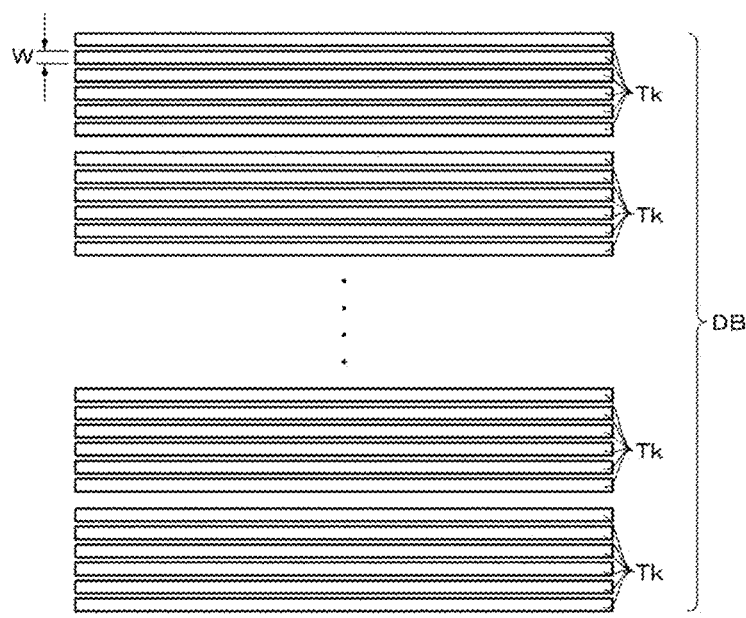
FIG. 5 is an enlarged view illustrating an example of a configuration of a data band.

As illustrated in FIG. 5, the magnetic layer 43 is configured such that a plurality of data tracks Tk can be formed in the data band DB. From the viewpoint of improving a track recording density and securing a high recording capacity, the upper limit value of the average value the data track width W is preferably 1,500 nm or less, more preferably 1,000 nm or less, still more preferably 800 nm or less, and particularly preferably 600 nm or less. The lower limit value of the average value of the data track width W is preferably 20 nm or more in consideration of the magnetic particle size.

From the viewpoint of securing a high recording capacity, the magnetic layer 43 has a configuration in which data can be recorded so that the minimum value L of the distance between magnetization reversals is preferably 40 nm or less, more preferably 36 nm or less, and still more preferably 32 nm or less. The lower limit value of the minimum value L of the distance between magnetization reversals is preferably 20 nm or more in consideration of the magnetic particle size.

The average value of the data track width W is obtained as follows. First, the cartridge 10 with data recorded on the entire surface of the magnetic tape MT is prepared, the magnetic tape MT is rolled out from the cartridge 10, and the magnetic tape MT is cut into a length of 250 mm from each of a range of 10 m to 20 m, a range of 30 m to 40 m, and a range of 50 m to 60 m in the longitudinal direction from the connected portion 21 between the magnetic tape MT and the leader tape LT thereby to produce three samples. Then, the data recording pattern at the data band DB part of the magnetic layer 43 of each sample is observed by using a magnetic force microscope (MFM), and MFM images are obtained. As the MFM, Dimension 3100 (commercially available from Digital Instruments) and its analysis software are used. The measurement region of the MFM image is set to 10 μm×10 μm, and the 10 μm×10 μm measurement region is divided into 512×512 (=262,144) measurement points. Measurement based on the MFM is conducted on a measurement region of 10 μm×10 μm in each sample, that is, three MFM images are obtained. Analysis software bundled in Dimension 3100 is used to measure track widths at 10 locations in the thus obtained three MFM images, and an average value (simple average) is obtained. The average value is the average value of the data track widths W. Note that the conditions for the above measurement based on the MFM are as follows. Sweep speed: 1 Hz, Used chip: MFMR-20, Lift height: 20 nm, Correction: Flatten order 3.

The minimum value L of the distance between magnetization reversals is obtained as follows. First, the cartridge 10 with data recorded on the entire surface of the magnetic tape MT is prepared, the magnetic tape MT is rolled out from the cartridge 10, and the magnetic tape MT is cut into a length of 250 mm from each of a range of 10 m to 20 m, a range of 30 m to 40 m, and a range of 50 m to 60 m in the longitudinal direction from the connected portion 21 between the magnetic tape MT and the leader tape LT thereby to produce three samples. Next, the data recording pattern at the data band DB part on the magnetic layer 43 in each sample is observed by using a magnetic force microscope (MFM), and MFM images are obtained. As the MFM, Dimension 3100 and analysis software thereof manufactured by Digital Instruments are used. The measurement region on each MFM image is set to 2 μm×2 μm, and the measurement region of 2 μm×2 μm is split into 512×512 (=262,144) measurement points. Measurement based on the MFM is conducted on the measurement region of 2 μm×2 μm in each sample, that is, three MFM images are obtained. 50 inter-bit distances are measured from the two-dimensional unevenness chart of the recording pattern of the obtained MFM image. The inter-bit distance is measured using analysis software bundled in Dimension 3100. The value that is approximately the greatest common divisor of the measured 50 inter-bit distances is the minimum value L of the distance between magnetization reversals. Note that the measurement conditions are as follows. Sweep speed: 1 Hz, Used chip: MFMR-20, Lift height: 20 nm, Correction: Flatten order 3.

The servo pattern is a magnetized region, which is formed by magnetizing a specific region of the magnetic layer 43 in a specific direction by a servo writer during magnetic tape manufacture. A region where no servo pattern is formed in the servo bands SB (hereinafter, referred to as a "non-pattern region") may be a magnetized region where the magnetic layer 43 is magnetized or may be a non-magnetized region where the magnetic layer 43 is not magnetized. In a case where the non-pattern region is the magnetized region, the servo pattern formation region and the non-pattern region are magnetized in different directions (in opposite directions, for example).

Figure 6:
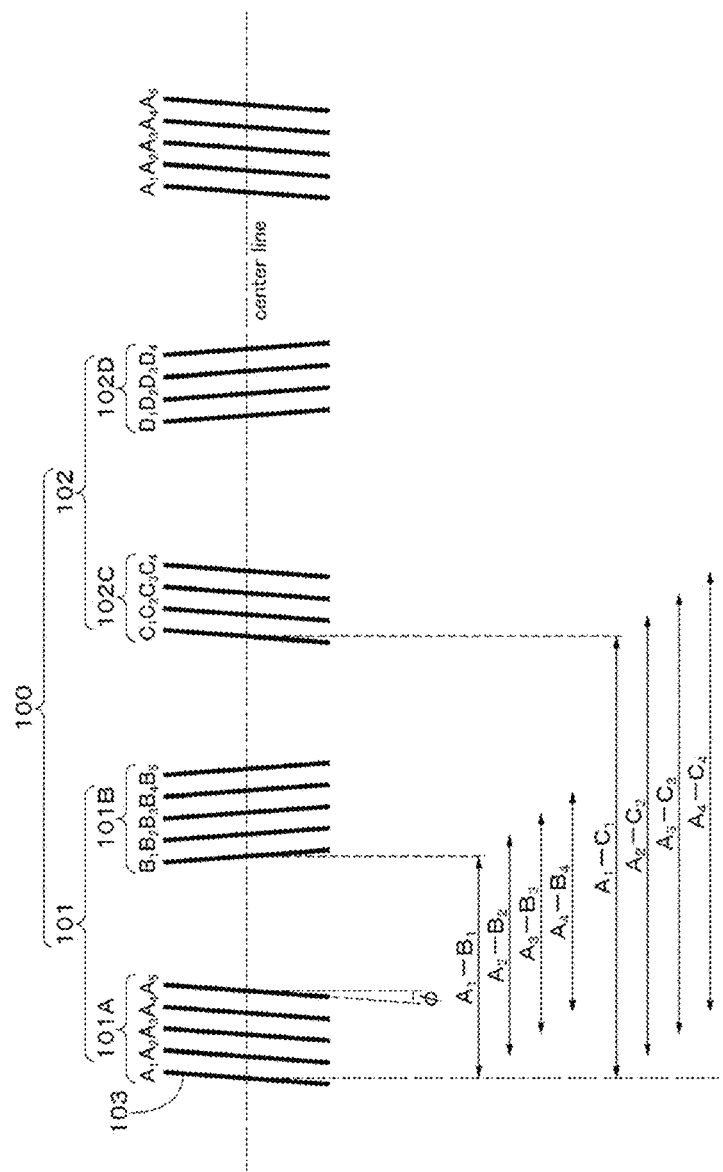
FIG. 6 is an enlarged view illustrating an example of a configuration of a servo band.

In the LTO standard, a servo pattern including a plurality of servo stripes (linear magnetized region) 113 inclined with respect to the width direction of the magnetic tape MT is formed in the servo band SB as illustrated in FIG. 6.

The servo bands SB include a plurality of servo frames 100. Each servo frame 100 is configured of 18 servo stripes 103. Specifically, each servo frame 100 is configured of a subframe 1(101) and a servo subframe 2(102).

The servo subframe 1(101) is configured of an A burst 101A and a B burst 101B. The B burst 101B is disposed to be adjacent to the A burst 101A. The A burst 101A includes five servo stripes 103 formed to be inclined at a predetermined angle φ with respect to the width direction of the magnetic tape MT and spaced apart from each other at defined intervals. FIG. 6 illustrates these five servo strives 103 by applying reference signs $A_1$, $A_2$, $A_3$, $A_4$, and $A_5$ from the end of tape (EOT) to the beginning of tape (BOT) of the magnetic tape MT. Similar to the A burst 101A, the B burst 101B includes five servo pulses 63 formed at specified intervals, which are inclined at a predetermined angle φ with respect to the width direction of the magnetic tape MT. In FIG. 6, these five servo stripes 103 are indicated by the reference numerals $B_1$, $B_2$, $B_3$, $B_4$, and $B_5$ from the EOT to the BOT of the magnetic tape MT. The servo stripe 103 of the B burst 101B is inclined in the direction opposite to the servo stripe 103 of the A burst 101A. That is, the servo stripe 103 of the A burst 101A and the servo stripe 103 of the B burst 101B are disposed in an inverted V-shape.

The servo subframe 2 (102) includes a C burst 102C and a D burst 102D. The D burst 102D is disposed adjacent to the C burst 102C. The C burst 102C includes four servo stripes 103 formed at specified intervals, which are inclined at a predetermined angle φ with respect to the width direction of the tape. In FIG. 6, these four servo stripes 103 are indicated by the reference numerals $C_1$, $C_2$, $C_3$, and $C_4$ from EOT to BOT of the magnetic tape MT. Like the C burst 102C, the D burst 102D includes four servo stripes 63 formed at specified intervals, which are inclined at a predetermined angle φ with respect to the width direction of the tape. In FIG. 6, these four servo stripes 103 are indicated by the reference numerals $D_1$, $D_2$, $D_3$, and $D_4$ from EOT to BOT of the magnetic tape MT. The servo stripe 103 of the D burst 102D and the servo stripe 103 of the C burst 102C are inclined in directions opposite to each other. That is, the servo stripe 103 of the C burst 102C and the servo stripe 103 of the D burst 102D are disposed in an inverted V-shape.

The above predetermined angle φ of the servo stripes 103 in the A burst 101A, the B burst 101B, the C burst 102C, and the D burst 102D can be 11° or more and 40° or less, preferably 11° or more and 36° or less, more preferably 11° or more and 25° or less, and yet more preferably 17° or more and 25° or less, for example.

Information for acquiring the tape speed and the position of the head unit 56 in the vertical direction is obtained by reading the servo bands SB with the head unit 56. The tape speed is calculated from times between four timing signals (A1-C1, A2-C2, A3-C3, and A4-C4). The position of the head unit 56 is calculated from the aforementioned times between the four timing signals and times between other four timing signals (A1-B1, A2-B2, A3-B3, and A4-B4). The servo pattern may have a shape including two parallel lines.

As illustrated in FIG. 6, it is preferable that the servo patterns (that is, the plurality of servo stripes 103) be linearly arranged in the longitudinal direction of the magnetic tape MT. That is, it is preferable that the servo band SB have a linear shape in the longitudinal direction of the magnetic tape MT.

An upper limit value of an average thickness of the magnetic layer 43 is preferably 90 nm or less, more preferably 80 nm or less, further preferably 70 nm or less, particularly preferably 60 nm or less, and most preferably 50 nm or less. When the upper limit value of the average thickness of the magnetic layer 43 is 90 nm or less, the influence of the diamagnetic field can be reduced in a case where a ring-type head is used as a recording head, and it is thus possible to obtain yet better electromagnetic conversion characteristics.

The lower limit value of the average thickness of the magnetic layer 43 is preferably 35 nm or more. When the lower limit value of the average thickness of the magnetic layer 43 is 35 nm or more, an output can be secured in a case where an MR-type head is used as a reproducing head, and it is thus possible to obtain yet better electromagnetic conversion characteristics.

The average thickness of the magnetic layer 43 is obtained as follows. First, the magnetic tape MT accommodated in the cartridge 10 is rolled out, and the magnetic tape MT is cut into a length of 250 mm from each of a range of 10 m to 20 m, a range of 30 m to 40 m, and a range of 50 m to 60 m in the longitudinal direction from the connected portion 21 between the magnetic tape MT and the leader tape LT thereby to produce three samples. Next, each sample is worked by the FIB method or the like to slice the sample. In the case where the FIB method is used, carbon layers and a tungsten layer are formed as protective films as preprocessing for observing a TEM image of a section, which will be described later. The carbon layers are formed on the surface of the magnetic tape MT on the side of the magnetic layer 43 and on the surface thereof on the side of the back layer 44 by the vapor deposition method, and the tungsten layer is further formed on the surface on the side of the magnetic layer 43 by the vapor deposition method or the sputtering method. The slicing is performed in the length direction (longitudinal direction) of the magnetic tape MT. That is, according to the slicing, a cross section parallel to both the longitudinal direction and the thickness direction of the magnetic tape MT is formed.

The cross section of the obtained sliced sample is observed under a transmission electron microscope (TEM) according to the following conditions to obtain a TEM image of each sliced sample. Here, the magnification and the acceleration voltage may be appropriately adjusted according to the type of the device.

Device: TEM (H9000NAR commercially available from Hitachi, Ltd.)
Acceleration voltage: 300 kV
Magnification: 100,000 times Next, a TEM image of each obtained sliced sample is used to measure the thickness of the magnetic layer 43 at ten positions of each sliced sample. Note that the ten measurement positions of each sliced sample are randomly selected from each sample such that the positions are different from each other in the longitudinal direction of the magnetic tape MT. An average value obtained by arithmetically averaging the obtained measurement values (the thicknesses of the magnetic layer 43 at a total of thirty points) of each obtained sliced sample is defined as an average thickness [nm] of the magnetic layer 43.

(Magnetic Powder)

The magnetic powder contains a plurality of magnetic particles. The magnetic particles are particles containing a metal oxide (hereinafter, referred to as "metal oxide powder"), for example. The metal oxide particles are, for example, particles containing hexagonal ferrite (hereinafter, referred to as "hexagonal ferrite particles), particles containing epsilon-type iron oxide (ε-iron oxide) (hereinafter, referred to as "ε-iron oxide particles"), or particles containing Co-containing spinel ferrite (hereinafter, referred to as "cobalt ferrite particles). The magnetic powder preferably has crystal orientation with priority in the vertical direction of the magnetic tape MT. In the specification, the vertical direction (thickness direction) of the magnetic tape MT means the thickness direction of the magnetic tape MT in a planar state.

(Hexagonal Ferrite Particles)

The hexagonal ferrite particles have, for example, a plate shape such as a hexagonal plate shape or a columnar shape such as a hexagonal columnar shape (however, the thickness or the height is smaller than the long diameter of the plate surface or the bottom surface). In the specification, the hexagonal plate shape includes a substantially hexagonal plate shape. The hexagonal ferrite preferably contains at least one of Ba, Sr, Pb and Ca, and more preferably at least one of Ba and Sr. Specifically, the hexagonal ferrite may be, for example, barium ferrite or strontium ferrite. The barium ferrite may further contain at least one of Sr, Pb and Ca in addition to Ba. The strontium ferrite may further contain at least one of Ba, Pb and Ca in addition to Sr.

More specifically, the hexagonal ferrite has an average composition represented by a general formula of $MFe_{12}O_{19}$. Here, M is, for example, at least one metal of Ba, Sr, Pb and Ca, and preferably at least one metal of Ba and Sr. M may be a combination of Ba, and at least one metal selected from the group consisting of Sr, Pb and Ca. In addition, M may be a combination of Sr, and at least one metal selected from the group consisting of Ba, Pb and Ca. In the above general formula, some of Fe may be replaced with other metal elements.

In a case where the magnetic powder contains hexagonal ferrite particles, the average particle size of the magnetic powder is preferably 13 nm or more and 22 nm or less, more preferably 13 nm or more and 19 nm or less, yet more preferably 13 nm or more and 18 nm or less, particularly preferably 14 nm or more and 17 nm or less, and particularly preferably 14 nm or more and 16 nm or less. If the average particle size of the magnetic powder is 22 nm or less, it is possible to yet better electromagnetic conversion characteristics (an SNR, for example) in the magnetic tape MT with a high-recording density. On the other hand, if the average particle size of the magnetic powder is 13 nm or more, dispersibility of the magnetic powder is further improved, and it is possible to yet better electromagnetic conversion characteristics (an SNR, for example).

In a case where the magnetic powder contains hexagonal ferrite particle powder, the average aspect ratio of the magnetic powder is preferably 1.0 or more and 3.0 or less, more preferably 1.5 or more and 2.8 or less, and still more preferably 1.8 or more and 2.7 or less. When the average aspect ratio of the magnetic powder is in a range between 1.0 or more and 3.0 or less, aggregation of the magnetic powder can be suppressed In addition, when the magnetic powder is vertically oriented in the formation process of the magnetic layer 43, resistance to be applied to the magnetic powder can be suppressed. Thus, a vertical orientation property of the magnetic powder can be improved.

In the case where the magnetic powder contains hexagonal ferrite particles, the average particle size and the average aspect ratio of the magnetic powder are obtained as follows. First, the magnetic tape MT accommodated in the cartridge 10 is rolled out, and the magnetic tape MT is cut from a range of 30 m to 40 m in the longitudinal direction from the connected portion 21 between the magnetic tape MT and the leader tape LT. Subsequently, the cut magnetic tape MT is worked and sliced by the FIB method or the like. In a case where the FIB method is used, carbon layers and a tungsten layer are formed as a protective films as pre-processing for observing a TEM image of a section, which will b described later. The carbon layers are formed on the surface of the magnetic tape MT on the side of the magnetic layer 43 and the surface thereof on the side of the back layer 44 by the vapor deposition method, and the tungsten layer is further formed on the surface on the side of the magnetic layer 43 by the vapor deposition method or the sputtering method. The slicing is performed in the length direction (longitudinal direction) of the magnetic tape MT. That is, according to the slicing, a cross section parallel to both the longitudinal direction and the thickness direction of the magnetic tape MT is formed.

The above section of the obtained sliced sample is observed such that the entire magnetic layer 43 is included in the thickness direction of the magnetic layer 43 with an acceleration voltage of 200 kV and a total magnification of 500,000 times by using a transmission electron microscope (H-9500 manufactured by Hitachi High Technologies Co., Ltd.), and TEM photographs are captured. The number of TEM photographs to be prepared is a number with which 50 particles from which the plate diameters DB and the plate thicknesses DA (see FIG. 7) described below can be measured can be extracted.

Figure 7:
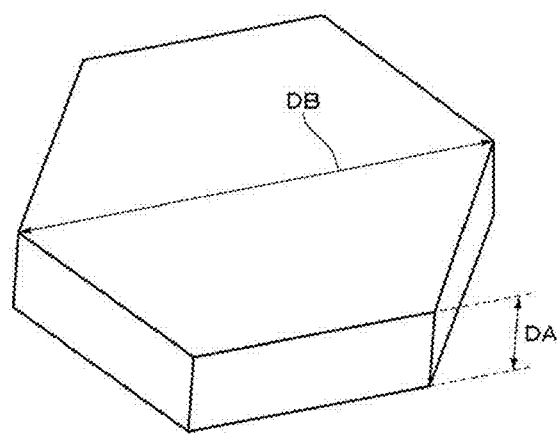
FIG. 7 is a perspective view illustrating an example of a shape of particles.

In the specification, in a case where the shape of the particles observed in the above TEM photographs is a plate shape or a columnar shape (where the thickness or the height is smaller than the long diameter of the plate surface or the bottom surface) as illustrated in FIG. 7, the long diameter of the plate surface or the bottom surface of each particle is defined as a value of the plate diameter DB. The thickness or the height of the particles observed in the above TEM photographs are defined as the value of the plate thickness DA. In a case where the plate surface or the bottom surface of the particles observed in the TEM photographs is a hexagonal shape, the long diameter means the longest diagonal distance. In a case where the particle thickness or height of one particle is not constant, the maximum thickness or height of the particle is defined as the plate thickness DA.

Next, 50 particle to be extracted from the captured TEM photographs are picked up on the basis of the following criteria. Particles that partially stick out of the fields of view of the TEM photographs are not measured, and particles with clear outlines that are independently present are measured. In a case where particles overlap each other, each of particles having clear boundary therebetween and having the entire shapes in a distinguishable manner is measured as an independent particle, while particles having unclear boundary and having the entire shapes in an indistinguishable manner are not measured because the shapes of the particles cannot be determined.

Figure 8:
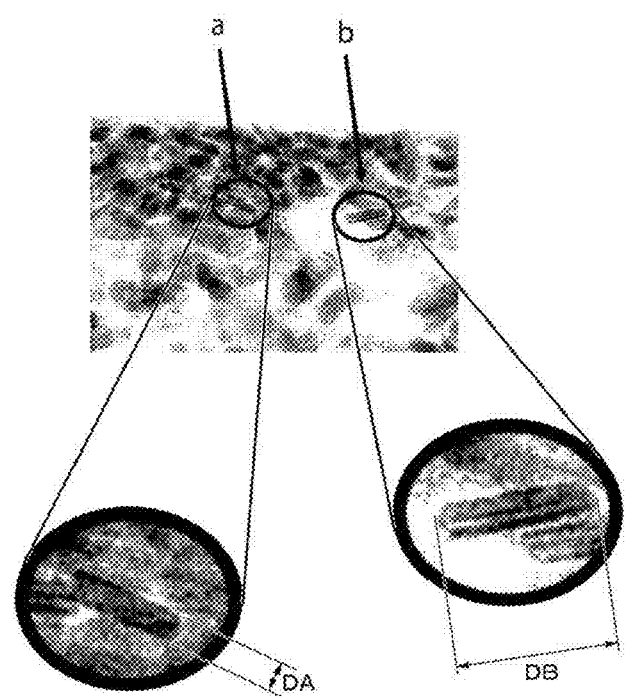
FIG. 8 is a diagram illustrating an example of a TEM photograph of a magnetic layer.
Figure 9:
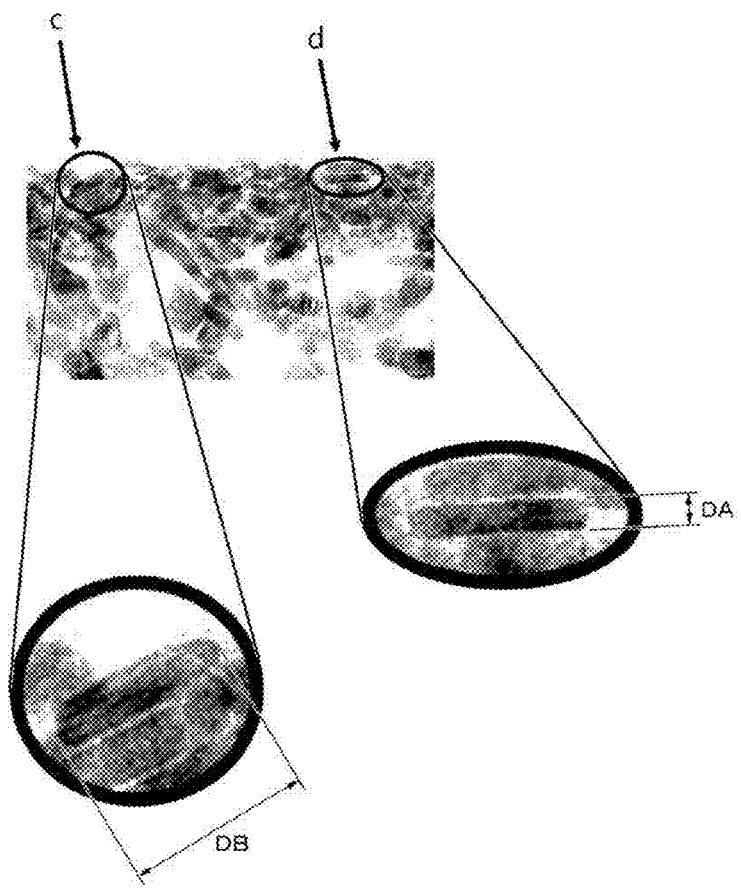
FIG. 9 is a diagram illustrating an example of a TEM photograph of the magnetic layer.

FIGS. 8 and 9 illustrate examples of the TEM photographs. In FIGS. 8 and 9, the particles illustrated by the arrows a and d, for example, are selected since the plate thicknesses of the particles (the thicknesses or the heights of the particles) DA can be clearly checked. The plate thickness DA of each of the selected 50 particles is measured. Thus obtained plate thicknesses DA are arithmetically averaged thereby to obtain an average plate thickness $DA_{ave}$. The average plate thickness $DA_{ave}$ is the average particle plate thickness. Next, a plate diameter DB of the magnetic powder is measured. In order to measure the plate diameter DB of the particles, 50 particles with the plate diameters DB that can be clearly checked are picked up from the captured TEM photographs. For example, the particles illustrated b the arrows b and c, for example, are selected in FIGS. 8 and 9 because the plate diameters DB thereof can be clearly checked. The plate diameter DB of each of the 50 selected particles is measured. The thus obtained pate diameters DB are simply averaged (arithmetically averaged) thereby to obtain an average plate diameter $DB_{ave}$. The average plate diameter $DB_{ave}$ is an average particle size. Then, an average aspect ratio ($DB_{ave}/DA_{ave}$) is obtained from the average plate thickness $DA_{ave}$ and the average plate diameter $DB_{ave}$.

In a case where the magnetic powder contains hexagonal ferrite particle powder, an average particle volume of the magnetic powder is preferably 500 nm$^3$ or more and 2500 nm$^3$ or less, more preferably 500 nm$^3$ or more and 1600 nm$^3$ or less, further preferably 500 nm$^3$ or more and 1500 nm$^3$ or less, particularly preferably 600 nm$^3$ or more and 1200 nm$^3$ or less, and most preferably 600 nm$^3$ or more and 1000 nm$^3$ or less. When the average particle volume of the magnetic powder is 2500 nm$^3$ or less, effects similar to those in a case where the average particle size of the magnetic powder is set to 22 nm or less are obtained. On the other hand, when the average particle volume of the magnetic powder is 500 nm$^3$ or more, effects similar to those in a case where the average particle size of the magnetic powder is set to 13 nm or more are obtained.

The average particle volume of the magnetic powder is obtained as follows. First, as described in regard to the above method of calculating the average particle size of the magnetic powder, an average plate thickness $DA_{ave}$ and an average plate diameter $DB_{ave}$ are obtained. Next, an average volume V of a magnetic powder is obtained by the following formula.

$$V = \frac{3\sqrt{3}}{8} \times DA_{ave} \times DB_{ave} \times DB_{ave} \qquad \text{[Math. 1]}$$

(ε-iron oxide particles)

ε-iron oxide particles are hard magnetic particles from which it is possible to obtain a high coercive force even though they are fine particles. The ε-iron oxide particles have a spherical shape or a cubic shape. In the specification, the spherical shape is assumed to include a substantially spherical shape. Since the ε-iron oxide particles have the shape as described above, it is possible to reduce the contact area between the particles in the thickness direction of the magnetic tape MT and to curb aggregation of the particles in a case where the ε-iron oxide particles are used as the magnetic particles as compared with a case where barium ferrite particles with a hexagonal plate shape are used as the magnetic particles. Therefore, it is possible to enhance dispersibility of the magnetic powder and to obtain yet better electromagnetic conversion characteristics (an SNR, for example).

The ε-iron oxide particles have a core-shell type structure. Specifically, the ε-iron oxide particles have a core part and a shell part having a two-layer structure provided around the core part. The shell part having a two-layer structure has a first shell part provided on the core part and a second shell part provided on the first shell part.

The core part contains ε-iron oxide. The ε-iron oxide contained in the core part is preferably composed of ε—$Fe_2O_3$ crystal as a main phase, and more preferably composed of single-phase ε—$Fe_2O_3$.

The first shell part covers at least a part of the periphery of the core part. Specifically, the first shell part may partially cover the periphery of the core part or may cover the entire periphery of the core part. In order to make exchange coupling between the core part and the first shell part sufficient and improve magnetic characteristics, it is preferable to cover the entire surface of the core part.

The first shell part is a so-called soft magnetic layer, and contains, for example, a soft magnetic component such as α-Fe, Ni—Fe alloys or Fe—Si—Al alloys. α-Fe may be obtained by reducing the ε-iron oxide contained in the core part. The second shell part is an oxide film as an antioxidant layer. The second shell part contains α-iron oxide, aluminum oxide or silicon oxide. α-iron oxide contains at least one kind of ion oxide from among $Fe_3O_4$, $Fe_2O_3$, and FeO. In a case where the first shell part contains α-Fe (soft magnetic component), the α-iron oxide may be obtained by oxidizing α-Fe contained in the first shell part.

Since the ε-iron oxide particles have the first shell part as described above, a coercive force Hc of the core part alone is kept at a large value in order to secure thermal stability, and the coercive force Hc of the entire ε-iron oxide particles (core-shell particles) can be adjusted to a coercive force Hc suitable for recording. In addition, since the ε-iron oxide particles have the second shell part as described above, it is possible to curb deterioration of the characteristics of the ε-iron oxide particles due to the ε-iron oxide particles being exposed to the air, and rust and the like being generated on the surfaces of the particles in a process of producing the magnetic tape MT and before the process. Therefore, it is possible to minimize deterioration of characteristics of the magnetic tape MT.

The ε-iron oxide particles may have a shell part having a single-layer structure. In this case, the shell part has the same configuration as the first shell part. Here, from the viewpoint of minimizing deterioration of characteristics of the ε-iron oxide particles, it is preferable for the ε-iron oxide particles to have a shell part having a two-layer structure as described above.

The ε-iron oxide particles may contain an additive in place of the core-shell structure, or may contain an additive together with the core-shell structure. In this case, some of Fe of the ε-iron oxide particles is replaced with an additive. Even when the ε-iron oxide particles contain an additive, since the coercive force Hc of the entire ε-iron oxide particles can be adjusted to a coercive force Hc suitable for recording, it is possible to improve ease of recording. The additive is a metal element other than iron, preferably a trivalent metal element, more preferably at least one of Al, Ga and In, and still more preferably at least one of Al and Ga.

Specifically, the ε-iron oxide containing an additive is an ε—$Fe_{2-x}M_xO_3$ crystal (where M is a metal element other than iron, preferably a trivalent metal element, more preferably at least one kind from among Al, Ga and In, and still more preferably at least one kind from among Al and Ga; x satisfies, for example, 0<x<1).

In the case where the magnetic powder contains ε-iron oxide particles, the average particle size of the magnetic powder is preferably 10 nm or more 20 nm or less, more preferably 10 nm or more and 18 nm or less, yet more preferably 10 nm or more and 16 nm or less, particularly preferably 10 nm or more and 15 nm or less, and most preferably 10 nm or more and 14 nm or less. In the magnetic tape MT, a region with a size of ½ the recording wavelength is an actual magnetized region. Therefore, it is possible to obtain yet better electromagnetic conversion characteristics (an SNR, for example) by setting the average particle size of the magnetic powder to half the shortest recording wavelength or less.

Therefore, if the average particle size of the magnetic powder is 20 nm or less, it is possible to obtain yet better electromagnetic conversion characteristics (an SNR, for example) in the magnetic tape MT with a high recording density (the magnetic tape MT configured such that signals can be recorded thereon with the shortest recording wavelength of 40 nm or less, for example). On the other hand, if the average particle size of the magnetic powder is 10 nm or more, dispersibility of the magnetic powder is further improved, and it is possible to obtain yet better electromagnetic conversion characteristics (an SNR, for example).

In a case where the magnetic powder contains ε-iron oxide particles, an average aspect ratio of the magnetic powder is preferably 1.0 or more and 3.0 or less, more preferably 1.0 or more and 2.5 or less, yet more preferably 1.0 or more and 2.1 or less, and particularly preferably 1.0 or more and 1.8 or less. When the average aspect ratio of the magnetic powder is in a range between 1.0 or more and 3.0 or less, aggregation of the magnetic powder can be suppressed In addition, when the magnetic powder is vertically oriented in the formation process of the magnetic layer 43, resistance to be applied to the magnetic powder can be suppressed. Thus, a vertical orientation property of the magnetic powder can be improved.

In the case where the magnetic powder contains ε-iron oxide particle powder, the average particle size and the average aspect ratio of the magnetic powder are obtained as follows. First, the magnetic tape MT accommodated in the cartridge 10 was rolled out, and the magnetic tape MT was cut from a range of 30 m to 40 m in the longitudinal direction from the connected portion 21 between the magnetic tape MT and the leader tape LT. Then, the cut magnetic tape MT is worked and sliced by the focused ion beam (FIB) method or the like. In a case where the FIB method is used, carbon layers and a tungsten layer are formed as protective layers as pre-processing for observing a TEM image of a section, which will be described later. The carbon layers are formed on the surface of the magnetic tape MT on the side of the magnetic layer 43 and on the surface thereof on the side of the back layer 44, and the tungsten layer is further formed on the surface on the side of the magnetic layer 43 by the vapor deposition method or the sputtering method. The slicing is performed in the length direction (longitudinal direction) of the magnetic tape MT. That is, according to the slicing, a cross section parallel to both the longitudinal direction and the thickness direction of the magnetic tape MT is formed.

The above section of the obtained sliced sample is observed such that the entire magnetic layer 43 is included in the thickness direction of the magnetic layer 43 with an acceleration voltage of 200 kV and a total magnification of 500,000 times by using a transmission electron microscope (H-9500 manufactured by Hitachi High Technologies Co., Ltd.), and TEM photographs are captured. Next, 50 particles with shapes that can be clearly checked are picked up from the captured TEM photographs, and a major axis length DL and a minor axis length DS of each particle are measured. Here, the major axis length DL means the maximum distance (so-called a maximum Feret diameter) from among the distances between two parallel lines drawn at all angles to come into contact with the outline of each particle. On the other hand, the minor axis length DS means the maximum particle lengths in a direction perpendicularly intersecting the major axis (DL) of the particle. Subsequently, an average major axis length DL ave is obtained by arithmetically averaging these measured major axis lengths DL of the 50 particles. The average major axis length DL ave obtained in this manner is set to be an average particle size of the magnetic powder. In addition, an average minor axis length $DS_{ave}$ is obtained by arithmetically averaging these measured minor axis lengths DS of the 50 particles. Then, an average aspect ratio ($DL_{ave}/DS_{ave}$) of a particle is obtained from the average major axis length $DL_{ave}$ and the average minor axis length $DS_{ave}$.

In the case where the magnetic powder contains the ε-iron oxide particles, an average particle volume of the magnetic powder is preferably 500 nm$^3$ or more and 4000 nm$^3$ or less, more preferably 500 nm$^3$ or more and 3000 nm$^3$ or less, yet more preferably 500 nm$^3$ or more and 2000 nm$^3$ or less, particularly preferably 600 nm$^3$ or more and 1600 nm$^3$ or less, and most preferably 600 nm$^3$ or more and 1300 nm$^3$ or less. Since noise of the magnetic tape MT is inversely proportional to a square root of the number of particles (that is, proportional to a square root of the particle volume), it is thus possible to obtain yet better electromagnetic conversion characteristics (an SNR, for example) by further reducing the particle volume. Thus, if the average particle volume of the magnetic powder is 4000 nm$^3$ or less, yet better electromagnetic conversion characteristics (an SNR, for example) can be obtained similarly to a case where the average particle size of the magnetic powder is set to 20 nm or less. On the other hand, if the average particle volume of the magnetic powder is 500 nm$^3$ or more, effects similar to those in a case where the average particle size of the magnetic powder is set to 10 nm or more are obtained.

In a case where the ε-iron oxide particle has a spherical shape, the average particle volume of the magnetic powder is obtained as follows. First, an average major axis length DL ave is obtained in the same manner as in the method of calculating the average particle size of the magnetic powder. Next, an average volume V of the magnetic powder is obtained by the following formula.

$$V=(\pi/6) \times DL_{ave}^3$$

In a case where the ε-iron oxide particles have a cubic shape, the average volume of the magnetic powder is obtained as follows. First, the magnetic powder MT accommodated in the cartridge 10 is rolled out, and the magnetic tape MT is cut from a range of 30 m to 40 m in the longitudinal direction from the connected portion 21 between the magnetic tape MT and the leader tape LT. Then, the cut magnetic tape MT is worked and sliced by a focused ion beam (FIB) method or the like. In a case where the FIB method is used, carbon films and a tungsten thin film as protective films are formed as pre-processing for observing a TEM image of a section, which will be described later. The carbon films are formed on the surface of the magnetic tape MT on the side of the magnetic layer 43 and on the surface thereof on the side of the back layer 44 by the vapor deposition method, and the tungsten thin film is further formed on the surface thereof in the side of the magnetic layer 43 by the vapor deposition method or the sputtering method. The slicing is performed in the length direction (longitudinal direction) of the magnetic tape MT. That is, according to the slicing, a cross section parallel to both the longitudinal direction and the thickness direction of the magnetic tape MT is formed.

The cross section of the obtained sliced sample is observed such that the entire magnetic layer 43 is included in the thickness direction of the magnetic layer 43 with an acceleration voltage of 200 kV and a total magnification of 500,000× by using a transmission electron microscope (H-9500 manufactured by Hitachi High Technologies Co., Ltd.), and a TEM photograph is captured. Here, the magnification and the acceleration voltage may be appropriately adjusted according to the type of the device. Next, 50 particles having a clear particle shape are selected from the captured TEM photograph, and a side length DC of each particle is measured. Subsequently, an average side length DC ave is obtained by arithmetically averaging the measured side lengths DC of the 50 particles. Next, an average volume $V_{ave}$ of the magnetic powder (particle volume) is obtained from the following formula using the average side length $DC_{ave}$.

$$V_{ave}=DC_{ave}^3$$

(Cobalt Ferrite Particles)

The cobalt ferrite particles preferably have uniaxial crystal anisotropy. When the cobalt ferrite particles have uniaxial crystal anisotropy, the magnetic powder can be crystal-oriented preferentially in the vertical direction of the magnetic tape MT. The cobalt ferrite particles have, for example, a cube shape. In this specification, the cube shape includes a substantially cube shape. The Co-containing spinel ferrite may further contain at least one of Ni, Mn, Al, Cu and Zn in addition to Co.

The Co-containing spinel ferrite has, for example, an average composition represented by the following formula.

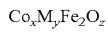

$Co_xM_yFe_2O_z$ (where, in the formula, M is, for example, at least one metal among Ni, Mn, Al, Cu and Zn; x is a value in a range of 0.4≤x≤1.0; y is a value in a range of 0≤y≤0.3; here, x and y satisfy a relationship of (x+y)≤1.0; z is a value in a range of 3≤z≤4; and some of Fe may be replaced with other metal elements).

In a case where the magnetic powder contains cobalt ferrite particle powder, the average particle size of the magnetic powder is preferably 8 nm or more and 16 nm or less, more preferably 8 nm or more and 13 nm or less, and yet more preferably 8 nm or more and 10 nm or less. If the average particle size of the magnetic powder is 16 nm or less, it is possible to obtain yet better electromagnetic conversion characteristics (an SNR, for example) of the magnetic tape MT with a high recording density. On the other hand, if the average particle size of the magnetic powder is 8 nm or more, dispersibility of the magnetic powder is further improved, and it is possible to obtain yet better electromagnetic conversion characteristics (an SNR, for example). A method of calculating the average particle size of the magnetic powder is the same as a method of calculating the average particle size of the magnetic powder in a case where the magnetic powder contains ε-iron oxide particle powder.

In a case where the magnetic powder contains cobalt ferrite particle powder, the average aspect ratio of the magnetic powder is preferably 1.0 or more and 2.5 or less, more preferably 1.0 or more and 2.1 or less, and still more preferably 1.0 or more and 1.8 or less. When the average aspect ratio of the magnetic powder is in a range between 1.0 or more and 2.5 or less, aggregation of the magnetic powder can be suppressed In addition, when the magnetic powder is vertically oriented in the formation process of the magnetic layer 43, resistance to be applied to the magnetic powder can be suppressed. Thus, a vertical orientation property of the magnetic powder can be improved. A method of calculating the average aspect ratio of the magnetic powder is the same as a method of calculating the average aspect ratio of the magnetic powder in a case where the magnetic powder contains ε-iron oxide particle powder.

In a case where the magnetic powder contains cobalt ferrite particle powder, the average particle volume of the magnetic powder is preferably 500 nm$^3$ or more and 4000 nm$^3$ or less, more preferably 600 nm$^3$ or more and 2000 nm$^3$ or less, and yet more preferably 600 nm$^3$ or more and 1000 nm$^3$ or less. If the average particle volume of the magnetic powder is 4000 nm$^3$ or less, effects similar to those in a case where the average particle size of the magnetic powder is set to 16 nm or less are obtained. On the other hand, when the average particle volume of the magnetic powder is 500 nm$^3$ or more, the same effects as in a case where the average particle size of the magnetic powder is set to 8 nm or more are obtained. A method of calculating the average particle volume of the magnetic powder is the same as a method of calculating an average particle volume in a case where a ε-iron oxide particle has a cube shape.

(Binding Agent)

Examples of the binding agent include thermoplastic resins, thermosetting resins, reactive resins, and the like. Examples of thermoplastic resins include vinyl chloride, vinyl acetate, vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinyl chloride-vinylidene chloride copolymers, acrylic acid ester-acrylonitrile copolymers, acrylic acid ester-vinylidene chloride copolymers, methacrylic acid ester-vinylidene chloride copolymers, methacrylic acid ester-vinyl chloride copolymers, methacrylic acid ester-ethylene copolymers, polyvinyl fluoride, vinylidene chloride-acrylonitrile copolymers, acrylonitrile-butadiene copolymers, polyamide resins, polyvinyl butyral, cellulose derivatives (cellulose acetate butyrate, cellulose diacetate, cellulose triacetate, cellulose propionate, nitrocellulose), styrene butadiene copolymers, polyurethane resins, polyester resins, amino resins, and synthetic rubber.

Examples of thermosetting resins include phenolic resins, epoxy resins, polyurethane curable resins, urea resins, melamine resins, alkyd resins, silicone resins, polyamine resins, and urea formaldehyde resins.

In all of the above-described binding agent, for the purpose of improving dispersibility of the magnetic powder, —SO$_3$M, —OSO$_3$M, —COOM, P=O(OM)$_2$ (where M in the formula represents a hydrogen atom or an alkali metal such as lithium, potassium, or sodium), a side-chain amine having a terminal group represented by —NR1R2, —NR1R2R3$^+$X$^-$, a main-chain amine represented by >NR1R2$^+$X$^-$ (where R1, R2, and R3 in the formula represent a hydrogen atom or a hydrocarbon group, and X$^-$ represents halogen element ions such as fluorine, chlorine, bromine, or iodine, inorganic ions, or organic ions.), and a polar functional group such as —OH, —SH, —CN, or an epoxy group may be introduced. The amount of these polar functional groups introduced into the binding agent is preferably $10^{-1}$ mol/g or more and $10^{-8}$ mol/g or less, and more preferably $10^{-2}$ mol/g or more and $10^{-6}$ mol/g or less.

(Lubricant)

The lubricant contains, for example, at least one selected from among fatty acids and fatty acid esters, and preferably contains both fatty acids and fatty acid esters. When the magnetic layer 43 contains a lubricant, particularly, when the magnetic layer 43 contains both fatty acids and fatty acid esters, this contributes to improving the running stability of the magnetic tape MT.

The fatty acids may be compounds represented by Formula (1) or (2) below. For example, one of the compounds represented by Formula (1) below and the compounds represented by Formula (2) may be contained as a fatty acid, or both of them may be contained.

Also, the fatty acid esters may preferably be compounds represented by Formula (3) or (4) below. For example, one of the compounds represented by Formula (3) below and the compounds represented by Formula (4) may be contained as the fatty acid esters, or both of them may be contained.

When the lubricant contains one or both of the compound represented by General Formula (1) and the compound represented by General Formula (2), and one or both of the compound represented by General Formula (3) and the compound represented by General Formula (4), it is possible to minimize an increase in the dynamic friction coefficient due to repeated recording or reproducing of the magnetic tape MT.

$$CH_3(CH_2)_k COOH \quad (1)$$

(where, in General Formula (1), k is an integer selected from the range of 14 or more and 22 or less, and more preferably selected from the range of 14 or more and 18 or less).

$$CH_3(CH_2)_n CH=CH(CH_2)_m COOH \quad (2)$$

(where, in General Formula (2), a sum of n and m is an integer selected from the range of 12 or more and 20 or less, and more preferably selected from the range of 14 or more and 18 or less).

$$CH_3(CH_2)_p COO(CH_2)_q CH_3 \quad (3)$$

(where, in General Formula (3), p is an integer selected from the range of 14 or more and 22 or less, and more preferably selected from the range of 14 or more and 18 or less, and q is an integer selected from the range of 2 or more and 5 or less, and more preferably selected from the range of 2 or more and 4 or less).

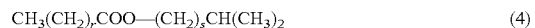

$$CH_3(CH_2)_r COO-(CH_2)_s CH(CH_3)_2 \quad (4)$$

(where, in General Formula (4), r is an integer selected from the range of 14 or more and 22 or less, and s is an integer selected from the range of 1 or more and 3 or less).

(Carbon)

Carbon contained in the magnetic layer 43 may function as an antistatic agent, a lubricant, and the like. Apart of the carbon contained in the magnetic layer 43 is exposed from the surface of the magnetic layer 43. Surface irregularity of the magnetic layer 43 may be formed by carbon, an abrasive, or the like.

Carbon is specifically carbon particles. The carbon particles include at least one or more kinds selected from a group consisting of carbon black, acetylene black, ketjen black, carbon nanotubes, and graphene, for example.

(Antistatic Agent)

Examples of the antistatic agents include a natural surfactant, a nonionic surfactant, and a cationic surfactant, for example.

(Abrasive)

Examples of abrasives include a-alumina with an a transformation rate of 90% or more, β-alumina, y-alumina, silicon carbide, chromium oxide, cerium oxide, a-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle-shaped a-iron oxides obtained by dehydrating and annealing raw materials of magnetic iron oxide, and those obtained by performing a surface treatment on the above materials with aluminum and/or silica as necessary.

(Curing Agent)

Examples of the curing agent include polyisocyanates. Examples of polyisocyanates include aromatic polyisocyanates such as adducts of tolylene diisocyanate (TDI) and an active hydrogen compound, and aliphatic polyisocyanates such as adducts of hexamethylene diisocyanate (HMDI) and an active hydrogen compound. The weight average molecular weight of these polyisocyanates is preferably within a range of 100 or more and 3,000 or less.

(Antirust Agent)

Examples of antirust agents include phenols, naphthols, quinones, heterocyclic compounds containing nitrogen atoms, heterocyclic compounds containing oxygen atoms, and heterocyclic compounds containing sulfur atoms.

(Non-Magnetic Reinforcing Particles)

Examples of non-magnetic reinforcing particles include aluminum oxide (α, β or y alumina), chromium oxide, silicon oxide, diamond, garnet, emery, boron nitride, titanium carbide, silicon carbide, titanium carbide, and titanium oxide (rutile type or anatase type titanium oxide).

(Underlayer)

The underlayer 42 is provided to alleviate the unevenness of the surface of the substrate 41 and adjust the unevenness of the surface of the magnetic layer 43. The underlayer 42 is a non-magnetic layer containing a non-magnetic powder, a binding agent and a lubricant. According to the underlayer 42, the lubricant is supplied to the surface of the magnetic layer 43. The underlayer 42 may further contain at least one additive among an antistatic agent, a curing agent, an antirust agent, and the like, as necessary.

The upper limit value of the average thickness of the underlayer 42 is preferably 1.0 μm or less, more preferably 0.9 μm or less, further preferably 0.8 μm or less, particularly preferably 0.7 μm or less, and most preferably 0.6 μm or less. If the upper limit value of the average thickness of the underlayer 42 is 1.0 μm or less, it is possible to reduce the thickness of the magnetic tape MT and thereby to enhance the recording capacity with which recording can be performed in one data cartridge as compared with a typical magnetic tape. If the average thickness of the underlayer 42 is 1.0 μm or less, the degree of expansion and contraction of the magnetic tape MT further increases due to an external force, and it is thus easier to adjust the width of the magnetic tape MT by adjusting the tension. The lower limit value of the average thickness of the underlayer 42 is preferably 0.3 m or more. If the lower limit value of the average thickness of the underlayer 42 is 0.3 μm or more, it is possible to curb deterioration of functions as the underlayer 42. Here, the average thickness of the underlayer 42 is obtained similarly to the average thickness of the magnetic layer 43. Here, the magnification of the TEM image is appropriately adjusted according to the thickness of the underlayer 42.

(Non-Magnetic Powder)

The non-magnetic powder contains, for example, at least one of inorganic particle powder and inorganic particle powder. In addition, the non-magnetic powder may contain carbon powder such as carbon black. Here, one type of non-magnetic powder may be used alone, or two or more types of non-magnetic powders may be used in combination. Examples of inorganic particles include metals, metal oxides, metal carbonates, metal sulfates, metal nitrides, metal carbides and metal sulfides. Examples of shapes of non-magnetic powders include various shapes such as a needle shape, a spherical shape, a cube shape, and a plate shape, but the present disclosure is not limited to these shapes.

(Binding Agent and Lubricant)

The binding agent and the lubricant are similar to those of the above magnetic layer 43.

(Additive)

The antistatic agent, the curing agent, and the antirust agent are similar to those of the above magnetic layer 43.

(Back Layer)

The back layer 44 contains a binding agent and a non-magnetic powder. The back layer 44 may further contain at least one additive among a lubricant, a curing agent, an antistatic agent, and the like, as necessary. The binding agent and the non-magnetic powder are similar to those of the above underlayer 42. The curing agent and the antistatic agent are similar to those of the above magnetic layer 43.

The average particle size of the non-magnetic powder is preferably 10 nm or more and 150 nm or less, and more preferably 15 nm or more and 110 nm or less. The average particle size of the non-magnetic powder is obtained in the same manner as the above-described average particle size of the magnetic powder. The non-magnetic powder may contain a non-magnetic powder having a particle size distribution of 2 or more.

An upper limit value of an average thickness of the back layer 44 is preferably 0.6 μm or less. If the upper limit value of the average thickness of the back layer 44 is 0.6 μm or less, the thicknesses of the underlayer 42 and the substrate 41 can be kept thick even when an average thickness of the magnetic tape MT is 5.3 μm or less, and thus running stability in the recording/reproducing device of the magnetic tape MT can be maintained. A lower limit value of an average thickness of the back layer 44 is not particularly limited, but is, for example, 0.2 μm or more.

The average thickness $t_b$ of the back layer 44 is obtained as follows. First, the average thickness $t_T$ of the magnetic tape MT is measured. A method for measuring the average thickness tT is as described in "Average thickness of magnetic tape" below. Next, the magnetic tape MT accommodated in the cartridge 10 is rolled out, and the magnetic tape MT is cut into a length of 250 mm from each of a range of 10 m to 20 m, a range of 30 m to 40 m, and a range of 50 m to 60 m in the longitudinal direction from the connected portion 21 between the magnetic tape MT and the leader tape LT thereby to produce three samples. Next, the back layer 44 of each sample is removed by a solvent such as methyl ethyl ketone (MEK) or a dilute hydrochloric acid. Then, the thickness of each sample is measured at five points by using a Laser Hologage (LGH-110C) manufactured by Mitutoyo, and the measurement values (the thicknesses at a total of 15 point) is arithmetically averaged to calculate an average value $t_B$ [μm]. Then, the average thickness $t_b$ [μm] of the back layer 44 is obtained from the following formula. Note that the five measurement positions are randomly selected from each sample such that the positions are different from each other in the longitudinal direction of the magnetic tape MT.

$$t_b[\mu m] = t_T[\mu m] - t_B[\mu m]$$

(Amount of Change in Average Width ΔA)

The amount of change in average width ΔA of the magnetic tape MT before and after the magnetic tape MT is left still for 40 hours in an environment at a temperature of 50° C. and a relative humidity of 40% RH in a state where a tension of 0.55 N is applied in the longitudinal direction is 0 ppm or more and 170 ppm or less, preferably 0 ppm or more and 140 ppm or less, more preferably 0 ppm or more and 70 ppm or less, and yet more preferably 0 ppm or more and 30 ppm or less. If the amount of change in average width ΔA of the magnetic tape MT exceeds 170 ppm, a creep change of the magnetic tape MT when the magnetic tape MT wound around the cartridge 10 is stored for a long period of time in a high-temperature environment and a creep change of the magnetic tape MT when the magnetic tape MT is caused to run for a long period of time in a high-temperature environment increase. Therefore, a change in width of the magnetic tape MT that has been saved for a long period of time in the high-temperature environment in a state where the magnetic tape MT is wound around the cartridge 10 and of the magnetic tape MT that has been caused to run for a long period of time in the high-temperature environment exceeds a range in which the changes can be corrected by adjusting a running tension in the longitudinal direction. Therefore, it is difficult to correct the above change in width by adjusting the running tension in the longitudinal direction. In the specification, the high-temperature environment means an environment at 35° C. or more and 50° or less.

In the magnetic tape in the related art, a change in shape due to the creep properties is large in the high-temperature environment. Therefore, it is difficult to correct a change in width of the magnetic tape by adjusting the running tension of the magnetic tape. On the other hand, since the amount of change in average width ΔA of the magnetic tape MT is 170 ppm or less in the magnetic tape MT according to the first embodiment, it is possible to reduce the creep deformation in the high-temperature environment as well as deformation of the magnetic tape MT due to the environment. Therefore, it is possible to correct the change in width of the magnetic tape MT by adjusting the running tension of the magnetic tape MT.

The amount of change in average width ΔA may be set to a desired value by selecting at least one of the substrate 41 and the underlayer 42. For example, the amount of change in average width ΔA may be set to a desired value by selecting at least one of the thickness of the substrate 41 and the material of the substrate 41. Also, the amount of change in average width ΔA may be set to a desired value by adjusting extension strengths of the substrate 41 in the width direction and in the longitudinal direction. Additionally, the amount of change in average width ΔA may be set to a desired value by selecting the type of the magnetic layer 43 from a coating film and a sputtered film.

Also, the amount of change in average width ΔA may be set to a desired value by including a strain alleviation process after the calendering process and before the cutting process and adjusting the environment temperature and the storage time in the strain alleviation process (for example, the magnetic tape MT is stored for 48 hours in an environment at a temperature of 65° C.). Also, the amount of change in average width ΔA may be set to a desired value by including the strain alleviation process after the demagnetization process and before writing of the servo pattern and adjusting the environment temperature and the storage time in the strain alleviation process (for example, the magnetic tape MT is stored for 48 hours in an environment at a temperature of 55° C.).

Note that the amount of change in average width ΔA may be set to a desired value by selecting one of the above plurality of selection examples, or the amount of change in average width ΔA may be set to a desired value by selecting two or more therefrom.

The amount of change in average width ΔA of the magnetic tape MT is obtained as follows. First, the magnetic tape MT accommodated in the cartridge 10 is rolled out, and the magnetic tape MT is cut into a length of 250 mm from each of a range of 10 m to 20 m, a range of 30 m to 40 m, and a range of 50 m to 60 m in the longitudinal direction from the connected portion 21 between the magnetic tape MT and the leader tape LT thereby to acquire three samples.

Figure 10:
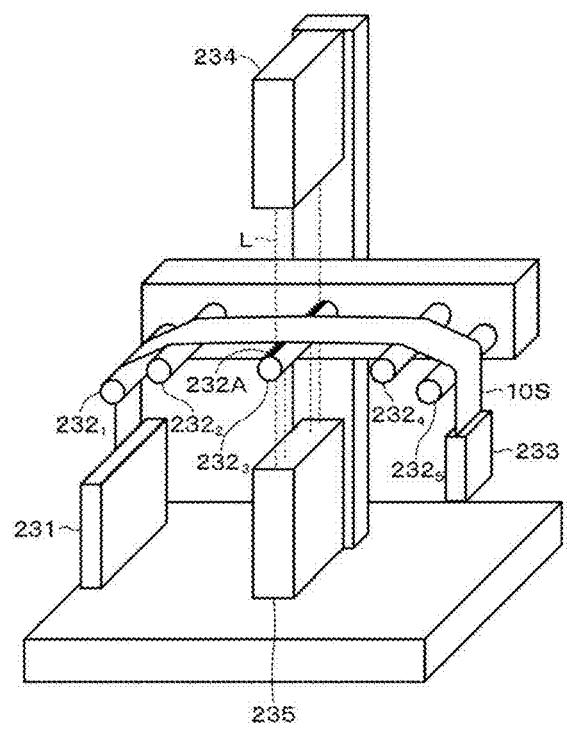
FIG. 10 is a perspective view illustrating a configuration of a measurement device.

Next, the amounts of change in average width ΔA of the above three samples are obtained as follows. First, a sample 10S is set in a measurement device in which a digital dimension measurement device LS-7000 manufactured by Keyence Corporation is incorporated as illustrated in FIG. 10 as a measurement device. Specifically, one end of the long sample (magnetic tape MT) 10S is fixed by a fixing portion 231. Next, the sample 10S is placed on the five substantially cylindrical and rod-shaped support members $232_1$ to $232_5$, as illustrated in FIG. 10. The sample 10S is placed on these support members $232_1$ to $232_5$ such that the back surfaces thereof come into contact with the five support members $232_1$ to $232_5$. All the five support members $232_1$ to $232_5$ (particularly, the front surfaces thereof) are formed of stainless steel SUS304, and the surface roughness Rz (maximum heights) thereof ranges from 0.15 μm to 0.3 μm.

Disposition of the five rod-shaped support members $232_1$ to $232_5$ will be described with reference to FIG. 10. As illustrated in FIG. 10, the sample 10S is placed on the five support members $232_1$ to $232_5$. The five support members $232_1$ to $232_5$ will be referred to as a "first support member $232_1$", a "second support member $232_2$", a "third support member $232_3$" (having a slit 232A), a "fourth support member $232_4$", and a "fifth support member $232_5$" (located closest to a weight 233) from the one located closest to the fixing portion 231 below. The diameter of all these five support members, namely the first to fifth support members $232_1$ to $232_5$ is 7 mm. A distance d1 between the first support member $232_1$ and the second support member $232_2$ (particularly, the distance between center axes of these support members) is 20 mm. A distance d2 between the second support member $232_2$ and the third support member $232_3$ is 30 mm. A distance d3 between the third support member $232_3$ and the fourth support member $232_4$ is 30 mm. A distance d4 between the fourth support member $232_4$ and the fifth support member $232_5$ is 20 mm.

First, the three support members $232_2$ to $232_4$ are disposed such that parts of the sample 10S placed among the second support member $232_2$, the third support member $232_3$, and the fourth support member $232_4$ form a plane that is substantially perpendicular to the gravity direction. Also, the first support member $232_1$ and the second support member $232_2$ are disposed such that the sample 10S forms an angle $\theta1=30°$ with respect to the substantially perpendicular plane between the first support member $232_1$ and the second support member $232_2$. Furthermore, the fourth support member $232_4$ and the fifth support member $232_5$ are disposed such that the sample 10S forms an angle $\theta2=30°$ with respect to the above substantially perpendicular plane between the fourth support member $232_4$ and the fifth support member $232_5$. Additionally, the third support member $232_3$ from among the five support members, namely the first to fifth support members $232_1$ to $232_5$ is fixed to prevent rotation thereof, and all the other four support members, namely the first, second, fourth, and fifth support members $232_1$, $232_2$, $232_4$, and $232_5$ can rotate. Since the support member $232_3$ is fixed to prevent rotation thereof as described above, a contact angle between the support $232_3$ and the sample 10S is reduced in consideration of reduction of abrasion between the support $232_3$ and the sample 10S.

The sample 10S is held such that the sample 10S does not move in the width direction of the sample 10S on the support members $232_1$ to $232_5$. Note that the support member $232_3$ which is located between a light emitter 234 and a light receiver 235 and is located substantially at the center between the fixing portion 231 and a part on which a load is to be applied from among the support members $232_1$ to $232_5$ is provided with a slit 232A. The light receiver 235 is adapted to be irradiated with light L from the light emitter 234 via the slit 232A. The slit width of the slit 232A is 1 mm, and the light L can pass through the slit 232A without being blocked by the frame of the slit 232A.

Next, after the measurement device is accommodated in the chamber in a room-temperature environment (a temperature of 25° C., a relative moisture of 50% RH), the weight 233 for applying a load of 0.55 N is attached to the other end of the sample 10S, and the sample 10S is left still for 30 minutes in the above room-temperature environment. After the sample 10S is left still for 30 minutes, the temperature in the chamber is raised, and measurement of the width of the sample 10S is started at the timing when a defined environment (a temperature of 50° C., a relative moisture of 40% RH) is achieved in the chamber. The measurement of the width of the sample 10S is continued until 40 hours are exceeded after the start of the above measurement while the inside of the chamber is maintained as the above defined environment (a temperature of 50° C., a relative moisture of 40% RH).

The measurement device irradiates the light receiver 235 with the light L from the light emitter 234 in a state where a load of 0.55 N is applied in the above defined environment, and measures the width of the sample 10S to which the load is applied in the longitudinal direction. The measurement of the width is performed in a state where the sample 10S is not curled. The light emitter 234 and the light receiver 235 are included in the digital dimension measurement device LS-7000.

Next, the amount of change in width Δa of the sample 10S after elapse of 40 hours from a timing when the above measurement is started with reference to the width of the sample 10S at the timing when the above measurement is started (that is, the timing when the above defined environment is achieved in the chamber) is calculated by using the result of measuring the width of the sample 10S acquired as described above. Next, the amounts of change in width Δa of the three samples 10S calculated as described above are arithmetically averaged thereby to obtain the amount of change in average width ΔA of the magnetic tape MT.

(Average Tension Responsiveness ΔW)

The lower limit value of the average tension responsiveness ΔW with respect to the tension in the longitudinal direction in an environment at a temperature of 50° C. and a relative humidity of 40% RH is 700 ppm/N or more, more preferably 715 ppm/N or more, more preferably 750 ppm/N or more, and yet more preferably 800 ppm/N or more. If the average tension responsiveness ΔW is less than 700 ppm/N, the average tension responsiveness ΔW in a high-temperature environment is low, and it is difficult to correct a creep change of the magnetic tape MT when the magnetic tape MT wound around the cartridge 10 is stored for a long period of time at the high-temperature environment and a creep change of the magnetic tape MT when the magnetic tape MT is caused to run for a long period of time in the high-temperature environment by adjusting the running tension. The high-temperature environment means an environment at 35° C. or more and 50° or less as described above in the specification.

The upper limit value of the average tension responsiveness ΔW is 1700000 ppm/N or less or 20000 ppm/N or less, preferably 15000 ppm/N or less, more preferably 8000 ppm/N or less, 5000 ppm/N or less, 4000 ppm/N or less, 3000 ppm/N or less, or 2000 ppm/N or less, for example. If the average tension responsiveness ΔW is 15000 ppm/N or less, it is possible to reduce the amount of change in width of the magnetic tape MT with respect to the variations even in a case where there are variations in tension control of the recording reproducing device.

The average tension responsiveness ΔW may be set to a desired value by selecting at least one of the substrate 41 and the underlayer 42. For example, the average tension responsiveness ΔW may be set to a desired value by selecting at least one of the thickness of the substrate 41 and the material of the substrate 41. Also, the average tension responsiveness ΔW may be set to a desired value by adjusting extension strengths of the substrate 41 in the width direction and in the longitudinal direction. For example, the average tension responsiveness ΔW is reduced by strengthening the extension of the substrate 41 in the width direction while the average tension responsiveness ΔW is raised by strengthening the extension of the substrate 41 in the longitudinal direction. Also, the average tension responsiveness ΔW may be set to a desired value by selecting the type of the magnetic layer 43 out of a coating film and a sputtered film.

Also, the average tension responsiveness ΔW may be set to a desired value by including a strain alleviation process after the calendering process and before the cutting process and adjusting the environment temperature and the storage time (for example, the sample is stored in an environment at a temperature of 65° C. for 48 hours) in the strain alleviation process. Additionally, the average tension responsiveness ΔW may be set to a desired value by including a strain alleviation process after the demagnetization process and before the writing of the servo pattern and adjusting the environment temperature and the storage time (for example, the sample is stored in an environment at a temperature of 55° C. for 48 hours) in the strain alleviation process.

Note that the average tension responsiveness ΔW may be set to a desired value by selecting one of the above plurality of selection examples, or the average tension responsiveness ΔW may be set to a desired value by selecting two or more.

The average tension responsiveness ΔW is obtained as follows. First, the magnetic tape MT with a width of ½ inches accommodated in the cartridge 10 is rolled out, and the magnetic tape MT is cut into a length of 250 mm from each of a range of 10 m to 20 m, a range of 30 m to 40 m, and a range of 50 m to 60 m in the longitudinal direction from the connected portion 21 between the magnetic tape MT and the leader tape LT thereby to acquire three samples.

Next, tension responsiveness Δw of the three samples is obtained as follows. Loads of 0.2 N, 0.6 N, and 1.0 N are applied to the sample 10S in the longitudinal direction in this order, and the widths of the sample 10S under the loads of 0.2 N, 0.6 N, and 1.0 N are measured. Then, tension responsiveness Δw is obtained by the following formula. Note that the measurement in the case where the load of 0.6 N is applied is performed in order to check whether no abnormality occurs in the measurement (particularly, in order to check that these three measurement results are linearly aligned), and the measurement result is not used in the following formula.

$$\Delta w[\text{ppm/N}] = \frac{D(0.2\text{N})[\text{mm}] - D(1.0\text{N})[\text{mm}]}{D(0.2\text{N})[\text{mm}]} \times \frac{1,000,000}{(1.0[\text{N}]) - (0.2[\text{N}])}$$

[Math. 2]

(where D (0.2 N) and D (1.0 N) indicate widths of the sample 10S when the loads of 0.2 N and 1.0 N are applied in the longitudinal direction of the sample 10S.)

Next, the tension responsiveness Δw of the three samples obtained as described above is arithmetically averaged thereby to obtain an average tension responsiveness ΔW.

The width of the sample 10S when each load is applied is measured as follows. First, a measurement device in which a digital dimension measurement device LS-7000 manufactured by Keyence Corporation is incorporated as illustrated in FIG. 10 is prepared as a measurement device, and the sample 10S is set on the measurement device. A specific configuration of the measurement device is similar to that in the method for measuring the amount of change in average width ΔA described above. Moreover, the specific procedure for setting the sample 10S in the measurement device is also similar to that in the method for measuring the amount of change in average width ΔA described above.

Subsequently, the measurement device is accommodated in a chamber controlled under a specific environment at a temperature of 50° C. and a relative humidity of 40% RH, the weight 233 for applying a load of 0.2 N is attached to the other end of the sample 10S, and the sample 10S is left still in the above environment for 2 hours. After the sample 10S is left still for 2 hours, the width of the sample 10S is measured. Next, the weight to apply the load of 0.2 N is replaced with the weight 233 to apply the load of 0.6 N, and the width of the sample 10S is measured 5 minutes after the change. Finally, the weight is replaced with the weight 233 to apply a load of 1.0 N, and the width of the sample 10S is measured 5 minutes after the change.

As described above, it is possible to change the load to be applied in the longitudinal direction of the sample 10S by adjusting the weights of the weights 233. The light receiver 235 is irradiated with the light L from the light emitter 234 in the state where each load is applied in the constant environment at the temperature of 50° C. and at the relative humidity of 40% RH, and the width of the sample 10S with the load applied thereto in the longitudinal direction is measured. The measurement of the width is performed in a state where the sample 10S is not curled. The light emitter 234 and the light receiver 235 are included in the digital dimension measurement device LS-7000.

(Average Storage Elastic Modulus of Substrate in Longitudinal Direction)

The upper limit value of the average storage elastic modulus of the substrate 41 in the longitudinal direction in an environment at a temperature of 50° C. is preferably 9.0 GPa or less, more preferably 7.5 GPa or less, yet more preferably 6.0 GPa or less, particularly preferably 5.5 GPa or less, and most preferably 4.5 GPa or less. If the upper limit value of the storage elastic modulus is 9.0 GPa or less, stretchability of the magnetic tape MT with respect to the tension in the longitudinal direction is enhanced in a high-temperature environment, and it is thus possible to improve the average tension responsiveness ΔW.

The lower limit value of the average storage elastic modulus of the substrate 41 in the longitudinal direction in the environment at a temperature of 50° C. is preferably 3.0 GPa or more and more preferably 3.5 GPa or more. If the upper limit value of the storage elastic modulus is 3.0 GPa or more, it is possible to curb an excessive increase in stretchability of the magnetic tape MT with respect to the tension in the longitudinal direction. It is thus possible to curb degradation of running stability.

The average storage elastic modulus of the magnetic tape MT in the longitudinal direction is a value indicating a lower likelihood of expansion and contraction of the magnetic tape MT in the longitudinal direction due to an external force, and when this value is larger, the magnetic tape MT is less likely to expand and contract in the longitudinal direction due to an external force, and when this value is smaller, the magnetic tape MT is more likely to expand and contract in the longitudinal direction due to an external force.

Note that although the average storage elastic modulus of the magnetic tape MT in the longitudinal direction is a value related to the magnetic tape MT in the longitudinal direction, it also correlates with a lower likelihood of expansion and contraction of the magnetic tape MT in the width direction. That is, when this value is larger, the magnetic tape MT is less likely to expand and contract in the width direction due to an external force, and when this value is smaller, the magnetic tape MT is more likely to expand and contract in the width direction due to an external force. Therefore the average storage elastic modulus of the magnetic tape MT in the longitudinal direction is small as described above and is advantageously 9.0 GPa or less from the viewpoint of the adjustment of the tension.

The average storage elastic modulus of the magnetic tape MT in the longitudinal direction is obtained as follows. First, the magnetic tape MT with a width of ½ inches accommodated in the cartridge 10 is rolled out, the magnetic tape MT is punched into a defined size from each of a range of 10 m to 20 m, a range of 30 m to 40 m, and a range of 50 m to 60 m in the longitudinal direction from the connected portion 21 between the magnetic tape MT and the leader tape LT, and three samples are thereby acquired. Next, the storage elastic modulus E' of the substrate 41 in the longitudinal direction of each of the above three samples in an environment at a temperature of 50° C. is measured. Then, the measured storage elastic moduli E' of the three samples are arithmetically averaged thereby to obtain an average storage elastic modulus of the substrate 41 in the longitudinal direction in the environment at the temperature of 50° C.

The above storage elastic modulus E' is measured by dynamic viscoelasticity measurement. The above dynamic viscoelasticity measurement is temperature-dependent measurement, and specifically, it is performed as follows. The magnetic tape MT is punched by a puncher, and a sample with a length of 22.0 mm in the tape longitudinal direction and a width of 4.0 mm in the width direction is thereby acquired. Both ends of the sample in the longitudinal direction are cramped by measurement parts of a dynamic viscoelasticity measurement device (RSAII manufactured by TA Instruments). Then, the dynamic viscoelasticity measurement is performed under the following measurement conditions.

Measurement temperature range: −10° C. or more and 140° C. or less
Temperature raising speed: 2° C./minute
Amplitude: The tape is extended and contracted with an amplitude of 0.1% with respect to the tape initial length.
Measurement frequency: 10 Hz
Test type: "Strain-Controlled"
Measurement type: "Dynamic"
Environment where device is placed: At temperature of 25° C. and relative humidity of 50 RH %
Humidity control of measurement unit: None More detailed setting in regard to the measurement conditions of the above device is as follows. In other words, the tension is adjusted to prevent the tension from being 0 or less in the above measurement, and the strain is adjusted to prevent the strain from dropping below a lower limit value of a transducer as will be described below. Although the measurement conditions for adjustment may be appropriately set by those skilled in the art, setting as follows may be employed in regard to the above dynamic viscoelasticity measurement device, for example.

Figure 20:
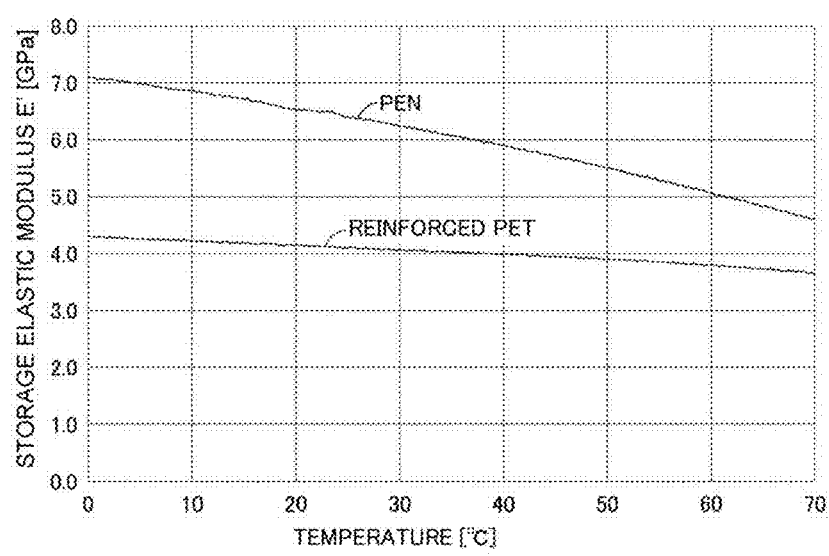
FIG. 20 is a graph illustrating results of measuring storage elastic moduli E' of a reinforced PET film and a PEN film.

Option setting
Delay Before Test: OFF
Auto Tension
Mode Static Force Tracking Dynamic Force
Auto Tension Direction Tension
Initial Static Force 10.0 g
Static>Dynamic Force by 5.0%
Minimum Static Force 1.0 g
Auto Tension Sensitivity 1.0 g
Auto Strain
Max Applied Strain 0.1%
Max Allowed Force 100.0 g
Min allowed Force 2.0 g
Strain Adjustment 3.0%
Meas Ops: Default setting The value of the storage elastic modulus E' at each measurement temperature is obtained by performing the above dynamic viscoelasticity measurement described above on the above sample. The storage elastic modulus E' at the measurement temperature of 50° C. is also obtained. It is possible to read the trend of a change in the storage elastic modulus E' accompanying a change in temperature by performing plotting using the value of storage elastic modulus E' obtained at each measurement temperature with respect to the measurement temperature. FIG. 20 illustrates an example of a result of measuring the storage elastic modulus E'.

The storage elastic modulus E' of the magnetic tape MT can be adjusted by changing the type of the material for forming the substrate 41 and/or compositions of the magnetic layer 43, the underlayer 42, and the back layer 44 (particularly, the underlayer 42 that is most likely to become thick from among these three layers) and combinations thereof, for example.

For example, it is possible to adjust the storage elastic modulus E' by using PEN, PET, or PEEK as a material for forming the substrate 41. Also, the shape of the graph plotting the storage elastic modulus E' with respect to a change in temperature may be changed depending on selection of these resins.

For example, it is possible to adjust the storage elastic modulus E' by changing the types of the resin components contained in the coating materials for forming the magnetic layer 43, the underlayer 42, and the back layer 44 (particularly, the underlayer 42) and/or adjusting the resin compositions. For example, it is possible to adjust the storage elastic modulus E' by adjusting a glass transition temperature Tg of a binding agent that can be contained in these layers. The binding agent contains, for example, a polyurethane-based resin from the viewpoint of easiness of adjustment of glass transition temperature Tg. More preferably, the underlayer 42 contains a polyurethane-based resin to thereby facilitate adjustment of the storage elastic modulus E'. Furthermore, the glass transition temperature Tg of the polyurethane-based resin contained in the underlayer 42 is preferably 10° C. or more and 140° C. or less, more preferably 30° C. or more and 130° C. or less, yet more preferably 30° C. or more and 120° C. or less, and particularly preferably 55° C. or more and 120° C. or less. In a case where the glass transition temperature Tg is excessively low, there is a likelihood of adhesion during saving at a high temperature. In a case where the glass transition temperature Tg is excessively high, it may be difficult to perform processing in surface smoothing (calendering).

(Average Thickness of Magnetic Tape)

The upper limit value of the average thickness (average total thickness) $t_T$ of the magnetic tape MT is preferably 5.2 μm or less, more preferably 5.1 μm or less, yet more preferably 4.9 μm or less, particularly preferably 4.6 μm or less, and most preferably 4.4 μm or less. When the average thickness $t_T$ of the magnetic tape MT is 5.3 μm or less, the recording capacity that can be recorded in one data cartridge can be increased as compared with a general magnetic tape. A lower limit value of an average thickness $t_T$ of the magnetic tape MT is not particularly limited, but is, for example, 3.5 μm or more.

The average thickness $t_T$ of the magnetic tape MT is obtained as follows. First, the magnetic tape MT accommodated in the cartridge 10 is rolled out, the magnetic tape MT is cut into a length of 250 mm from each of a range of 10 m to 20 m, a range of 30 m to 40 m, and a range of 50 m to 60 m in the longitudinal direction from the connected portion 21 between the magnetic tape MT and the leader tape LT thereby to produce three samples. Next, a Laser Hologage (LGH-110C) manufactured by Mitutoyo is used as a measurement device, the thickness of each sample is measured at positions of five points, the measurement values (the thicknesses of the samples at a total of fifteen points) are arithmetically averaged thereby to calculate an average thickness $t_T$ [μm]. Note that the five measurement positions are randomly selected from each sample such that the positions are different from each other in the longitudinal direction of the magnetic tape MT.

(Arithmetic Mean Roughness Ra of Surface of Magnetic Layer)

The average value of the arithmetic mean roughness Ra of the surface of the magnetic layer 43 is 1.9 nm or less, preferably 1.6 nm or less, and more preferably 1.3 nm or less. If the average value of the arithmetic mean roughness Ra is 1.9 nm, it is possible to curb degradation of output due to a spacing loss and thereby to obtain excellent electromagnetic conversion characteristics. The lower limit value of the average value of the arithmetic mean roughness Ra of the surface of the magnetic layer 43 is preferably 1.0 nm or more and more preferably 1.2 nm or more. If the lower limit value of the average value of the arithmetic mean roughness Ra of the surface of the magnetic layer 43 is 1.0 nm or more, it is possible to curb degradation of runnability due to an increase in friction.

The average value of the arithmetic mean roughness Ra is obtained as follows. First, the magnetic tape MT accommodated in the cartridge 10 is rolled out, and the magnetic tape MT is cut into a length of 250 mm from each of a range of 10 m to 20 m, a range of 30 m to 40 m, and a range of 50 m to 60 m in the longitudinal direction from the connected portion 21 between the magnetic tape MT and the leader tape LT thereby to produce three samples. The surface of the magnetic layer 43 of each sample is observed by an atomic force microscope (AFM), and an AFM image of 40 μm×40 μm is obtained. Nano Scope IIIa D3100 manufactured by Digital Instruments is used as the AFM, a cantilever made of silicon single crystal is used (Note 1), and the tapping frequency is tuned from 200 Hz to 400 Hz for the measurement. Next, each AFM image is divided into 512×512 (=262,144) measurement points, the height Z(i) (i: measurement point number, i=1 to 262,144) is measured at each measurement point, the measured height Z(i) at each measurement point is arithmetically averaged thereby to obtain an average height (average plane) Zave (=Z(1)+Z(2)+ . . . +Z(262,144))/262,144). Subsequently, a deviation Z"(i) (=Z(i)−Zave) from the average center line at each measurement point is obtained, and the arithmetic mean roughness Ra [nm](=(Z"(1)+Z"(2)+ . . . +Z"(262,144))/262,144) is calculated. At this time, data after being subjected to filtering processing by Flatten order 2 and planefit order 3 XY as image processing is used.

(Note 1) SPM Probe NCH manufactured by NanoWorld; normal type PointProbe L (cantilever length)=125 μm Next, the arithmetic mean roughness Ra of the three samples is arithmetically averaged thereby to calculate an average value of the arithmetic mean roughness Ra.

(Surface Roughness R) of Back Surface)

It is preferable that the average value of surface roughness Rb of a back surface (surface roughness of the back layer 44) satisfy $R_b \leq 6.0$ [nm]. If the average value of the surface roughness R) of the back surface is within the above range, yet better electromagnetic conversion characteristics can be obtained.

The average value of the surface roughness Rb of the back surface is obtained as follows. First, the magnetic tape MT accommodated in the cartridge 10 is rolled out, and the magnetic tape MT is cut into a length of 100 mm from each of a range of 10 m to 20 m, a range of 30 m to 40 m, and a range of 50 m to 60 m in the longitudinal direction from the connected portion 21 between the magnetic tape MT and the leader tape LT thereby to produce three samples. Next, the samples are placed on a slide glass such that measurement target surface (the surfaces on the side of the magnetic layer) face upward, and ends of the samples are fixed with mending tapes. A surface shape is measured using VertScan as a measurement device, and a surface roughness $R_b$ of a back surface is obtained from the following formula based on the ISO 25178 standard.

Measurement conditions are as follows.
Device: Non-contact roughness meter using optical interference (Non-contact surface/layer cross-sectional shape measurement system VertScan R5500GL-M100-AC manufactured by Ryoka System Co., Ltd.)
Objective lens: 20 times
Measurement region: 640×480 pixels (field of view: approximately 237 μm×178 μm field of view)
Measurement mode: phase
Wavelength filter: 520 nm
CCD: ⅓ inches
Noise removal filter: smoothing 3×3
Surface correction: Correction with quadratic polynomial approximation surface
Measurement software: VS-Measure Version 5.5.2
Analysis software: VS-viewer Version 5.5.5

$$S_a = \frac{1}{A} \int\int_A |Z(x,y)| dxdy \qquad \text{[Math. 3]}$$

As described above, after a surface roughness of each sample is measured at 5 points in the longitudinal direction of the magnetic tape MT, the average value of each arithmetic mean roughness $S_a$ (nm) automatically calculated from a surface profile obtained at each position is set to be a surface roughness $R_b$(nm) of the back surface. Note that the five measurement positions are randomly selected from each sample such that the positions are different from each other in the longitudinal direction of the magnetic tape MT. Next, the surface roughness $R_b$ obtained from the three samples is arithmetically averaged thereby to calculate an average value of the surface roughness $R_b$.

(Average Value of Coercive Force Hc2)

The upper limit value of the average value of the coercive force Hc2 of the magnetic layer 43 in the longitudinal direction of the magnetic tape MT is preferably 3,000 Oe or less, more preferably 2,000 Oe or less, still more preferably 1,900 Oe or less, and particularly preferably 1,800 Oe or less. If the average value of the coercive force Hc2 of the magnetic layer 43 in the longitudinal direction of the magnetic tape MT is 3,000 Oe or less, sufficient electromagnetic conversion characteristics can be provided even at a high recording density.

The lower limit value of the average value of the coercive force Hc2 of the magnetic layer 43 measured in the longitudinal direction of the magnetic tape MT is preferably 1,000 Oe or more. If the average value of the coercive force Hc2 of the magnetic layer 43 measured in the longitudinal direction of the magnetic tape MT is 1,000 Oe or more, demagnetization due to leakage flux from the recording head can be minimized.

The average value of the above coercive forces Hc2 is obtained as follows. First, the magnetic tape MT accommodated in the cartridge 10 is rolled out, and the magnetic tape MT is cut into a length of 250 mm from each of a range of 10 m to 20 m, a range of 30 m to 40 m, and a range of 50 m to 60 m in the longitudinal direction from the connected portion 21 between the magnetic tape MT and the leader tape LT. Three cut magnetic tapes MT are caused to overlap each other with double-sided tapes such that the orientations of the magnetic tape MT in the longitudinal direction are the same, the magnetic tapes MT are punched with a punch of <φ6.39 mm, and a measurement sample is thereby produced. At this time, marking is performed with an arbitrary ink with no magnetism such that the longitudinal direction (running direction) of the magnetic tape MT can be recognized. Then, the M-H loop of the measurement sample (the entire magnetic tape MT) corresponding to the longitudinal direction (running direction) of the magnetic tape MT is measured by using a vibrating sample magnetometer (VSM). Next, the coating films (the underlayer 42, the magnetic layer 43, the back layer 44, and the like) of the magnetic tapes MT cut as described above is wiped off by using acetone, ethanol, or the like, and only the substrate 41 is left. Then, three obtained substrates 41 are caused to overlap each other with double-sided tapes and are punched with a punch of φ6.39 mm thereby to produce a sample for correcting background (hereinafter, simply referred to as a "correction sample"). Thereafter, the M-H loop of the correction sample (substrate 41) corresponding to the longitudinal direction of the substrate 41 (the longitudinal direction of the magnetic tape MT) is measured by using a VSM.

A high sensitivity vibrating sample magnetometer "Type VSM-P7-15" (commercially available from Toei Industry Co., Ltd.) is used for measuring the M-H loop of the measurement sample (the entire magnetic tape MT) and the M-H loop of the correction sample (the substrate 41). Measurement conditions are set as follows. Measurement mode: Full loop, Maximum magnetic field: 15 kOe, Magnetic field step: 40 bits, Time constant of locking amp: 0.3 sec, Waiting time: 1 sec, MH average number: 20

After the M-H loop of the measurement sample (the entire magnetic tape MT) and the M-H loop of the correction sample (the substrate 41) are obtained, the M-H loop of the correction sample (the substrate 41) is subtracted from the M-H loop of the measurement sample (the entire magnetic tape MT) to perform background correction, and the M-H loop after background correction is obtained. A measurement/analysis program bundled in "Type VSM-P7-15" is used for calculating this background correction. The coercive force Hc2 is obtained from the obtained M-H loop after background correction. Here, for this calculation, a measurement/analysis program bundled in "Type VSM-P7-15" is used. Note that it is assumed that all of the above M-H loops are measured in an environment at 25° C.±2° C. and 50% RH±5% RH. In addition, "diamagnetic field correction" when the M-H loop is measured in the longitudinal direction of the magnetic tape MT is not performed. Next, the coercive forces Hc2 of the three samples are arithmetically averaged thereby to calculate an average value of the coercive forces Hc2.

(Average Value of Squareness Ratios S1 and S2)

The average value of the squareness ratio S1 of the magnetic layer 43 in the vertical direction of the magnetic tape MT is preferably 65% or more, more preferably 70% or more, still more preferably 75% or more, particularly preferably 80% or more, and most preferably 85% or more. If the average value of the squareness ratio S1 is 65% or more, since the vertical orientation of the magnetic powder is sufficiently improved, it is possible to obtain better electromagnetic conversion characteristics.

The average value of the squareness ratio S1 in the vertical direction of the magnetic tape MT is obtained as follows. First, the magnetic tape MT accommodated in the cartridge 10 is rolled out, and the magnetic tape MT is cut into a length of 250 mm from each of a range of 10 m to 20 m, a range of 30 m to 40 m, and a range of 50 m to 60 m in the longitudinal direction from the connected portion 21 between the magnetic tape MT and the leader tape LT. Three cut magnetic tapes MT are caused to overlap each other with double-sided tapes such that the orientations of the magnetic tape MT in the longitudinal direction are the same, the magnetic tapes MT are punched with a punch of φ6.39 mm, and a measurement sample is thereby produced. At this time, marking is performed with an arbitrary ink with no magnetism such that the longitudinal direction (running direction) of the magnetic tape MT can be recognized. Then, the M-H loop of the measurement sample (the entire magnetic tape MT) corresponding to the vertical direction (thickness direction) of the magnetic tape MT is measured by using a VSM. Next, the coating films (the underlayer 42, the magnetic layer 43, the back layer 44, and the like) of the magnetic tapes MT cut as described above is wiped off by using acetone, ethanol, or the like, and only the substrate 41 is left. Then, three obtained substrates 41 are caused to overlap each other with double-sided tapes and are punched with a punch of φ6.39 mm thereby to produce a sample for correcting background (hereinafter, simply referred to as a "correction sample"). Thereafter, the M-H loop of the correction sample (substrate 41) corresponding to the vertical direction of the substrate 41 (the vertical direction of the magnetic tape MT) is measured by using a VSM.

A high sensitivity vibrating sample magnetometer "Type VSM-P7-15" (commercially available from Toei Industry Co., Ltd.) is used for measuring the M-H loop of the measurement sample (the entire magnetic tape MT) and the M-H loop of the correction sample (the substrate 41). Measurement conditions are set as follows. Measurement mode: Full loop, Maximum magnetic field: 15 kOe, Magnetic field step: 40 bit, Time constant of locking amp: 0.3 sec, Waiting time: 1 sec, MH average number 20

After the M-H loop of the measurement sample (the entire magnetic tape MT) and the M-H loop of the correction sample (the substrate 41) are obtained, the M-H loop of the correction sample (the substrate 41) is subtracted from the M-H loop of the measurement sample (the entire magnetic tape MT) to perform background correction, and the M-H loop after background correction is obtained. A measurement/analysis program bundled in "Type VSM-P7-15" is used for calculating this background correction.

The amount of saturation magnetization Ms (emu) and the residual magnetization Mr (emu) of the obtained M-H loop after background correction are substituted into the following formula, and the squareness ratio S1(%) is calculated. Note that it is assumed that all of the above M-H loops are measured in an environment at 25° C.±2° C. and 50% RH±5% RH. In addition, "diamagnetic field correction" when the M-H loop is measured in the vertical direction of the magnetic tape MT is not measured. Here, for this calculation, a measurement/analysis program bundled in "Type VSM-P7-15" is used.

$$\text{Squareness ratio } S1(\%) = (Mr/Ms) \times 100$$

Next, the squareness ratios S1 of the three samples are arithmetically averaged thereby to calculate an average value of the squareness ratios S1.

The average value of the squareness ratio S2 of the magnetic layer 43 in the longitudinal direction (running direction) of the magnetic tape MT is preferably 35% or less, more preferably 30% or less, still more preferably 25% or less, particularly preferably 20% or less, and most preferably 15% or less. If the average value of the squareness ratio S2 is 35% or less, since the vertical orientation of the magnetic powder is sufficiently improved, it is possible to obtain better electromagnetic conversion characteristics.

The average value of the squareness ratio S2 in the longitudinal direction of the magnetic tape MT is obtained in the same manner as the average value of the squareness ratio S1 except that the M-H loop is measured in the longitudinal direction (running direction) of the magnetic tape MT and the substrate 41.

(Average Young's Modulus of Magnetic Tape in Longitudinal Direction)

The upper limit value of the average Young's modulus of the magnetic tape MT in the longitudinal direction is preferably 9.0 GPa or less, more preferably 8.0 GPa or less, still more preferably 7.5 GPa or less, and particularly preferably 7.1 GPa or less. If the average Young's modulus of the magnetic tape MT in the longitudinal direction is 9.0 GPa or less, the degree of expansion and contraction of the magnetic tape MT due to an external force further increases, and thus it is easier to adjust the width of the magnetic tape MT by adjusting the tension. Therefore, it is possible to more appropriately minimize off-track errors, and it is possible to more accurately reproduce data recorded in the magnetic tape MT. The lower limit value of the average Young's modulus of the magnetic tape MT in the longitudinal direction is preferably 3.0 GPa or more and more preferably 4.0 GPa or more. If the lower limit value of the average Young's modulus of the magnetic tape MT in the longitudinal direction is 3.0 GPa or more, it is possible to curb degradation of running stability.

The average Young's modulus of the magnetic tape MT in the longitudinal direction is a value indicating a lower likelihood of expansion and contraction of the magnetic tape MT in the longitudinal direction due to an external force, and when this value is larger, the magnetic tape MT is less likely to expand and contract in the longitudinal direction due to an external force, and when this value is smaller, the magnetic tape MT is more likely to expand and contract in the longitudinal direction due to an external force.

Here, the average Young's modulus of the magnetic tape MT in the longitudinal direction is a value related to the magnetic tape MT in the longitudinal direction, but it also correlates with a lower likelihood of expansion and contraction of the magnetic tape MT in the width direction. That is, when this value is larger, the magnetic tape MT is less likely to expand and contract in the width direction due to an external force, and when this value is smaller, the magnetic tape MT is more likely to expand and contract in the width direction due to an external force. Therefore, the average Young's modulus of the magnetic tape MT is small as described above and is advantageously 9.0 GPa or less from the viewpoint of adjusting the tension.

The average Young's modulus of the magnetic tape MT in the longitudinal direction is obtained as follows. First, the magnetic tape MT accommodated in the cartridge 10 is rolled out, and the magnetic tape MT is cut into a length of 180 mm from each of a range of 10 m to 20 m, a range of 30 m to 40 m, and a range of 50 m to 60 m in the longitudinal direction from the connected portion 21 between the magnetic tape MT and the leader tape LT thereby to acquire three samples. Next, the Young's moduli of the three samples in the longitudinal direction are measured, and the measurement values are arithmetically averaged thereby to obtain an average Young's modulus of the magnetic tape MT in the longitudinal direction.

The Young's modulus of each sample is measured as follows by using a tensile tester (AG-100D manufactured by Shimadzu Corporation). A jig capable of fixing the width (½ inches) of the tape is attached to the tensile tester, and upper and lower parts of the tape width are fixed. The distance (the length of the tape between chucks) is set to 100 mm. After the tape sample is chucked, a stress is gradually applied in a direction of pulling the sample (the sample longitudinal direction). A tensile speed is set to 0.1 mm/min. The Young's modulus is calculated using the following formula from the change in the stress and the amount of elongation in this case.

$$E(GPa) = ((\Delta N/S)/(\Delta x/L)) \times 10^{-3}$$

ΔN: Change in stress (N)
S: Cross-sectional area of test piece (mm²)
Δx: Amount of elongation (mm)
L: Distance between gripping jigs (mm)

The above sectional area S of the measurement sample is a sectional area before the pulling operation and is obtained by a product of the width (½ inches) of the measurement sample and the thickness of the measurement sample. As the range of the tensile stress when the measurement is performed, a range of a tensile stress of a linear region is set in accordance with the thickness or the like of the magnetic tape MT. Here, the range of the stress is set to 0.5 N to 1.0 N, and a change in stress (ΔN) and the amount of extension (Δx) at this time are used for calculation. Note that it is assumed that the above measurement of the Young's modulus is performed under at 25° C.±2° C. and 50% RH±5% RH.

(Average Young's Modulus of Substrate in Longitudinal Direction)

The average Young's modulus of the substrate 41 in the longitudinal direction is preferably 7.8 GPa or less, more preferably 7.0 GPa or less, still more preferably 6.6 GPa or less, and particularly preferably 6.4 GPa or less. If the average Young's modulus of the substrate 41 in the longitudinal direction is 7.8 GPa or less, the degree of expansion and contraction of the magnetic tape MT due to an external force further increases, and thus it is easier to adjust the width of the magnetic tape MT by adjusting the tension. Therefore, it is possible to more appropriately minimize off-track errors, and it is possible to more accurately reproduce data recorded in the magnetic tape MT. The lower limit value of the average Young's modulus of the substrate 41 in the longitudinal direction is preferably 2.5 GPa or more and more preferably 3.0 GPa or more. If the lower limit of the average Young's modulus of the substrate 41 in the longitudinal direction is 2.5 GPa or more, it is possible to curb degradation of running stability.

The average Young's modulus of the substrate 41 in the longitudinal direction is obtained as follows. First, the magnetic tape MT accommodated in the cartridge 10 is rolled out, and the magnetic tape MT is cut into a length of 180 mm from each of a range of 10 m to 20 m, a range of 30 m to 40 m, and a range of 50 m to 60 m in the longitudinal direction from the connected portion 21 between the magnetic tape MT and the leader tape LT thereby to produce three samples. Subsequently, the underlayer 42, the magnetic layer 43, and the back layer 44 are removed from each cut sample thereby to obtain the substrate 41. The average Young's modulus of the substrate 41 in the longitudinal direction is obtained in a procedure similar to that for the above average Young's modulus of the magnetic tape MT in the longitudinal direction, by using the substrates 41 of these three samples.

The thickness of the substrate 41 occupies half or more of the thickness of the entire magnetic tape MT. Therefore, the average Young's modulus of the substrate 41 in the longitudinal direction correlates with a lower likelihood of expansion and contraction of the magnetic tape MT due to an external force, and when this value is larger, the magnetic tape MT is less likely to expand and contract in the width direction due to an external force, and when this value is smaller, the magnetic tape MT is more likely to expand and contract in the width direction due to an external force.

Here, the average Young's modulus of the substrate 41 in the longitudinal direction is a value related to the magnetic tape MT in the longitudinal direction, and but it also correlates with a lower likelihood of expansion and contraction of the magnetic tape MT in the width direction. That is, when this value is larger, the magnetic tape MT is less likely to expand and contract in the width direction due to an external force, and when this value is smaller, the magnetic tape MT is more likely to expand and contract in the width direction due to an external force. Therefore, the average Young's modulus of the substrate 41 in the longitudinal direction is small as described above and advantageously 7.8 GPa or less from the viewpoint of adjusting the tension.

[1.4 Method of Manufacturing Magnetic Tape]

Next, an example of a method of manufacturing the magnetic tape MT having the above configuration will be described.

(Preparation Process of Coating Material)

First, an underlayer forming coating material is prepared by kneading and dispersing a non-magnetic powder, a binding agent, and the like in a solvent. Next, a magnetic layer forming coating material is prepared by kneading and dispersing a magnetic powder, a binding agent, a lubricant, a carbon, and the like in the solvent. For example, the following solvents, a dispersion device, and a kneading device can be used to prepare the magnetic layer forming coating material and the underlayer forming coating material.

Examples of solvents used to prepare the above coating materials include ketone-based solvents such as acetone, methyl ethyl ketone, methyl isobutyl ketone and cyclohexanone, alcohol-based solvents such as methanol, ethanol and propanol, ester-based solvents such as methyl acetate, ethyl acetate, butyl acetate, propyl acetate, ethyl lactate and ethylene glycol acetate, ether-based solvents such as diethylene glycol dimethyl ether, 2-ethoxyethanol, tetrahydrofuran and dioxane, aromatic hydrocarbon-based solvents such as benzene, toluene and xylene, halogenated hydrocarbon-based solvents such as methylene chloride, ethylene chloride, carbon tetrachloride, chloroform, and chlorobenzene, and the like. These may be used alone or mixed appropriately.

Although it is possible to use a kneading device such as a continuous two-axis kneader, a continuous two-axis kneader capable of realizing dilution in multiple levels, a kneader, a pressurization kneader, or a roll kneader, for example, can be used as the kneading device used to prepare the above coating material, the kneading device is not particularly limited to these devices. Also, as the dispersion device used to prepare the above-described coating materials, for example, dispersion devices such as a roll mill, a ball mill, a horizontal sand mill, a vertical sand mill, a spike mill, a pin mill, a tower mill, a pearl mill (for example, a "DCP mill" manufactured by Erich), a homogenizer, and an ultrasonic disperser can be used, but the present invention is not particularly limited to these devices.

(Coating Process)

Next, the underlayer forming coating material is applied to one main surface of the substrate 41 and is then dried thereby to form the underlayer 42. Subsequently, the magnetic layer forming coating material is applied on the underlayer 42 and is then dried thereby to form the magnetic layer 43 on the underlayer 42. Note that the magnetic field of the magnetic powder may be oriented in the thickness direction of the substrate 41 with a solenoid coil, for example, at the time of drying. Also, after the magnetic field of the magnetic powder is oriented in the running direction (longitudinal direction) of the substrate 41 with a solenoid coil, for example, the magnetic field may then be oriented in the thickness direction of the substrate 41 at the time of drying. It is possible to further improve the vertical orientation degree (that is, the squareness ratio S1) of the magnetic powder by performing the processing of orienting the magnetic powder in the longitudinal direction once in this manner. After the magnetic layer 43 is formed, the back layer 44 is formed on the other main surface of the substrate 41. Thereby, the magnetic tape MT is obtained.

The squareness ratios S1 and S2 are set to desired values by adjusting the strength of the magnetic field to be applied to the coating film of the magnetic layer forming coating material, the concentration of the solid content in the magnetic layer forming coating material, and drying conditions (a drying temperature and a drying time) of the coating film of the magnetic layer forming coating material, for example. The strength of the magnetic field to be applied to the coating film is preferably twice or more and three times or less the strength of a coercive force of the magnetic powder. In order to further increase the squareness ratio S1 (that is, in order to further lower the squareness ratio S2), it is preferable to improve the dispersion state of the magnetic powder in the magnetic layer forming coating material. Further, in order to further increase the squareness ratio S1, it is also effective to magnetize the magnetic powder at a stage before magnetic layer forming coating material is injected into an orientation device for magnetically orienting the magnetic powder. Note that the above-mentioned method of adjusting the squareness ratios S1 and S2 may be used alone or in combination of two or more.

(Curing Process)

Next, the magnetic tape MT is wound into a roll shape, and heating processing is performed on the magnetic tape MT in this state thereby to cure the underlayer 42 and the magnetic layer 43.

(Calendering Process)

Next, the obtained magnetic tape MT is subjected to calendering to smooth the surface of the magnetic layer 43.

(Cutting Process)

Next, the magnetic tape MT is cut to a predetermined width (for example, a width of ½ inches). In this manner, the magnetic tape MT is obtained.

(Demagnetization Process and Servo Pattern Writing Process)

Next, a servo pattern may be written on the magnetic tape MT after performing demagnetization of the magnetic tape MT as necessary.

[1.5 Configuration of Recording Reproducing System]

Figure 11:
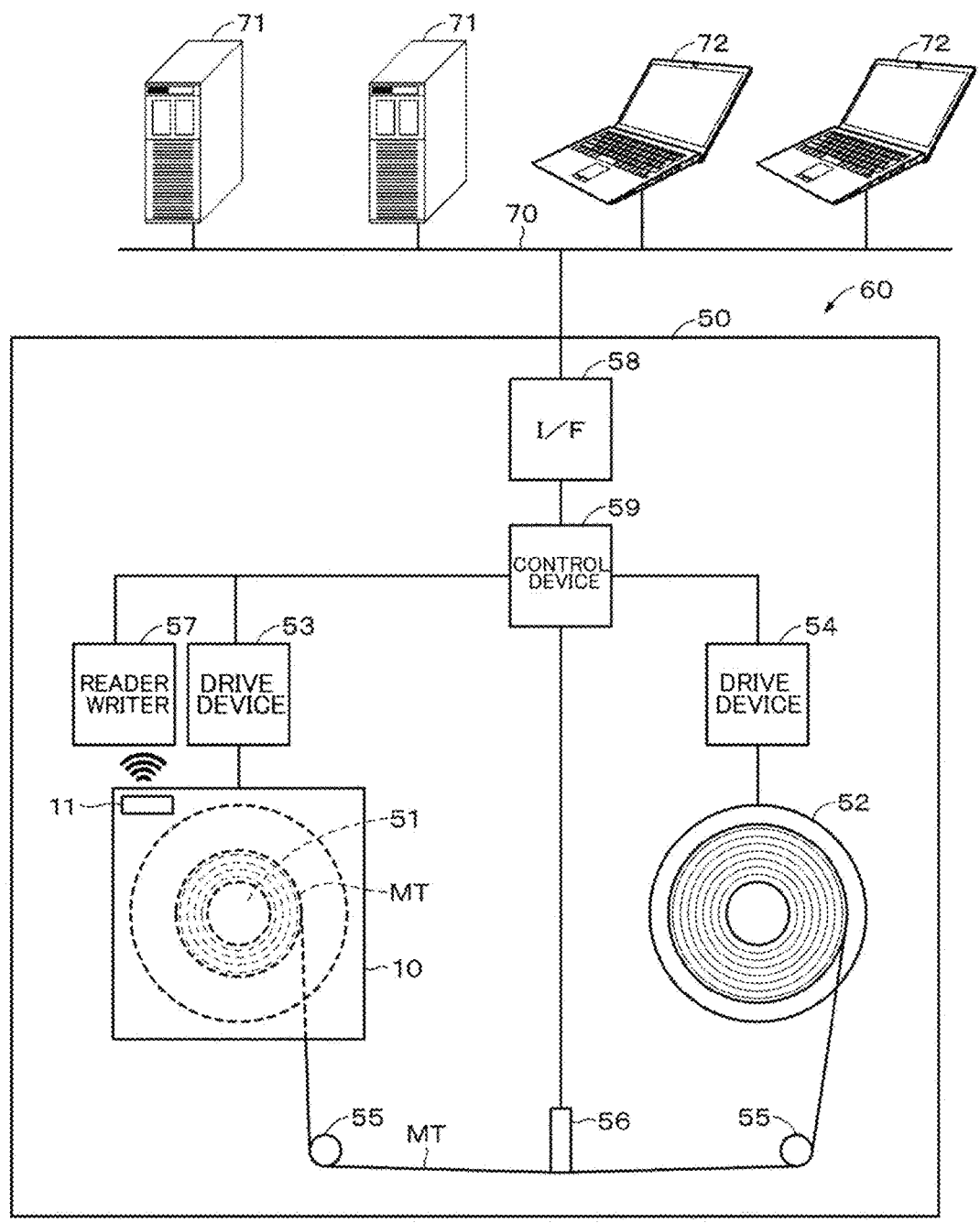
FIG. 11 is a schematic diagram illustrating an example of a configuration of a recording reproducing system.

FIG. 11 is a schematic diagram illustrating an example of a configuration of a recording reproducing system 60. The recording reproducing system 60 is a magnetic tape recording reproducing system and includes a cartridge 10 and a recording reproducing device 50 configured such that the cartridge 10 can be loaded thereon and unloaded therefrom.

[1.6 Configuration of Recording Reproducing Device]

The recording reproducing device 50 performs recording and reproducing of the magnetic tape MT having the above configuration. The recording reproducing device 50 has a configuration with which it is possible to adjust the tension to be applied in the longitudinal direction of the magnetic tape MT. Additionally, the recording reproducing device 50 has a configuration with which it is possible to fill the cartridge 10. Although a case where the recording reproducing device 50 has a configuration with which it is possible to fill one cartridge 10 will be described here for easiness of explanation, the recording reproducing device 50 may have a configuration with which it is possible to fill a plurality of cartridges 10.

The recording reproducing device 50 is connected to information processing devices such as a server 71 and a personal computer (hereinafter, referred to as a "PC") 72 via a network 70 and is configured to be able to record data supplied from these information processing devices in the cartridge 10. Also, the recording reproducing device 50 is configured to be able to reproduce data from the cartridge 10 and supply the data to the information processing devices in response to a request from these information processing devices. The shortest recording wavelength of the recording reproducing device 50 is preferably 100 nm or less, more preferably 75 nm or less, yet more preferably 60 nm or less, and particularly preferably 50 nm or less.

The recording reproducing device 50 includes a spindle 51, a reel 52 on the side of the recording reproducing device 50, a spindle drive device 53, a reel drive device 54, a plurality of guide rollers 55, a head unit 56, a reader writer 57 as a communication unit, a communication interface (hereinafter, I/F) 58, and a control device 59, as illustrated in FIG. 11.

The spindle 51 is configured such that the cartridge 10 can be attached thereto. A servo pattern with an inverted V shape is recorded in advance as a servo signal on the magnetic tape MT. The reel 52 is configured such that a distal end (leader pin 22) of the magnetic tape MT pulled out from the cartridge 10 via the tape loading mechanism (not illustrated) can be fixed thereto.

The spindle drive device 53 causes the spindle 51 to rotate in response to a command from the control device 59. The reel drive device 54 causes the reel 52 to rotate in response to a command from the control device 59. The plurality of guide rollers 55 guide running of the magnetic tape MT such that the tape path formed between the cartridge 10 and the reel 52 has a predetermined relative positional relationship with respect to the head unit 56.

When data is recorded on the magnetic tape MT, or when data is reproduced from the magnetic tape MT, the spindle drive device 53 and the reel drive device 54 drive and rotate the spindle 51 and the reel 52, and the magnetic tape MT runs. In regard to the running direction of the magnetic tape MT, reciprocation in the forward direction (the direction flowing from the side of the cartridge 10 to the side of the reel 52) and the backward direction (the direction flowing from the side of the reel 52 to the side of the cartridge 10) can be performed.

In the present embodiment, it is possible to adjust the tension of the magnetic tape MT in the longitudinal direction at the time of data recording or data reproduction by control of the rotation of the spindle 51 performed by the spindle drive device 53 and control of the rotation of the reel 52 performed by the reel drive device 54. Note that the tension adjustment of the magnetic tape MT may be performed by the control of movement of the guide roller 55 in stead of or in addition to the control of the rotation of the spindle 51 and the reel 52.

The reader writer 57 is configured to be able to write first information and second information in the cartridge memory 11 in response to a command from the control device 59. Also, the reader writer 57 is configured to be able to read the first information and the second information from the cartridge memory 11 in response to a command from the control device 59. As a communication scheme between the reader writer 57 and the cartridge memory 11, an ISO 14443 scheme, for example, is employed. The second information includes tension adjustment information. The tension adjustment information is an example of information at the time of data recording.

The control device 59 includes a control unit, a storage unit, a communication unit, and the like, for example. The control unit is configured of a central processing unit (CPU), for example, and controls each component of the recording reproducing device 50 in accordance with a program stored in the storage unit. For example, the control device 59 records a data signal supplied from an information processing device, such as the server 71 or the PC 72, on the magnetic tape MT by the head unit 56 in response to a request from the information processing device. Also, the control device 59 reproduces the data signal recorded on the magnetic tape MT and supplies the data signal to the information processing device by the head unit 56 in response to a request from the information processing device such as the server 71 or the PC 72.

The storage unit includes a nonvolatile memory in which various kinds of data and various programs are recorded and a volatile memory used as a work area of the control unit. The above various programs may be read from a portable recording medium such as an optical disc or a portable storage device such as a semiconductor memory or may be downloaded from a server device on the network.

The control device 59 reads a servo signal recorded in two adjacent servo bands SB by the head unit 56 at the time of recording data on the magnetic tape MT or at the time of reproducing data from the magnetic tape MT. The control device 59 controls the position of the head unit 56 such that the head unit 56 follows the servo pattern by using the servo signal read from the two servo bands SB.

The control device 59 obtains a distance (a distance in the width direction of the magnetic tape MT) d1 between two adjacent servo bands SB from the reproduction waveform of the servo signal read from the two adjacent servo bands SB at the time of recording data on the magnetic tape MT. Then, the control device 59 writes the obtained distance in the memory 36 by the reader writer 57.

The control device 59 obtains a distance (a distance in the width direction of the magnetic tape MT) d2 between the two adjacent servo bands SB from the reproduction waveform of the servo signal read from the two adjacent servo bands SB at the time of reproducing data from the magnetic tape MT. Also, the control device 59 reads the distance d1 between the two adjacent servo bands SB obtained at the time of recording data on the magnetic tape MT from the memory 36 by the reader writer 57. The control device 59 controls rotation of the spindle drive device 53 and the reel drive device 54 and adjusts the tension to be applied in the longitudinal direction of the magnetic tape MT while a difference Ad between the distance d1 between the servo bands SB obtained at the time of recording data on the magnetic tape MT and the distance d2 between the servo bands SB obtained at the time of reproducing data from the magnetic tape MT falls within a defined range. The control for the tension adjustment is performed by feedback control, for example.

The head unit 56 is configured to be able to record data on the magnetic tape MT in response to a command from the control device 59. Also, the head unit 56 is configured to be able to reproduce data recorded on the magnetic tape MT in response to a command from the control device 59. The head unit 56 includes two servo read heads and a plurality of data write/read heads, for example.

The servo read head is configured to be able to reproduce the servo signal by reading the magnetic field generated from the servo signal recorded on the magnetic tape MT by a magneto resistive (MR) element. The interval between the two servo read heads in the width direction is substantially the same as the distance between the two adjacent servo bands SB.

The data write/read head is disposed at equal intervals along the direction from one servo read head to the other servo read head at a position sandwiched between the two servo read heads. The data write/read head is configured to be able to record data on the magnetic tape MT using a magnetic field generated from a magnetic gap. Also, the data write/read head is configured to be able to reproduce data by reading the magnetic field generated from data recorded in the magnetic tape MT by an MR element and the like.

The communication I/F 58 is for communication with information processing devices such as the server 71, the PC 72, and the like and is connected to the network 70.

[1.7 Operations of Recording Reproducing Device at Time of Data Recording]

Figure 12:
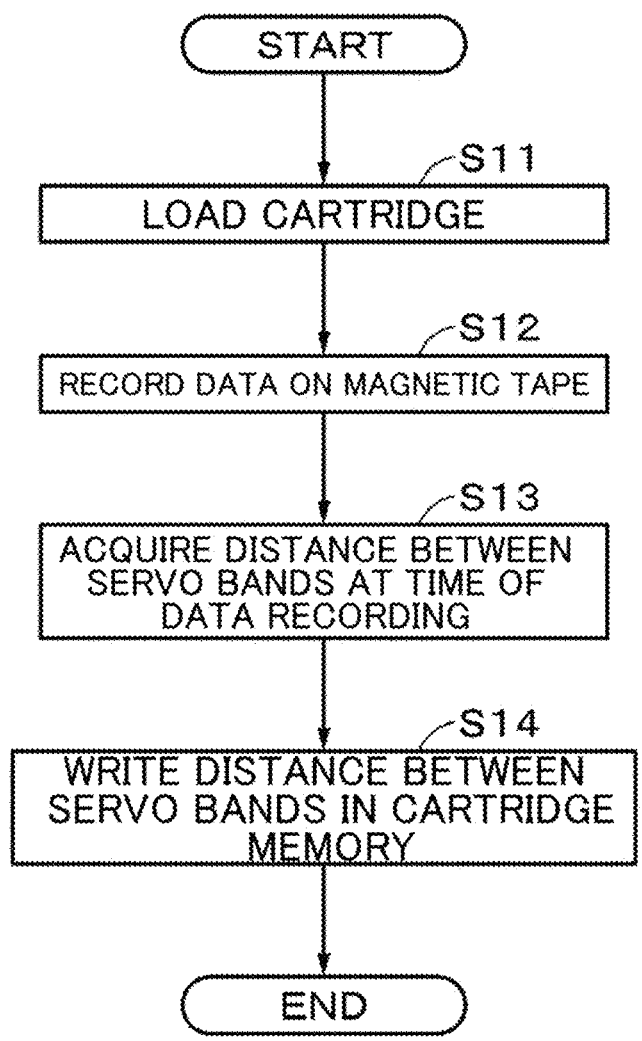
FIG. 12 is a flowchart for explaining an example of operations of the recording reproducing device at the time of data recording.

Hereinafter, an example of operations of the recording reproducing device 50 at the time of data recording will be described with reference to FIG. 12.

First, the control device 59 loads the cartridge 10 in the recording reproducing device 50 (Step S11). Next, the control device 59 controls rotation of the spindle 51 and the reel 52 and causes the magnetic tape MT to run while applying a defined tension in the longitudinal direction of the magnetic tape MT. Then, the control device 59 reads the servo signal by the servo read head of the head unit 56 and also records data on the magnetic tape MT by the data write/read head of the head unit 56 (Step S12).

At this time, the head unit 56 records data on the data band DB by the data write/read head of the head unit 56 while tracing the two adjacent servo bands SB by the two servo read heads of the head unit 56.

Next, the control device 59 obtains the distance d1 between two adjacent servo bands SB at the time of data recording from the reproduction waveform of the servo signal read by the servo read head of the head unit 56 (Step S13). Then, the control device 59 writes the distance d1 between the servo bands SB at the time of data recording in the cartridge memory 11 by the reader writer 57 (Step S14). The control device 59 may continuously measure the distance d1 between the servo bands SB and write the distance d1 in the cartridge memory 11 or may measure the distance d1 between the servo bands at specific intervals and write the distance d1 in the cartridge memory 11. In the case where the distance d1 between the servo bands SB is measured at specific intervals and is written in the cartridge memory 11, it is possible to reduce the amount of information to be written in the memory 36.

[1.8 Operations of Recording Reproducing Device at Time of Data Reproduction]

Figure 13:
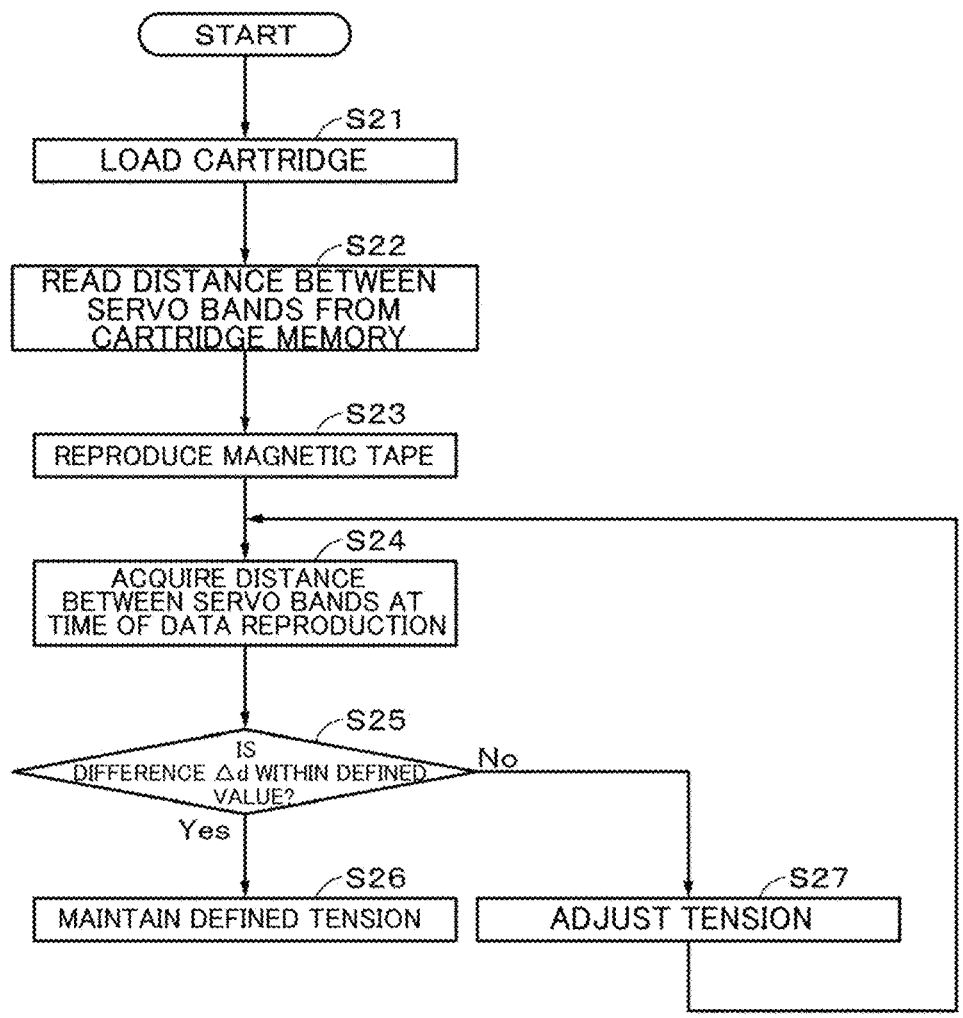
FIG. 13 is a flowchart for explaining an example of operations of the recording reproducing device at the time of data reproduction.

Hereinafter, an example of operations of the recording reproducing device 50 at the time of data reproduction will be described with reference to FIG. 13.

First, the control device 59 loads the cartridge 10 on the recording reproducing device 50 (Step S21). Next, the control device 59 reads the distance d1 between the servo bands at the time of recording from the cartridge memory 11 by the reader writer 57 (Step S22).

Next, the control device 59 controls rotation of the spindle 51 and the reel 52 and causes the magnetic tape MT to run while applying a defined tension in the longitudinal direction of the magnetic tape MT. Then, the control device 59 reads a servo signal by the servo read head of the head unit 56 and reproduces data from the magnetic tape MT by the data write/read head of the head unit 56 (Step S23).

Next, the control device 59 calculates the distance d2 between two adjacent servo bands SB at the time of data reproduction from the reproduction waveform of the servo signal read by the servo read head of the head unit 56 (Step S24).

Next, the control device 59 determines whether or not a difference Δd between the distance d1 between the servo bands read in Step S22 and the distance d2 between the servo bands SB calculated in Step S24 is within a defined value (Step S25).

In a case where it is determined that the difference Δd is within the defined value in Step S25, the control device 59 controls rotation of the spindle 51 and the reel 52 such that the defined tension is maintained (Step S26).

On the other hand, in a case where it is determined that the difference Δd is within the defined value in Step S25, the control device 59 controls rotation of the spindle 51 and the reel 52 and adjusts the tension to be applied to the running magnetic tape MT such that the difference Δd is reduced, and then returns the processing to Step S24 (Step S27).

[1.5 Operation and Effect]

As described above, since the amount of change in average width ΔA of the magnetic tape MT before and after the magnetic tape MT is left still for 40 hours in an environment at a temperature of 50° C. and a relative humidity of 40% RH in a state where a tension of 0.55 N is applied in the longitudinal direction is 170 ppm or less in the magnetic tape MT according to the first embodiment, it is possible to sufficiently curb creep deformation of the magnetic tape MT in the high-temperature environment for a long period of time (10 years, for example) as well as deformation of the magnetic tape MT due to the environment. It is thus possible to curb a change in width of the magnetic tape MT even in a case where the magnetic tape MT is saved or is caused to run in the high-temperature environment for a long period of time (10 years, for example).

Also, since the average tension responsiveness with respect to the tension in the longitudinal direction in the environment at the temperature of 50° C. and a relative humidity of 40% RH is 700 ppm/N or more, it is possible to satisfactorily correct a change in width of the magnetic tape MT in the high-temperature environment.

Therefore, it is possible to correct a change in width of the magnetic tape MT by adjusting the running tension of the magnetic tape MT even in a case where the magnetic tape MT is saved or is caused to run in the high-temperature environment for a long period of time (10 years, for example).

<2 Second Embodiment>

Although the case where the magnetic tape MT is a coating-type magnetic tape in which the underlayer, the magnetic layer, and the like are produced by a coating process (wet process) has been described in the above first embodiment, the magnetic tape MT may be a magnetic tape of a vacuum thin-film type in which the underlayer, the magnetic layer, and the like are produced by a vacuum thin film production technique (dry process) such as sputtering.

[2.1 Configuration of Magnetic Tape]

Figure 14:
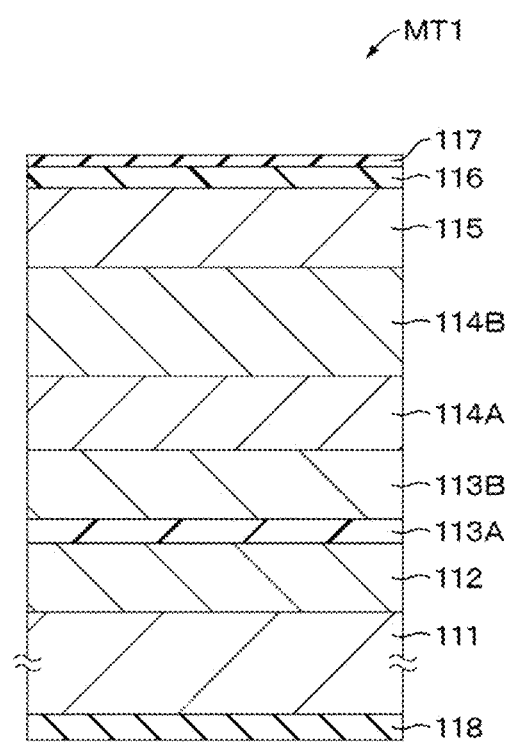
FIG. 14 is a cross-sectional view illustrating an example of a configuration of a magnetic tape according to a second embodiment of the present disclosure.

FIG. 14 is a cross-sectional view illustrating an example of a configuration of a magnetic tape MT1 of a vacuum thin film type according to a second embodiment of the present disclosure. The magnetic tape MT1 is a magnetic recording medium of a vertical recording type and includes a filmshaped substrate 111, a soft magnetic underlayer (hereinafter, referred to as an "SUL") 112, a first seed layer 113A, a second seed layer 113B, a first underlayer 114A, a second underlayer 114B, and a magnetic layer 115 as a recording layer. The SUL 112, the first and second seed layers 113A and 113B, the first and second underlayers 114A and 114B, and the magnetic layer 115 are vacuum thin films such as sputtered films, for example.

The SUL 112, the first and second seed layers 113A and 113B, and the first and second underlayers 114A and 114B are provided between one main surface (hereinafter, referred to as a "surface") of the substrate 111 and the magnetic layer 115, and the SUL 112, the first seed layer 113A, the second seed layer 113B, the first underlayer 114A, and the second underlayer 114B are laminated in this order in the direction from the substrate 111 to the magnetic layer 115.

The magnetic tape MT1 may further include a protective layer 116 provided on the magnetic layer 115 and a lubricant layer 117 provided on the protective layer 116 as needed. Also, the magnetic tape MT1 may further include a back layer 118 provided on the other main surface (hereinafter, referred to as a back surface") of the substrate 111 as needed.

Hereinafter, the longitudinal direction of the magnetic tape MT1 (the longitudinal direction of the substrate 111) will be referred to as a machine direction (MD). Here, the machine direction means a relative movement direction of the recording and reproducing head with respect to the magnetic tape MT1, that is, a direction in which the magnetic tape MT1 is caused to run at the time of recording reproduction.

The magnetic tape MT1 according to the second embodiment is suitably used as a data archive storage medium that is expected to have an increasing demand in the future. The magnetic tape MT1 can realize a surface recording density that is ten times or more the surface recording density of the current coating-type magnetic recording medium for storage, that is, a surface recording density of 50 Gb/in$^2$ or more. In a case where the data cartridge of a typical linear recording scheme is configured by using the magnetic tape MT1 having such a surface recording density, large capacity recording of 100 TB or more per roll of the data cartridge can be achieved.

The magnetic tape MT1 according to the second embodiment is suitably used for a recording reproducing device (a recording reproducing device for recording and reproducing data) having a ring-type recording head and a giant magnetoresistive (GMR)-type or tunneling magnetoresistive (TMR)-type recording head. Also, the magnetic tape MT1 according to the second embodiment using the ring-type recording head as a servo signal writing head is preferably used. A data signal is vertically recorded on the magnetic layer 115 by the ring-type recording head, for example. Additionally, a servo signal is vertically recorded on the magnetic layer 115 by the ring-type recording head, for example.

The average thickness $t_T$, the amount of change in average width ΔA, average tension responsiveness, an average storage elastic modulus of the substrate 111, and the like of the magnetic tape MT1 according to the second embodiment are similar to those in the first embodiment.
(Substrate)
The substrate 111 is similar to the substrate 41 in the first embodiment.
(SUL)
The SUL 112 contains a soft magnetic material in an amorphous state. The soft magnetic material contains at least one kind of a Co-based material and a Fe-based material, for example. The Co-based material includes, for example, CoZrNb, CoZrTa, or CoZrTaNb. The Fe-based material includes, for example, FeCoB, FeCoZr, or FeCoTa.

The SUL 112 is a single-layer SUL and is provided directly on the substrate 111. The average thickness of the SUL 112 is preferably 10 nm or more and 50 nm or less and more preferably 20 nm or more and 30 nm or less.

The average thickness of the SUL 112 is obtained similarly to the magnetic layer 43 in the first embodiment. Note that the average thicknesses of layers other than the SUL 112 (that is, the average thicknesses of the first and second seed layers 113A and 113B, the first and second underlayers 114A and 114B, and the magnetic layer 115), which will be described later, are obtained similarly to the magnetic layer 43 in the first embodiment. Here, the magnification of the TEM image is appropriately adjusted in accordance with the thickness of each layer.
(First and Second Seed Layers)
The first seed layer 113A contains an alloy containing Ti and Cr and has an amorphous state. Also, the alloy may further contain O (oxygen). Oxygen may be impurity oxygen contained in a minute amount in the first seed layer 113A when the first seed layer 113A is formed by a film formation method such as a sputtering method.

Here, the "alloy" means at least one kind of a solid solution, a eutectic crystal, an intermetallic compound, or the like containing Ti and Cr. The "amorphous state" means that halo is observed by X-ray diffraction, electron diffraction method, or the like and the crystal structure cannot be specified.

The atomic ratio of Ti with respect to the total amount of Ti and Cr contained in the first seed layer 113A is preferably within a range of 30 atom % or more and less than 100 atom %, and more preferably within a range of 50 atom % or more and less than 100 atom %. This is because if the atomic ratio of Ti is less than 30%, there is a concern that the (100) plane of the body-centered cubic lattice (bcc) structure of Cr may be oriented and orientation of the first and second underlayers 114A and 114B formed on the first seed layers 113A may be degraded.

The above atomic ratio of Ti is obtained as follows. Depth direction analysis (depth profile measurement) of the first seed layer 113A by Auger electron spectroscopy (hereinafter, referred to as "AES") is performed while ion milling is performed on the magnetic tape MT1 from the side of the magnetic layer 115. Next, the average compositions (average atomic ratios) of Ti and Cr in the film thickness direction are obtained from the obtained depth profile. Next, the obtained average compositions of Ti and Cr are used to obtain the above atomic ratio of Ti.

In a case where the first seed layer 113A contains Ti, Cr, and O, the atomic ratio of O with respect to the total amount of Ti, Cr, and O contained in the first seed layer 113A is preferably 15 atom % or less and more preferably 10 atom % or less. If the atomic ratio of 0 exceeds 15 atom %, there is a concern that a $TiO_2$ crystal may be generated, which may affect formation of crystal nuclei of the first and second underlayers 114A and 114B formed on the first seed layer 113A, and orientation of the first and second underlayers 114A and 114B may be degraded. The above atomic ratio of O is obtained by using an analysis method similar to that for the atomic ratio of Ti described above.

The alloy contained in the first seed layer 113A may further contain, as additive elements, elements other than Ti and Cr. Examples of the additive elements include at least one or more kinds of elements selected from a group consisting of Nb, Ni, Mo, Al, W, and the like.

An average thickness of the first seed layer 113A is preferably 2 nm or more and 15 nm or less and more preferably 3 nm or more and 10 nm or less.

The second seed layer 113B contains, for example, NiW or Ta and has a crystal state. An average thickness of the second seed layer 113B is preferably 3 nm or more and 20 nm or less and more preferably 5 nm or more and 15 nm or less.

The first and second seed layers 113A and 113B are not seed layers that have crystal structures similar to those of the first and second underlayers 114A and 114B and are provided for the purpose of crystal growth, and the first and second seed layers 113A and 113B are seed layers for improving the vertical orientation of the first and second underlayers 114A and 114B through the amorphous states of the first and second seed layers 113A and 113B.

(First and Second Underlayers)

The first and second underlayers 114A and 114B preferably have crystal structures similar to that of the magnetic layer 115. In a case where the magnetic layer 115 contains a Co-based alloy, the first and second underlayers 114A and 114B preferably include materials having hexagonal close-packing (hcp) structures similar to that of the Co-based alloy, and the c axis of the structure is preferably orientated in the vertical direction (that is, the film thickness direction) with respect to the film surface. This is because it is possible to enhance the orientation of the magnetic layer 115 and to obtain relatively satisfactory matching of the lattice constants between the second underlayer 114B and the magnetic layer 115. As the material having the hexagonal close-packing (hcp) structure, a material containing Ru is preferably used, and specifically, it is preferable to use Ru alone or an Ru alloy. Examples of the Ru alloy include Ru alloy oxides such as Ru—$SiO_2$, Ru—$TiO_2$, and Ru—$ZrO_2$, for example.

As described above, it is possible to use, as materials for the first and second underlayers 114A and 114B, similar materials. However, target effects of the first and second underlayers 114A and 114B are different. Specifically, the second underlayer 114B has a film structure of promoting the granular structure of the magnetic layer 115 as an upper layer, and the first underlayer 114A has film structure with crystal orientation in a high level. In order to obtain such a film structure, film formation conditions such as sputtering conditions for the first and second underlayers 114A and 114B are preferably different from each other.

An average thickness of the first underlayer 114A is preferably 3 nm or more and 15 nm or less and more preferably 5 nm or more and 10 nm or less. An average thickness of the second underlayer 114B is preferably 7 nm or more and 40 nm or less and more preferably 10 nm or more and 25 nm or less.

(Magnetic Layer)

The magnetic layer 115 is a vertical magnetic recording layer in which a magnetic material is vertically oriented. The magnetic layer 115 may be a vacuum thin film such as a sputtered film. The magnetic layer 115 is preferably a granular magnetic layer containing a Co-based alloy from the viewpoint of improving a recording density. The granular magnetic layer is configured of ferromagnetic crystal particles containing a Co-based alloy and a non-magnetic grain boundary (non-magnetic element) surrounding the ferromagnetic crystal particles. More specifically, the granular magnetic layer is configured of columns (cylindrical crystals) containing a Co-based alloy and a non-magnetic grain boundary (an oxide such as $SiO_2$, for example) surrounding the columns and magnetically separating each column. With this structure, it is possible to configure the magnetic layer 115 having a structure in which each column is magnetically separated.

The Co-based alloy has a hexagonal close-packing (hcp) structure, and the c axis is oriented in the vertical direction (film thickness direction) with respect to the film surface. As the Co-based alloy, it is preferable to use a CoCrPt-based alloy containing at least Co, Cr, and Pt. The CoCrPt-based alloy is not particularly limited, and the CoCrPt alloy may further contain additive elements. Examples of additive elements include one or more kinds of elements selected from a group consisting of Ni and Ta, for example.

The non-magnetic grain boundary surrounding the ferromagnetic crystal particles includes a nonmagnetic metal material. Here, the metal includes semimetal. As the non-magnetic metal material, it is possible to use at least one of a metal oxide and a metal nitride, for example, and it is preferable to use a metal oxide from the viewpoint of more stably maintaining the granular structure. Examples of the metal oxide include metal oxides containing at least one or more kinds of elements selected from a group consisting of Si, Cr, Co, Al, Ti, Ta, Zr, Ce, Y, Hf, and the like, and metal oxides containing at least Si oxide (that is, $SiO_2$) are preferably used. Specific examples of the metal oxide include $SiO_2$, $Cr_2O_3$, CoO, $Al_2O_3$, $TiO_2$, $Ta_2O_5$, $ZrO_2$, $HfO_2$, and the like. Examples of the metal nitride include metal nitrides containing at least one or more kinds of elements selected from a group consisting of Si, Cr, Co, Al, Ti, Ta, Zr, Ce, Y, Hf, and the like. Specific examples of the metal nitride include SiN, TiN, AlN, and the like.

The CoCrPt-based alloy contained in the ferromagnetic crystal particles and the Si oxide contained in the nonmagnetic grain boundary preferably have an average composition represented by Formula (1) below. This is because it is possible to realize a saturation magnetizing amount Ms with which it is possible to curb an influence of a demagnetizing field, to secure a sufficient reproducing output, and thereby to realize a further improvement in recording reproduction characteristics.

$$(Co_xPt_yCr_{100-x-y})_{100-z}—(SiO_2)_z \quad (1)$$

(where x, y, and z are values within ranges of 69≤X≤75, 10≤y≤16, and 9≤Z≤12, respectively, in Formula (1)).

Note that the above composition can be obtained as follows. Depth direction analysis of the magnetic layer 115 based on the AES is performed while ion milling is performed on the magnetic tape MT1 from the side of the magnetic layer 115, and average compositions (average atomic ratios) of Co, Pt, Cr, Si, and O in the film thickness direction are obtained.

The upper limit value of the average thickness of the magnetic layer 115 is preferably 90 nm or less, preferably 80 nm or less, more preferably 70 nm or less, yet more preferably 60 nm or less, particularly preferably 50 nm or less, 20 nm or less, or 15 nm or less, for example. The lower limit value of the average thickness of the magnetic layer 115 is preferably 9 nm or more. It is possible to improve electromagnetic conversion characteristics if the average thickness of the magnetic layer 43 is 9 nm or more and 90 nm or less.

(Protective Layer)

The protective layer 116 contains, for example, a carbon material or silicon dioxide ($SiO_2$) and preferably contains a carbon material from the viewpoint of the film strength of the protective layer 116. Examples of the carbon material include graphite, diamond-like carbon (DLC), and diamond.

(Lubricant)

The lubricant layer 117 contains at least one kind of lubricant. The lubricant layer 117 may further contain various additives, for example, an antirust agent as needed. As the lubricant, it is possible to exemplify lubricants similar to those of the magnetic layer 43 in the first embodiment.

Note that the lubricant is not only held as the lubricant layer 117 on the surface of the magnetic tape MT1 as described above but also may be included and held in layers such as the magnetic layer 115 and the protective layer 116 configuring the magnetic tape MT1.

(Back Layer)

The back layer 118 is similar to the back layer 44 in the first embodiment.

[2.2 Configuration of Sputtering Device]

Hereinafter, an example of a configuration of a sputtering device 120 used to manufacture the magnetic tape MT1 according to the second embodiment will be described with reference FIG. 15. The sputtering device 120 is a continuous winding-type sputtering device used to form the SUL 112, the first seed layer 113A, the second seed layer 113B, the first underlayer 114A, the second underlayer 114B, and the magnetic layer 115, and includes a film formation chamber 121, a drum 122 that is a metal can (rotating element), cathodes 123a to 123f, a feeding reel 124, a winding reel 125, and a plurality of guide rolls 127a to 127c and 128a to 128c. Although the sputtering device 120 is a device of a direct current (DC) magnetron sputtering scheme, for example, the sputtering scheme is not limited to the scheme.

The film formation chamber 121 is connected to a vacuum pump, which is not illustrated, via an exhaust port 126, and the atmosphere inside the film formation chamber 121 is set to a predetermined vacuum level by the vacuum pump. Inside the film formation chamber 121, the drum 122 with a rotatable configuration, the feeding reel 124, and the winding reel 125 are disposed. Inside the film formation chamber 121, the plurality of guide rolls 127a to 127c for guiding transport of the substrate 111 between the feeding reel 124 and the drum 122 are provided, and the plurality of guide rolls 128a to 128c for guiding transport of the substrate 111 between the drum 122 and the winding reel 125 are provided. At the time of sputtering, the substrate 111 rolled out from the feeding reel 124 is wound around the winding reel 125 via the guide rolls 127a to 127c, the drum 122, and the guide rolls 128a to 128c. The drum 122 has a cylindrical shape, and the long substrate 111 is caused to follow and is transported along the circumferential surface of the cylindrical shape of the drum 122. The drum 122 is provided with a cooling mechanism, which is not illustrated, and is cooled to about −20° C., for example, at the time of the sputtering. The plurality of cathodes 123a to 123f are disposed to face the circumferential surface of the drum 122 inside the film formation chamber 121. Targets are set in the cathodes 123a to 123f, respectively. Specifically, targets to form the SUL 112, the first seed layer 113A, the second seed layer 113B, the first underlayer 114A, the second underlayer 114B, and the magnetic layer 115 are set in the cathodes 123a, 123b, 123c, 123d, 123e, and 123f, respectively. The plurality of types of films, namely the SUL 112, the first seed layer 113A, the second seed layer 113B, the first underlayer 114A, the second underlayer 114B, and the magnetic layer 115 are formed at the same time by these cathodes 123a to 123f.

With the sputtering device 120 having the above configuration, it is possible to continuously form the SUL 112, the first seed layer 113A, the second seed layer 113B, the first underlayer 114A, the second underlayer 114B, and the magnetic layer 115 by the roll-to-roll method.

[2.3 Method of Manufacturing Magnetic Tape]

In the magnetic tape MT 1 according to the second embodiment, it is possible to manufacture the magnetic tape MT1 as follows, for example.

Figure 15:
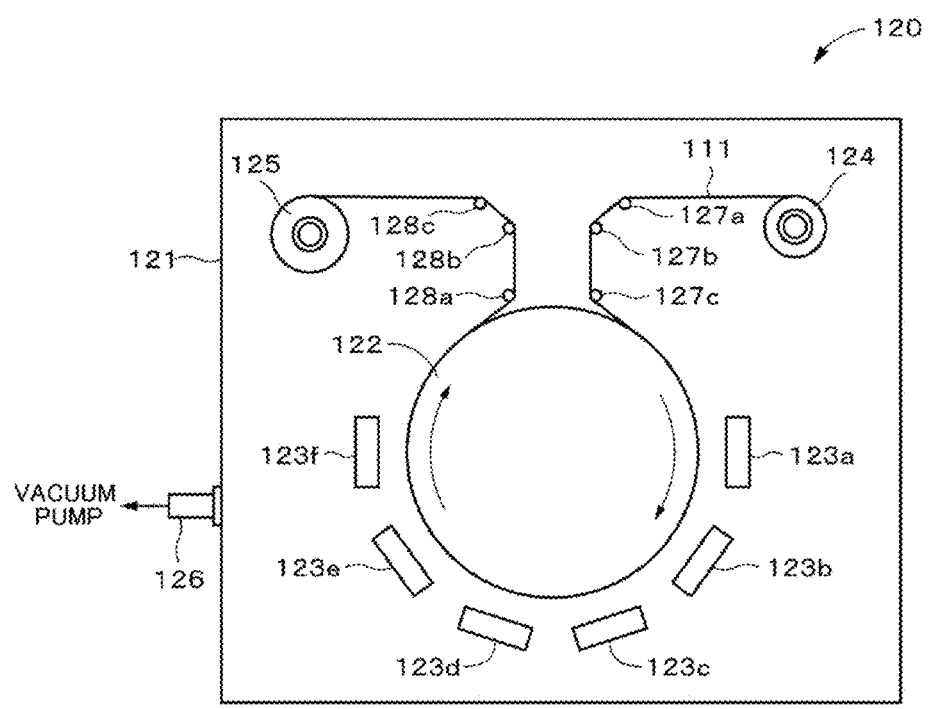
FIG. 15 is a schematic diagram illustrating a configuration of a sputtering device.

First, the SUL 112, the first seed layer 113A, the second seed layer 113B, the first underlayer 114A, the second underlayer 114B, and the magnetic layer 115 are sequentially formed on the surface of the substrate 111 by using the sputtering device 120 illustrated in FIG. 15. Specifically, they are formed as follows. First, the film formation chamber 121 is vacuumed to a predetermined pressure. Thereafter, targets set a cathodes 123a to 123f are sputtered while process gas such as Ar gas is introduced into the film formation chamber 121. In this manner, the SUL 112, the first seed layer 113A, the second seed layer 113B, the first underlayer 114A, the second underlayer 114B, and the magnetic layer 115 are sequentially formed on the surface of the running substrate 111.

The atmosphere in the film formation chamber 121 at the time of the sputtering is set to about $1\times10^{-5}$ Pa to $5\times10^{-5}$ Pa, for example. The film thicknesses and the properties of the SUL 112, the first seed layer 113A, the second seed layer 113B, the first underlayer 114A, the second underlayer 114B, and the magnetic layer 115 can be controlled by adjusting the tape line speed of winding the substrate 111, the pressure of the process gas (sputter gas pressure) such as Ar gas to be introduced at the time of the sputtering, input power, and the like.

Next, the protective layer 116 is formed on the magnetic layer 115. As a method for forming the protective layer 116, it is possible to use a chemical vapor deposition (CVD) method or a physical vapor deposition (PVD) method, for example.

Next, a back layer forming coating material is prepared by kneading and dispersing a binding agent, an organic particle, a lubricant, and the like in a solvent. Next, the back layer forming coating material is applied to the back surface of the substrate 111 and is dried thereby to form the back layer 118 on the back surface of the substrate 111.

Next, the lubricant is applied to the protective layer 116, for example, thereby to film the lubricant layer 117. As a method for applying the lubricant, it is possible to use various application methods such as gravure coating and dip coating, for example. Next, the magnetic tape MT1 is cut into a predetermined width as needed. The magnetic tape MT1 illustrated in FIG. 14 is obtained as described above.

[2.4 Operation and Effect]

In the magnetic tape MT1 according to the second embodiment, a change width of the magnetic tape MT1 can be corrected by adjusting the running tension of the magnetic tape MT1 even in a case where the magnetic tape MT1 is saved or caused to run in a high-temperature environment for a long period of time (10 years, for example) similarly to the first embodiment.

<3 Third Embodiment>

[3.1 Configuration of Magnetic Tape]

Figure 16:
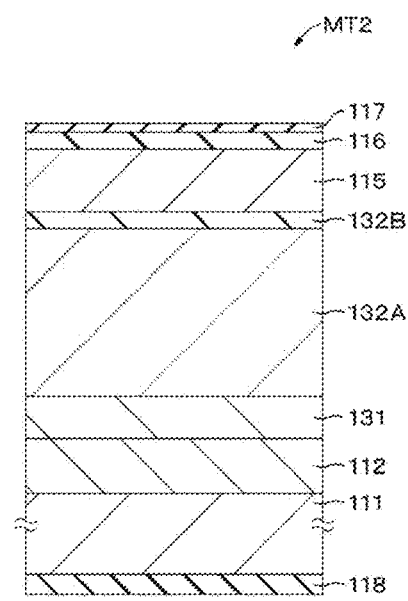
FIG. 16 is a cross-sectional view illustrating an example of a configuration of a magnetic tape according to a third embodiment of the present disclosure.

FIG. 16 is a cross-sectional view illustrating an example of a configuration of a magnetic tape MT2 of a vacuum thin film type according to a third embodiment of the present disclosure. The magnetic tape MT2 includes a substrate 111, an SUL 112, a seed layer 131, a first underlayer 132A, a second underlayer 132B, and a magnetic layer 115. Here, in the third embodiment, the same parts as those in the second embodiment will be denoted with the same reference numerals, and description thereof will be omitted.

The SUL 112, the seed layer 131, and the first and second underlayers 132A and 132B are provided between one main surface of the substrate 111 and the magnetic layer 115 in the substrate 111, and the SUL 112, the seed layer 131, the first underlayer 132A, and the second underlayer 132B are laminated in this order in the direction from the substrate 111 to the magnetic layer 115.

(Seed Layer)

The seed layer 131 contains Cr, Ni, and Fe, has a body-centered cubic lattice (fcc) structure, and has a priority orientation such that the (111) plane of the body-centered cubic lattice structure is parallel with the surface of the substrate 111. Here, the priority orientation means a state in which the diffraction peak intensity from the (111) plane of the body-centered cubic lattice structure is larger than the diffraction peak from other crystal planes in 0-2θ scanning of the X-ray diffraction method or a state where only the diffraction peak intensity from the (111) plane of the body-centered cubic lattice structure is observed in the 0-2θ scanning of the X-ray diffraction method.

The intensity ratio of the X-ray diffraction of the seed layer 131 is preferably 60 cps/nm or more, more preferably 70 cps/nm or more, and yet more preferably 80 cps/nm or more from the viewpoint of an improvement in SNR. Here, the intensity ratio of the X-ray diffraction of the seed layer 131 is a value (I/D (cps/nm)) obtained by dividing the intensity I (cps) of the X-ray diffraction of the seed layer 131 by the average thickness D (nm) of the seed layer 131.

Cr, Ni, and Fe contained in the seed layer 131 preferably have an average composition represented by Formula (2) below.

$$Cr_X(Ni_Y Fe_{100-Y})_{100-X} \quad (2)$$

(Where X falls within a range of 10≤X≤45 and Y falls within a range of 60≤Y≤90 in Formula (2).)

If X falls within the above range, the (111) orientation of the body-centered cubic lattice structure of Cr, Ni, and Fe is improved, and a more satisfactory SNR can be obtained. Similarly, if Y falls within the above range, the (111) orientation of the body-centered cubic lattice structure of Cr, Ni, and Fe is improved, and a more satisfactory SNR can be obtained.

The average thickness of the seed layer 131 is preferably 5 nm or more and 40 nm or less. It is possible to improve the (111) orientation of the body-centered cubic lattice structure of Cr, Ni, and Fe and to obtain a more satisfactory SNR by setting the average thickness of the seed layer 131 within the range. Note that the average thickness of the seed layer 131 is obtained similarly to the magnetic layer 43 in the first embodiment. Here, the magnification of the TEM image is appropriately adjusted in accordance with the thickness of the seed layer 131.

(First and Second Underlayers)

The first underlayer 132A contains Co and O having body-centered cubic lattice structures and has a column (columnar-shaped crystal) structure. With the first underlayer 132A containing Co and O, effects (functions) substantially similar to those of the second underlayer 132B containing Ru can be obtained. A concentration ratio of the average atomic concentration of O with respect to the average atomic concentration of Co ((the average atomic concentration of O)/(the average atomic concentration of Co)) is 1 or more. If the concentration ratio is 1 or more, the effect of providing the first underlayer 132A is improved, and a more satisfactory SNR can be obtained.

The column structure is preferably inclined from the viewpoint of an improvement in SNR. The inclination direction is preferably the longitudinal direction of the long magnetic tape MT2. The longitudinal direction is preferably employed for the following reason. The magnetic tape MT2 according to the present embodiment is a magnetic recording medium for so-called linear recording, and the recording track is parallel with the longitudinal direction of the magnetic tape MT2. Also, the magnetic tape MT2 according to the present embodiment is also a so-called vertical magnetic recording medium, the crystal orientation axis of the magnetic layer 115 is preferably in the vertical direction from the viewpoint of recording properties. However, the crystal orientation axis of the magnetic layer 115 may be inclined due to an influence of the inclination of the column structure of the first underlayer 132A. In the magnetic tape MT2 for linear recording, it is possible to reduce the influence of the inclination of the crystal orientation axis on the recording properties with the configuration in which the crystal orientation axis of the magnetic layer 115 is inclined in the longitudinal direction of the magnetic tape MT2 as compared with a configuration in which the crystal orientation axis of the magnetic layer 115 is inclined in the width direction of the magnetic tape MT2, due to a relationship with the head magnetic field at the time of recording. In order to incline the crystal orientation axis of the magnetic layer 115 in the longitudinal direction of the magnetic tape MT2, the inclination direction of the column structure of the first underlayer 132A is preferably set to the longitudinal direction of the magnetic tape MT2 as described above The inclination angle of the column structure is preferably more than 0° and 60° or less. Since a change in distal end shape of the column included in the first underlayer 132A is large and has a substantially triangular mountain shape when the inclination angle is within a range of more than 0° and 60° or less, there is a trend that the effect of the granular structure increases, noise decreases, and the SNR is improved. On the other hand, if the inclination angle exceeds 60°, the change in distal end shape of the column included in the first underlayer 132A decreases, the triangular mountain shape is less likely to be obtained, and there is thus a trend that the low noise effect decreases.

The average particle diameter of the column structure is 3 nm or more and 13 nm or less. If the average particle diameter is less than 3 nm, the average particle diameter of the column structure included in the magnetic layer 115 decreases, and there is a concern that the capability of holding the recording decreases with the current magnetic material. On the other hand, if the average particle diameter is 13 nm or less, noise is curbed, and a more satisfactory SNR can be obtained.

The average thickness of the first underlayer 132A is preferably 10 nm or more and 150 nm or less. If the average thickness of the first underlayer 132A is 10 nm or more, the (111) orientation of the body-centered cubic lattice structure of the first underlayer 132A is improved, and a more satisfactory SNR can be obtained. O the other hand, if the average thickness of the first underlayer 132A is 150 nm or less, it is possible to curb an increase in particle diameter of the column. Therefore, it is possible to curb noise and to obtain a more satisfactory SNR. Note that the average thickness of the first underlayer 132A is obtained similarly to the magnetic layer 43 in the first embodiment. However, the magnification of the TEM image is appropriately adjusted in accordance with the thickness of the first underlayer 132A.

The second underlayer 132B preferably has a crystal structure similar to that of the magnetic layer 115. In a case where the magnetic layer 115 contains a Co-based alloy, the second underlayer 132B preferably contains a material having a hexagonal close-packing (hcp) structure similar to that of the Co-based alloy, and the c axis of the structure is preferably orientated in the vertical direction (that is, the film thickness direction) with respect to the film surface. This is because it is possible to enhance orientation of the magnetic layer 115 and to achieve relatively satisfactory matching of the lattice constants of the second underlayer 132B and the magnetic layer 115. As a material having the hexagonal close-packing structure, a material containing Ru is preferably used, and specifically, it is preferable to use Ru alone or an Ru alloy. Examples of the Ru alloys include Ru alloy oxides such as Ru—$SiO_2$, Ru—$TiO_2$, or Ru—$ZrO_2$.

The average thickness of the second underlayer 132B may be thinner than an underlayer (for example, an underlayer containing Ru) in a typical magnetic recording medium and can be 1 nm or more and 5 nm or less, for example. Since the seed layer 131 and the first underlayer 132A having the above configurations are provided below the second underlayer 132B, it is possible to obtain a satisfactory SNR even if the average thickness of the second underlayer 132B is thin as described above. Note that the average thickness of the second underlayer 132B is obtained similarly to the magnetic layer 43 in the first embodiment. However, the magnification of the TEM image is appropriately adjusted in accordance with the thickness of the second underlayer 132B.

The average thickness $t_T$, the amount of change in average width ΔA, the average tension responsiveness, the average storage elastic modulus of the substrate 111, and the like of the magnetic tape MT2 in the third embodiment are similar to those in the first embodiment.

[3.2 Operation and Effect]

In the magnetic tape MT2 according to the third embodiment, it is possible to correct a change in width of the magnetic tape MT2 by adjusting a running tension of the magnetic tape MT2 even in a case where the magnetic tape MT2 is saved or caused to run in a high-temperature environment for a long period of time (10 years, for example) similarly to the first embodiment.

The magnetic tape MT2 according to the third embodiment includes the seed layer 131 and the first underlayer 132A between the substrate 111 and the second underlayer 132B. The seed layer 131 contains Cr, Ni, and Fe, has a body-centered cubic lattice structure, and has priority orientation such that the (111) plane of the body-centered cubic lattice structure is parallel with the surface of the substrate 111. The first underlayer 132A contains Co and O and has a column structure in which a ratio of an average atomic concentration of O with respect to an average atomic concentration of Co is 1 or more and an average particle diameter is 3 nm or more and 13 nm or less. In this manner, it is possible to realize the magnetic layer 115 having satisfactory crystal orientation and a high coercive force while reducing the thickness of the second underlayer 132B to minimize utilization of Ru that is an expensive material.

Ru contained in the second underlayer 132B has the same hexagonal close-packed lattice structure as that of Co that is a main component of the magnetic layer 115. Therefore, Ru has an effect that both an improvement in crystal orientation and promotion of granularity of the magnetic layer 115 are achieved. Also, in order to further improve crystal orientation of Ru contained in the second underlayer 132B, the first underlayer 132A and the seed layer 131 are provided below the second underlayer 132B. In the magnetic tape MT2 according to the third embodiment, effects (functions) that are substantially similar to those of the second underlayer 132B containing Ru are realized by the first underlayer 132A that has a body-centered cubic lattice structure and contains low-cost CoO. Therefore, it is possible to reduce the thickness of the second underlayer 132B. Also, in order to enhance crystal orientation of the first underlayer 132A, the seed layer 131 containing Cr, Ni, and Fe is provided.

<4 Modification Examples>

(Modification Example 1)

Although the case where the magnetic tape cartridge is a one-reel-type cartridge 10 has been described in the above first embodiment, the magnetic tape cartridge may be a two-reel-type cartridge.

Figure 17:
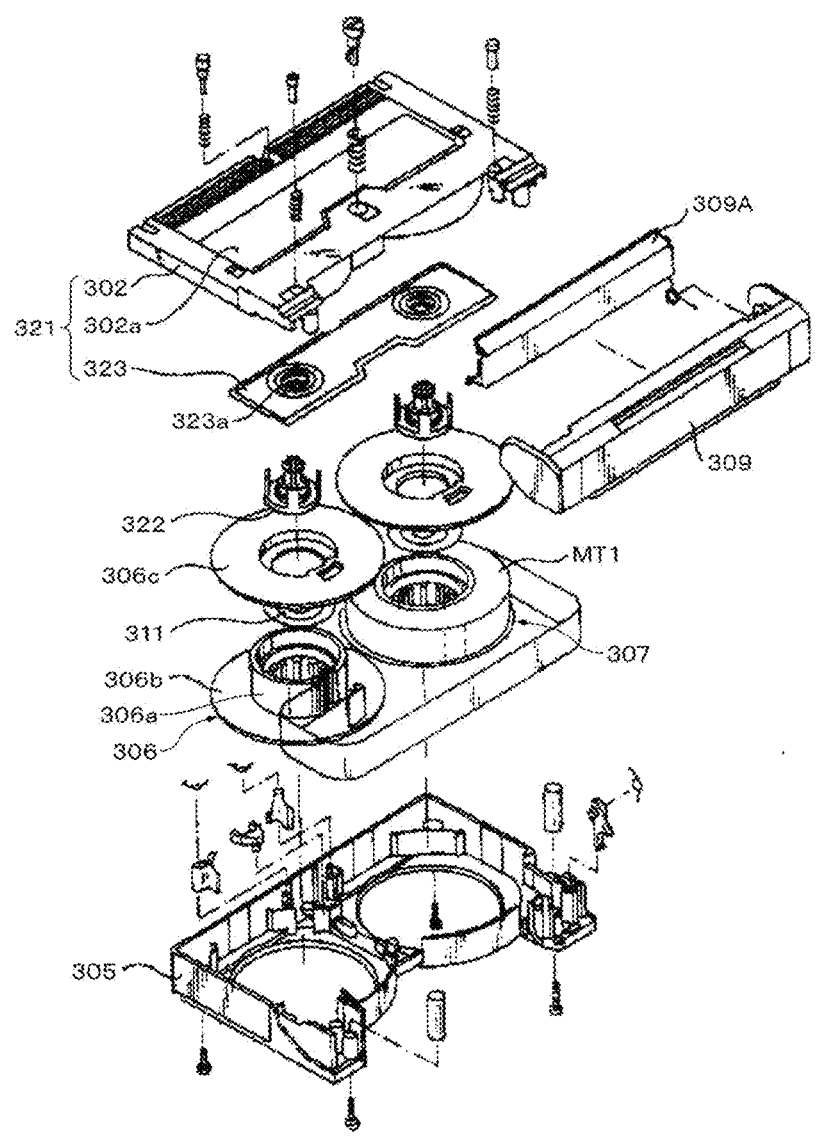
FIG. 17 is an exploded perspective view illustrating an example of a configuration of a cartridge according to a modification example of the first embodiment of the present disclosure.

FIG. 17 is an exploded perspective view illustrating an example of a configuration of a two-reel type cartridge 321. The cartridge 321 includes an upper half 302 made of a synthetic resin, a transparent window member 323 fitted and fixed to a window portion 302a opened in the upper surface of the upper half 302, a reel holder 322 that is fixed to the inside of the upper half 302 to prevent reels 306 and 307 from floating, a lower half 305 that corresponds to the upper half 302, the reels 306 and 307 that are accommodated in a space formed by combining the upper half 302 and the lower half 305, a magnetic tape MT that is wound around the reels 306 and 307, a front lid 309 that closes a front opening formed by combining the upper half 302 and the lower half 305, and a back lid 309A that protects the magnetic tape MT exposed to the front opening.

The reels 306 and 307 are adapted such that the magnetic tape MT is wound therearound. The reel 306 includes a lower flange 306b having, at the center thereof, a cylindrical hub portion 306a around which the magnetic tape MT is wound, an upper flange 306c having substantially the same size as the lower flange 306b, and a reel plate 311 sandwiched between the hub portion 306a and the upper flange 306c. The reel 307 has the same configuration as the reel 306.

The window member 323 is provided with attachment holes 323a for assembling the reel holder 322, which is a reel holding means for preventing the reels from floating, at positions corresponding to the reels 306 and 307. The magnetic tape MT is similar to the magnetic tape MT in the first embodiment.

(Modification Example 2)

The magnetic tape MT1 according to the second embodiment may further include an underlayer between the substrate 111 and the SUL 112. Although the SUL 112 has an amorphous state and thus does not play a role in promoting epitaxial growth of a layer formed on the SUL 112, it is required not to disturb crystal orientation of the first and second underlayers 114A and 114B formed on the SUL 112. To do so, the soft magnetic material preferably has a minute structure that does not form any column. However, in a case where there is a large influence of degassing such as moisture from the substrate 111, there is a concern that the soft magnetic material may be coarsened and disturb crystal orientation of the first and second underlayers 114A and 114B formed on the SUL 112. In order to curb the influence of degassing such as moisture from the substrate 111, un underlayer containing an alloy containing Ti and Cr and having an amorphous state is preferably provided between the substrate 111 and the SUL 112 as described above. As a specific configuration of the underlayer, it is possible to employ a configuration similar to that of the first seed layer 113A in the second embodiment.

The magnetic tape MT1 may not include any one of the second seed layer 113B and the second underlayer 114B. However, the magnetic tape MT1 preferably includes both the second seed layer 113B and the second underlayer 114B from the viewpoint of an improvement in SNR.

The magnetic tape MT1 may include an antiparallel coupled SUL (APC-SUL) instead of the single-layer SUL.

EXAMPLES

Although the present disclosure will be described below in detail with reference to examples, the present disclosure is not limited to these examples.

In the following examples and comparative examples, the amounts of change in average width ΔA, the average tension responsiveness ΔW, the average storage elastic moduli of the substrate in the longitudinal direction, the average Young's moduli of the substrate in the longitudinal direction, the average thicknesses of the substrate, the average thicknesses of the magnetic tape, the average thicknesses of the magnetic layer, the average thicknesses of the underlayer, the average thicknesses of the back layer, the squareness ratios S1 and S2, and the like are values obtained by the measurement methods described in the first embodiment.

Example 1

(Film Formation Process of SUL)

First, a CoZrNb layer (SUL) with an average thickness of 10 nm was formed on one of main surfaces of a long polymer film as a nonmagnetic support under the following film formation conditions. As a polymer film, a PEN film with an average thickness of 3.8 μm, with an average storage elastic modulus of 5.5 GPa in the longitudinal direction in an environment at a temperature of 50° C., and with an average Young's modulus of 6.3 GPa in the longitudinal direction was used.

Form formation scheme: DC magnetron sputtering scheme
Target: CoZrNb target
Gas type: Ar
Gas pressure: 0.1 Pa (Film Formation Process of First Seed Layer)

Next, a TiCr layer (first seed layer) with an average thickness of 5 nm was formed on the CoZrNb layer under the following film formation conditions.

Sputtering scheme: DC magnetron sputtering scheme
Target: TiCr target
Ultimate vacuum: $5 \times 10^{-5}$ Pa
Gas type: Ar
Gas pressure: 0.5 Pa (Film Formation Process of Second Seed Layer)

Next, a NiW layer (second seed layer) with an average thickness of 10 nm was formed on the TiCr layer under the following film formation conditions.

Sputtering scheme: DC magnetron sputtering scheme
Target: NiW target
Ultimate vacuum: $5 \times 10^{-5}$ Pa
Gas type: Ar
Gas pressure: 0.5 Pa (Film Formation Process of First Underlayer)

Next, an Ru layer (first underlayer) with an average thickness of 10 nm was formed on the NiW layer under the following film formation conditions.

Sputtering scheme: DC magnetron sputtering scheme
Target: Ru target
Gas type: Ar
Gas pressure: 0.5 Pa (Film Formation Process of Second Underlayer)

Next, an Ru layer (second underlayer) with an average thickness of 20 nm was formed on the Ru layer under the following film formation conditions.

Sputtering scheme: DC magnetron sputtering scheme
Target: Ru target
Gas type: Ar
Gas pressure: 1.5 Pa (Film Formation Process of Magnetic Layer)

Next, a (CoCrPt)—(SiO2) layer (magnetic layer) with an average thickness of 9 nm was formed on the Ru layer under the following film formation conditions.

Film formation scheme: DC magnetron sputtering scheme
Target: (CoCrPt)—(SiO2) target
Gas type: Ar
Gas pressure: 1.5 Pa (Film Formation Process of Protective Layer)

A carbon layer (protective layer) with an average layer 5 nm was formed on the magnetic layer under the following film formation conditions.

Film formation scheme: DC magnetron sputtering scheme
Target: Carbon target
Gas type: Ar
Gas pressure: 1.0 Pa (Film Formation Process of Lubricant Layer)

Next, a lubricant was applied to the protective layer, and a lubricant layer was thereby formed.

(Film Formation Process of Back Layer)

Next, a back layer with an average thickness tb of 0.3 μm was formed by applying a back layer forming coating material to the other main surface of the polymer film and drying it. A magnetic tape with an average thickness $t_T$ of 4.0 μm was thereby obtained.

(Cutting Process)

The magnetic tape obtained as described above was cut into a width of ½ inches (12.65 mm).

In this manner, a target long magnetic tape (average thickness of 4.2 μm) was obtained.

In Example 1, a sputtered film was used as a magnetic layer, a PEN film was used as a polymer film, and the amount of change in average width ΔA and an average tension responsiveness ΔW were set to the values shown in Table 1 by adjusting extension strengths of the PEN film in the width direction and the longitudinal direction.

Example 2

As a polymer film, a reinforced PET film with an average thickness of 3.8 μm, with an average storage elastic modulus of 3.9 GPa in the longitudinal direction at a temperature of 50° C., and an average Young's modulus of 4.6 GPa in the longitudinal direction was used. Here, the reinforced PET film means a film reinforced by adding polyamide to a PET film.

A sputtered film was used as a magnetic layer, a reinforced PET film was used as a polymer film, and the amount of change in average width ΔA and the average tension responsiveness ΔW were set to the values shown in Table 1 by adjusting extension strengths of the reinforced PET film in the width direction and in the longitudinal direction.

A magnetic tape with an average thickness of 4.2 μm was obtained similarly to Example 1 other than the above points.

Example 3

(Preparation Process of Magnetic Layer Forming Coating Material)

A magnetic layer forming coating material was prepared as follows. First, a first composition having the following mixture was kneaded by an extruder. Next, the kneaded first composition and a second composition having the following mixture were added to a stirring tank equipped with a disperser, and premixing was performed. Subsequently, sand mill mixing was further performed and filtering was performed to prepare a magnetic layer forming coating material.

(First Composition)

Barium ferrite ($BaFe_{12}O_{19}$) magnetic powder (hexagonal plate shape, average aspect ratio of 3.0, average particle volume of 2500 $nm^3$): 100 parts by mass Resin solution with a vinyl chloride-based resin dispersed in cyclohexanone (resin solution: the blending amount of the vinyl chloride resin was 30% by mass, and the blending amount of cyclohexanone was 70% by mass): 52 parts by mass (vinyl chloride-based resin: polymerization level of 300, number average molecular weight Mn=10000, containing, as polar groups, OSO3K=0.07 mmol/g and secondary OH=0.3 mmol/g)

Aluminum oxide powder: 5 parts by mass ($\alpha$-$Al_2O_3$, average particle size of 0.2 μm)

Carbon black: 2 parts by mass (Manufactured by Tokai Carbon Co., Ltd., trade name: Seast TA)

(Second Composition)

Resin solution with a vinyl chloride-based resin dispersed in cyclohexanone (resin solution: the blending amount of the vinyl chloride resin was 30% by mass, and the blending amount of cyclohexanone was 70% by mass): 3.5 parts by mass (vinyl chloride-based resin: polymerization level of 300, number average molecular weight Mn=10000, containing, as polar groups, OSO3K=0.07 mmol/g and secondary OH=0.3 mmol/g)

n-butyl stearate: 2 parts by mass
    Methyl ethyl ketone: 121.3 parts by mass
    Toluene: 121.3 parts by mass
    Cyclohexanone: 60.7 parts by mass Finally, 4 pars by mass of polyisocyanate (trade name: Coronate L manufactured by Tosoh Corporation) and 2 parts by mass of myristic acid were added as curing agents to the magnetic layer forming coating material prepared as described above.

(Preparation Process of Underlayer Forming Coating Material)

An underlayer forming coating material was prepared as follows. First, a third composition having the following mixture was kneaded by an extruder. Next, the kneaded third composition and a fourth composition having the following mixture were added to a stirring tank equipped with a disperser, and premixing was performed. Subsequently, sand mill mixing was further performed and filtering was performed to prepare an underlayer forming coating material.

(Third Composition)

Needle-shaped iron oxide powder: 100 parts by mass ($\alpha$—$Fe_2O_3$, average major axis length of 0.15 μm)
    Vinyl chloride-based resin: 55.6 parts by mass
    (resin solution: resin content 30% by mass, cyclohexanone 70% by mass)
    Carbon black: 10 parts by mass
    (average particle size of 20 nm)

(Fourth Composition)

Polyurethane-based resin UR8200 (manufactured by Toyo Boseki Kabushiki Kaisha): 18.5 parts by mass
    n-butyl stearate: 2 parts by mass
    Methyl ethyl ketone: 108.2 parts by mass
    Toluene: 108.2 parts by mass
    Cyclohexanone: 18.5 parts by mass Finally, 4 parts by mass of polyisocyanate (trade name: Coronate L manufactured by Tosoh Corporation) and 2 pars by mass of myristic acid were added as curing agents to the underlayer forming coating material prepared as described above.

(Preparation Process of Back Layer Forming Coating Material)

Aback layer forming coating material was prepared as follows. The following raw materials were mixed in a stirring tank equipped with a disperser and filtered to prepare a back layer forming coating material.

Carbon black (manufactured by Asahi Carbon Co., Ltd., trade name: #80): 100 parts by mass
    Polyester polyurethane: 100 parts by mass
    (made by Nippon Polyurethane Industry Co., Ltd., trade name: N-2304)
    Methyl ethyl ketone: 500 parts by mass
    Toluene: 400 parts by mass
    Cyclohexanone: 100 parts by mass (Film Formation Process)

The coating material produced as described above was used to form the underlayer and the magnetic layer on one of main surfaces of a long polymer film as a nonmagnetic support as follows.

First, an underlayer forming coating material was applied to the reinforced PET film and was then dried, and the underlayer was thereby formed. At this time, the coating conditions were adjusted such that the average thickness of the underlayer after the calendering processing became 0.8 μm. As a polymer film, a reinforced PET film with an average thickness of 4.0 μm, with an average storage elastic modulus of 3.9 GPa in the longitudinal direction in an environment at a temperature of 50° C., and with an average Young's modulus of 4.6 GPa in the longitudinal direction was used.

Next, the magnetic layer forming coating material was applied to the underlayer and was then dried, and the magnetic layer was thereby formed on the underlayer. At this time, the application conditions were adjusted such that the average thickness of the magnetic layer after the calendering processing became 0.08 μm. During the drying of the magnetic layer forming coating material, the magnetic field of the magnetic powder was oriented in the thickness direction of the polymer film by a neodymium magnet. The drying conditions (the drying temperature and the drying time) of the magnetic layer forming coating material were adjusted, and the squareness ratio S1 in the thickness direction (vertical direction) of the magnetic tape was set to 65% while the squareness ratio S2 in the longitudinal direction was set to 35%.

Subsequently, a back layer forming coating material was applied to the other main surface of the reinforced PET film with the underlayer and the magnetic layer formed thereon and was dried, and a back layer was thereby formed. At this time, the coating conditions were adjusted such that the average thickness of the back layer after the calendering processing became 0.32 μm. A magnetic tape was obtained as described above.

(Curing Process)

Next, the magnetic tape was wound into a roll shape, heating processing was performed on the magnetic tape in this state, and the underlayer and the magnetic layer were thereby cured.

(Calendering Process)

Next, calendering processing was performed on the thus obtained magnetic tape MT to smooth the surface of the magnetic layer.

(Cutting Process)

The magnetic tape obtained as described above was cut into a width of ½ inches (12.65 mm). In this manner, a target long magnetic tape (with an average thickness of 5.2 μm) was obtained.

In Example 3, a coating film was used as a magnetic layer, a reinforced PET film was used as a polymer film, and the amount of change in average width ΔA and the average tension responsiveness ΔW were set to the values shown in Table 1 by adjusting extension strengths of the PET film in the width direction and the longitudinal direction.

Comparative Example 1

As a polymer film, a PET film with an average thickness of 4.8 μm, with an average storage elastic modulus of 3.9 GPa in the longitudinal direction in an environment at a temperature of 50° C., and with an average Young's modulus of 4.7 GPa in the longitudinal direction was used.

A sputtered film was used as a magnetic layer, a PET film was used as a polymer film, and the amount of change in average width ΔA and an average tension responsiveness ΔW were set to the values shown in Table 1 by adjusting the extension strengths of the PET film in the width direction and the longitudinal direction.

A magnetic tape with an average thickness of 5.2 μm was obtained similarly to Example 1 other than the above points.

Comparative Example 2

As a polymer film, a PEN film with an average thickness of 4.0 μm, with an average storage elastic modulus of 5.5 GPa in the longitudinal direction in an environment at a temperature of 50° C., and with an average Young's modulus of 6.3 GPa in the longitudinal direction was used.

As barium ferrite ($BaFe_{12}O_{19}$) magnetic powder contained in the first composition, barium ferrite powder with a hexagonal plate shape, an average aspect ratio of 3.0, and an average particle volume of 1600 $nm^3$ was used. A coating film was used as a magnetic layer, a PEN film was used as a polymer film, and the amount of change in average width ΔA and an average tension responsiveness ΔW were set to the values shown in Table 1 by adjusting the extension strengths of the PEN film in the width direction and the longitudinal direction.

A magnetic tape with an average thickness of 5.2 μm was obtained similarly to Example 3 other than the above points.

Comparative Example 3

As a polymer film, a reinforced PET film with an average thickness of 4.6 μm, with an average storage elastic modulus of 3.9 GPa in the longitudinal direction in an environment at a temperature of 50° C., and with an average Young's modulus of 4.6 GPa in the longitudinal direction was used.

The average thickness of the magnetic layer after calendering processing was set to 0.08 μm, and the average thickness of the underlayer after the calendering processing was set to 0.8 μm.

As barium ferrite ($BaFe_{12}O_{19}$) magnetic powder contained in the first composition, barium ferrite powder with a hexagonal plate shape, an average aspect ratio of 3.0, and an average particle volume of 1600 $nm^3$ was used. A coating film was used as a magnetic layer, a reinforced PET film was used as a polymer film, and the amount of change in average width ΔA and an average tension responsiveness ΔW were set to the values shown in Table 1 by adjusting the extension strengths of the reinforced PET film in the width direction and the longitudinal direction.

A magnetic tape with an average thickness of 5.6 μm was obtained similarly to Example 3 other than the above points.

(Amount of Change in Average Width ΔA)

Figure 18:
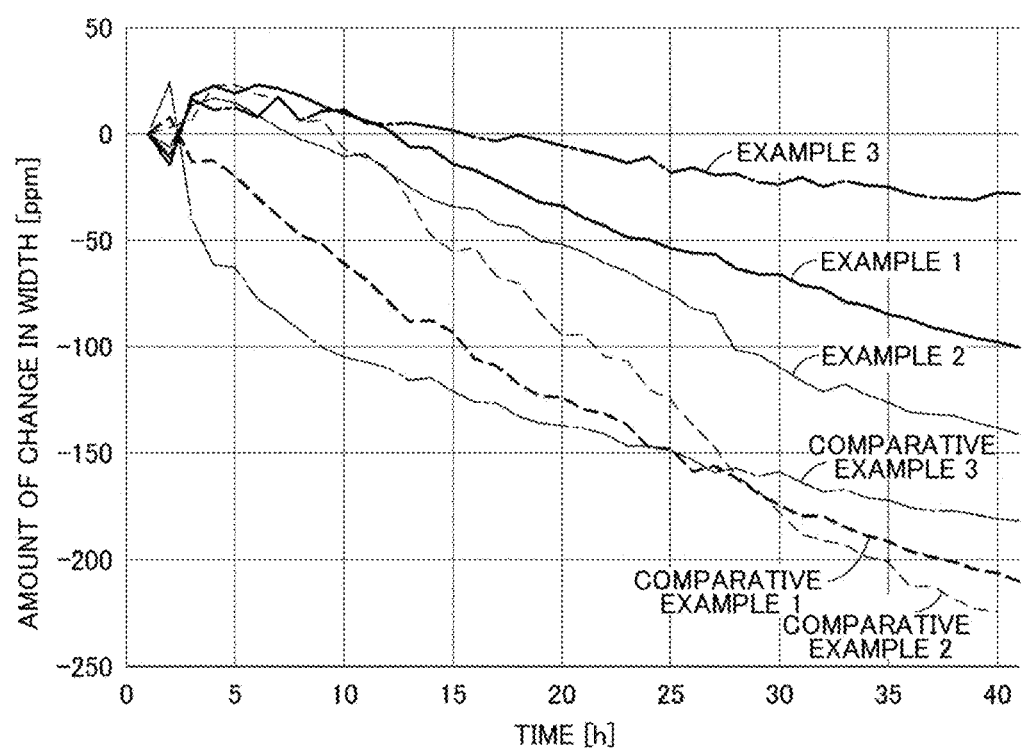
FIG. 18 is a graph illustrating results of measuring the amounts of changes in widths of magnetic tapes in Examples 1 to 3 and Comparative Examples 1 to 3.
Figure 19:
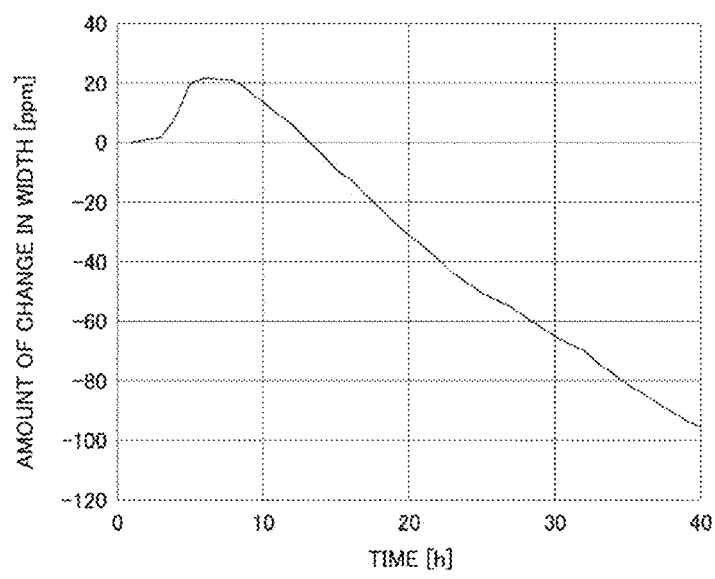
FIG. 19 is a graph illustrating a result of measuring the amount of change in width of a magnetic tape in Example 1.

FIG. 18 is a graph illustrating results of measuring the amounts of changes in widths of magnetic tapes in Examples 1 to 3 and Comparative Examples 1 to 3. FIG. 19 is a graph illustrating a result of measuring the amount of change in width of a magnetic tape in Example 1.

(Method for Measuring a Tension Required to Adjust Change in Width on Assumption of Ten Years)

A measurement environment of LTO7 Drive is fixed to 32° C. and 55%.

The cartridge saving is conducted in a wound state around the cartridge with a tension of 0.55 N. Note that as for a start of the measurement, the measurement is started 1 hour later in each environment.

As for the number of times of the measurement, the measurement was conducted once per day for 14 days.

As a measurement band, a DB0 part is measured in ordinary creep evaluation. Assumption of 10 years The creep rate is calculated by an approximate expression from the point of the start of the measurement and the point of 14 days later (336 hours) based on the saving time and the amount of change in creep.

A value of 10 years later (87600 hours) is calculated from the creep rate. The amount of change in creep after 10 years/tension responsiveness=a tension required to adjust a change in width on the assumption of 10 years The band width is measured as follows.

As a method for measuring a servo band pitch by using a tape drive device, the magnetic tape is caused to run by the tape drive device, a servo trace line T on each servo band of two servo read heads is measured, and the servo band pitch is measured from a relative position relative to the servo pattern of each measured servo trace line T. The intervals of the servo trace lines T indicates a servo band pitch (a disposition interval of the two servo read heads of the drive head) when the width of the magnetic tape has not changed.

The tape drive device outputs a servo reproduction signal with a wave form in accordance with the position of the servo trace line T with respect to the servo pattern. Typically, a distance AC between the A burst and the C burst that are arrays of inclination patterns that have mutually the homogeneous shape and a distance AB between the A burst and the B burst that are arrays of inclination patterns that have mutually heterogeneous shapes are calculated, and the position of the servo trace line T of each servo read head 132 is measured by Expression 1 below. Note that θ is an azimuth angle of above each inclination pattern corresponding to the angle φ in FIG. 6, which is 12° in this example.

$$\frac{\Sigma AB \text{ Time}}{\Sigma AC \text{ Time}} \times AC[um] \times \frac{1}{2\tan\theta} \qquad \text{[Math. 4]}$$

Here, the distance AC may be a distance A1-C1 between first inclined parts of the A burst and the C burst, may be a distance A2-C2 between second inclined parts thereof, may be a distance A3-C3 between third inclined parts thereof, or may be a distance A4-C4 between fourth inclined parts thereof. These distances AC (AC1 to AC4) refer to the distance between positions indicating the positive maximum values (upper peak positions) of the amplitude of the servo reproduction waveform.

Similarly, the distance AB may be a distance A1-B1 between first inclined parts between the A burst and the B burst, may be a distance A2-B2 between second inclined parts thereof, may be a distance A3-B3 between third inclined parts thereof, or may be a distance A4-B4 between fourth inclined parts thereof. Typically, the distance A1-B1 is employed in a case where the distance A1-C1 is employed, the distance A2-B2 is employed in a case where the distance A2-C2 is employed, the distance A3-B3 is employed in a case where the distance A3-C3 is employed, or the distance A4-B4 is employed in a case where the distance A4-C4 is employed.

Then, a servo band pitch is obtained from a difference between a numerical value representing the position of each servo trace line T on the servo pattern obtained from a proportion between the distance AB and the distance AC calculated by using Expression 4. Here, a difference of the servo band (servo band s2) on the side of the tape center from the measurement value of the servo band (servo band s3) on the side of the tape edge out of the two servo bands to be measured is obtained. The positive and the negative of the value means the direction of the change in tape width, the positive case corresponds to narrowing of the servo band pitch while the negative case corresponds to widening of the servo band pitch. A case where the above difference is zero means that there has been no variations in tape width.

The servo band pitch is preferably obtained from differences of a large number of servo frames and may be an average value of measurement values calculated from differences of 100 to 100000 servo frames. The tape tension at the time of the measurement is 0.55 N, and the measurement is performed by applying the constant tension over the entire length of the magnetic tape MT.

If the tension (N) required to adjust the amount of change in average value $\Delta A$ is 0.25 or more, the tension (N) required to adjust a change in width on the assumption of 10 years exceeds 0.75 N, and it is thus difficult to adjust the tension by an actual drive.

While embodiments and modification examples of the present disclosure have been described above in detail, the present disclosure is not limited to the above embodiments and modification examples, and various modifications based on the technical idea of the present disclosure can be made. For example, the configurations, methods, processes, shapes, materials, numerical values, and the like exemplified in the above embodiments and modification examples are only examples, and as necessary, different configurations, methods, processes, shapes, materials, numerical values, and the like may be used. The configurations, methods, processes, shapes, materials, numerical values, and the like of the above embodiments and modification examples can be combined with each other as long as they do not deviate from the gist of the present disclosure.

The chemical formulas of the compounds and the like exemplified in the above embodiments and modification examples are representative, and the chemical formulas is not limited to the listed valences and the like as long as a general name of the same compound is used. In the numerical ranges stated in stages in the above embodiments and modification examples, the upper limit value or the lower limit value of the numerical range of a certain stage may be replaced with the upper limit value or the lower limit value in the numerical range of another stage. Unless otherwise specified, the materials exemplified in the above embodiments and modification examples may be used alone or two or more thereof may be used in combination.

In addition, the present disclosure may have the following constitutions.

(1)

A magnetic recording medium with a tape shape,
wherein an amount of change in average width of the magnetic recording medium before and after the magnetic recording medium is left still for 40 hours in an environment at a temperature of 50° C. and a relative humidity of 40% RH in a state where a tension of 0.55 N is applied in the longitudinal direction is 170 ppm or less, and an average tension responsiveness with

TABLE 1

|  | Amount of change in average width $\Delta A$ at 50° C. (ppm) | Average tension responsiveness $\Delta W$ at 50° C. (ppm/N) | Type of magnetic layer | Average thickness of magnetic tape (μm) | Average thickness of substrate (μm) | Material of substrate | Average storage elastic modulus of substrate in longitudinal direction at 50° C. (Gpa) | Average Young's modulus of substrate in longitudinal direction (GPa) | Tension required to adjust change in width on assumption of 10 years (N) |
|---|---|---|---|---|---|---|---|---|---|
| Example 1 | 98 | 759 | sputtered | 4.2 | 3.8 | PEN | 5.5 | 6.3 | 0.40 |
| Example 2 | 138 | 715 | sputtered | 4.2 | 3.8 | Reinforced PET | 3.9 | 4.6 | 0.60 |
| Example 3 | 28 | 715 | coating | 5.2 | 4.0 | Reinforced PET | 3.9 | 4.6 | 0.12 |
| Comparative Example 1 | 206 | 618 | sputtered | 5.2 | 4.8 | PET | 3.9 | 4.7 | 1.03 |
| Comparative Example 2 | 220 | 759 | coating | 5.2 | 4.0 | PEN | 5.5 | 6.3 | 0.90 |
| Comparative Example 3 | 181 | 715 | coating | 5.6 | 4.6 | Reinforced PET | 3.9 | 4.6 | 0.78 | respect to a tension in the longitudinal direction in an environment at a temperature of 50° C. and a relative humidity of 40% RH is 700 ppm/N or more.

(2)

The magnetic recording medium according to (1), in which the average tension responsiveness is 715 ppm/N or more and 15000 ppm/N or less.

(3)

The magnetic recording medium according to (1) or (2), in which the amount of change in average width is 140 ppm or less.

(4)

The magnetic recording medium according to any one of (1) to (3),
  in which a substrate, an underlayer, and a magnetic layer are included in order, and
  an average storage elastic modulus of the substrate in the longitudinal direction in an environment at a temperature of 50° C. is 3.0 GPa or more and 9.0 GPa or less.

(5)

The magnetic recording medium according to (4),
  in which the average storage elastic modulus is 3.5 GPa or more and 6.0 GPa or less.

(6)

The magnetic recording medium according to (4) or (5), in which the substrate contains polyesters.

(7)

The magnetic recording medium according to (6), in which the polyesters include at least one kind selected from a group consisting of polyethylene terephthalate and polyethylene naphthalate.

(8)

The magnetic recording medium according to any one of (4) to (7), in which an average thickness of the substrate is 4.4 μm or less.

(9)

The magnetic recording medium according to any one of (4) to (8), in which the magnetic layer is a vacuum thin film.

(10)

The magnetic recording medium according to any one of (4) to (8), in which the magnetic layer is a coating film.

(11)

The magnetic recording medium according to any one of (4) to (8) and (10), in which the magnetic layer contains magnetic powder.

(12)

The magnetic recording medium according to (11), in which the magnetic powder contains ε-iron oxide magnetic powder, hexagonal ferrite magnetic powder, or Co-containing spinel ferrite magnetic powder.

(13)

The magnetic recording medium according to any one of (4) to (12), in which an average thickness of the magnetic layer is 90 nm or less.

(14)

The magnetic recording medium according to any one of (4) to (12), in which an average thickness of the underlayer is 1.0 μm or less.

(15)

The magnetic recording medium according to any one of (4) to (14), in which an average thickness of the magnetic recording medium is 5.2 μm or less.

(16)

The magnetic recording medium according to any one of (4) to (15),
  wherein a squareness ratio of the magnetic layer in a vertical direction of the magnetic recording medium is 65% or more.

(17)

The magnetic recording medium according to any one of (4) to (16), in which the magnetic layer includes five or more servo bands.

(18)

The magnetic recording medium according to (17), in which a width of the servo band is 95 μm or less.

(19)

The magnetic recording medium according to any one of (4) to (18), in which the magnetic layer is configured to be able to form a plurality of data tracks, and a width of the data tracks is 1500 nm or less.

(20)

A cartridge including: the magnetic recording medium according to any one of (1) to (19); and
  a storage unit that is configured such that adjustment information for adjusting a tension to be applied in the longitudinal direction of the magnetic recording medium is able to be written therein.

REFERENCE SIGNS LIST

10 Cartridge
11 Cartridge memory
31 Antenna coil
32 Rectification and power circuit
33 Clock circuit
34 Detection and modulation circuit
35 Controller
36 Memory
36A First storage region
36B Second storage region
41 Substrate
42 Underlayer
43 Magnetic layer
44 Back layer
56 Head unit
56A, 56B Servo read head
100 Servo frame
101 Servo subframe 1
101A A burst
101B B burst
102 Servo subframe 2
102C C burst
102D D burst
103 Servo stripe
MT Magnetic tape
SB Servo band
DB Data bind

The invention claimed is:

1. A magnetic recording medium comprising a tape shape, wherein an amount of change in an average width of the magnetic recording medium before and after the magnetic recording medium is left still for 40 hours in an environment at a temperature of 50° C. and a relative humidity of 40% RH in a state where a tension of 0.55 N is applied in a longitudinal direction is 170 ppm or less, and an average tension responsiveness with respect to a tension in the longitudinal direction in the environment at the temperature of 50° C. and the relative humidity of 40% RH is 700 ppm/N or more.

2. The magnetic recording medium according to claim 1, wherein the average tension responsiveness is 715 ppm/N or more and 15000 ppm/N or less.

3. The magnetic recording medium according to claim 1, wherein the amount of change in average width is 140 ppm or less.

4. The magnetic recording medium according to claim 1,
wherein a substrate, an underlayer, and a magnetic layer are included in order, and
an average storage elastic modulus of the substrate in the longitudinal direction in an environment at a temperature of 50° C. is 3.0 GPa or more and 9.0 GPa or less.

5. The magnetic recording medium according to claim 4, wherein the average storage elastic modulus of the substrate is 3.5 GPa or more and 6.0 GPa or less.

6. The magnetic recording medium according to claim 4, wherein the substrate includes a polyester.

7. The magnetic recording medium according to claim 6, wherein the polyester includes one or both of a polyethylene terephthalate and a polyethylene naphthalate.

8. The magnetic recording medium according to claim 4, wherein an average thickness of the substrate is 4.4 μm or less.

9. The magnetic recording medium according to claim 4, wherein the magnetic layer is a vacuum thin film.

10. The magnetic recording medium according to claim 4, wherein the magnetic layer is a coating film.

11. The magnetic recording medium according to claim 4, wherein the magnetic layer includes a magnetic powder.

12. The magnetic recording medium according to claim 11, wherein the magnetic powder includes an ε-iron oxide magnetic powder, a hexagonal ferrite magnetic powder, or a Co-containing spinel ferrite magnetic powder.

13. The magnetic recording medium according to claim 4, wherein an average thickness of the magnetic layer is 90 nm or less.

14. The magnetic recording medium according to claim 4, wherein an average thickness of the underlayer is 1.0 μm or less.

15. The magnetic recording medium according to claim 1, wherein an average thickness of the magnetic recording medium is 5.2 μm or less.

16. The magnetic recording medium according to claim 4, wherein a squareness ratio of the magnetic layer in a vertical direction of the magnetic recording medium is 65% or more.

17. The magnetic recording medium according to claim 4, wherein the magnetic layer includes five or more servo bands.

18. The magnetic recording medium according to claim 17, wherein a width of the servo band is 95 μm or less.

19. The magnetic recording medium according to claim 4,
wherein the magnetic layer is configured to be able to form a plurality of data tracks, and
a width of the data tracks is 1500 nm or less.

20. A cartridge comprising:
the magnetic recording medium according to claim 1; and
a storage unit that is configured such that adjustment information for adjusting a tension to be applied in a longitudinal direction of the magnetic recording medium is able to be written therein.

* * * * *